(12) United States Patent
Maki et al.

(10) Patent No.: US 7,293,067 B1
(45) Date of Patent: Nov. 6, 2007

(54) SYSTEM FOR SEARCHING DEVICE ON NETWORK

(75) Inventors: Nobuhiko Maki, Tokyo (JP); Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 09/612,565

(22) Filed: Jul. 7, 2000

(30) Foreign Application Priority Data

| Jul. 16, 1999 | (JP) | 11-202709 |
| Jul. 16, 1999 | (JP) | 11-202710 |
| Jul. 16, 1999 | (JP) | 11-202734 |
| Jul. 16, 1999 | (JP) | 11-202735 |

(51) Int. Cl.
G06F 15/16 (2006.01)

(52) U.S. Cl. ................... 709/217

(58) Field of Classification Search .......... 707/3; 709/223, 217, 218, 219, 224, 225; 717/11; 455/456.1–457

See application file for complete search history.

(56) References Cited

U.S. PATENT DOCUMENTS

| 5,261,044 A * | 11/1993 | Dev et al. ................. 715/855 |
| 5,796,951 A * | 8/1998 | Hamner et al. ........... 709/223 |
| 5,910,803 A * | 6/1999 | Grau et al. ............... 345/734 |
| 5,929,852 A * | 7/1999 | Fisher et al. ............. 345/739 |
| 6,100,812 A | 8/2000 | Tanaka et al. ........ 340/825.37 |
| 6,107,961 A * | 8/2000 | Takagi ................... 342/357.13 |
| 6,163,799 A | 12/2000 | Kambayashi et al. ..... 709/204 |
| 6,212,570 B1 * | 4/2001 | Hasebe et al. ............. 709/238 |
| 6,260,063 B1 * | 7/2001 | Ludtke et al. ............. 709/224 |
| 6,389,589 B1 * | 5/2002 | Mishra et al. ............. 717/170 |
| 6,430,612 B1 * | 8/2002 | Iizuka ...................... 709/223 |
| 6,460,030 B1 * | 10/2002 | Ludtke ........................ 707/3 |
| 6,480,748 B1 * | 11/2002 | Gerszberg et al. .......... 700/21 |
| 6,574,662 B2 * | 6/2003 | Sugiyama et al. ......... 709/223 |
| 6,731,940 B1 * | 5/2004 | Nagendran ............. 455/456.1 |
| 6,865,576 B1 * | 3/2005 | Gong et al. ............... 707/100 |
| 6,917,968 B2 * | 7/2005 | Nakamura ................ 709/217 |
| 6,988,104 B2 * | 1/2006 | Kootale ................... 707/100 |

(Continued)

FOREIGN PATENT DOCUMENTS

| EP | 0 614 151 A1 | 9/1974 |
| EP | 1 067 731 A2 | 1/2001 |
| EP | 1067731 A2 * | 1/2001 |
| JP | 05-323867 A | 12/1993 |

(Continued)

OTHER PUBLICATIONS

Wahl et al., "Lightweight Directory Access Protocol (v3)", Dec. 1997, Network Working Group, RFC2251.*

*Primary Examiner*—David Wiley
*Assistant Examiner*—J. Bret Dennison
(74) *Attorney, Agent, or Firm*—Fitzpatrick, Cella, Harper & Scinto

(57) ABSTRACT

There is disclosed a network system in which the position, attribute, and status of a desired device on a network can visually comprehensibly be grasped. A server manages location information indicating information on the device position in a hierarchical manner and attribute information from the device. Each device holds a plurality of status information (icon information) in accordance with various statuses of the device. A client holds map information corresponding to each class of the location information, and overlaps and outputs (display output) device status information obtained by communication by a polling system with the device detected by search in the server, and map information corresponding to the location information of the device.

21 Claims, 48 Drawing Sheets

U.S. PATENT DOCUMENTS

| | | | |
|---|---|---|---|
| 2001/0011277 A1* | 8/2001 | Martin et al. | 707/100 |
| 2001/0052995 A1 | 12/2001 | Idehara | 358/1.15 |
| 2002/0059450 A1* | 5/2002 | Masaki | 709/238 |
| 2002/0124082 A1* | 9/2002 | San Andres et al. | 709/225 |
| 2003/0041134 A1* | 2/2003 | Sugiyama et al. | 709/223 |
| 2003/0115199 A1* | 6/2003 | Ochiai et al. | 707/10 |
| 2003/0163251 A1* | 8/2003 | Obradovich et al. | 701/208 |
| 2003/0212863 A1* | 11/2003 | Ganguly et al. | 711/118 |
| 2004/0196508 A1* | 10/2004 | Iida | 358/442 |
| 2005/0138204 A1* | 6/2005 | Iyer et al. | 709/242 |

FOREIGN PATENT DOCUMENTS

| | | |
|---|---|---|
| JP | 06-324823 A | 11/1994 |
| JP | 07-336778 A | 12/1995 |
| JP | 08-305520 A | 11/1996 |
| JP | 09-244860 A | 9/1997 |
| JP | 09-251434 A | 9/1997 |

* cited by examiner

FIG. 6

| | | |
|---|---|---|
| 901 | LOCATION INFORMATION TAG | |
| 902 | NM | LBP1110 |
| 903 | MAP | 10X+10Y |
| 904 | DV | PRINTER |
| 905 | BL | 2-1 |
| 906 | FL | 2F |
| 907 | BU | AA BUILDING |
| 908 | OP | EXTEND |
| 909 | BR | TOKYO BRANCH |
| 910 | O | ABC TRADING CO LTD. |
| 911 | C | JP |
| 912 | DEVICE ATTRIBUTE INFORMATION TAG | |
| 913 | COLOR | TRUE |
| 914 | IP ADDRESS | 192.1.2.1 |

FIG. 7

|  | 900 | 101 | 102 | 103 | 104 | 105 |
|---|---|---|---|---|---|---|
| 902 — | NM | LBP1110 | MFP6550 | LBP3310 | LBP3310 | SCN2160 |
| 903 — | MAP | 10X+10Y | 5X+30Y | 10X+10Y | 15X+25Y | 5X+5Y |
| 904 — | DV | PRINTER | MFP | PRINTER | PRINTER | SCANER |
| 905 — | BL | 2-1 | 2-1 | 2-2 | 1-1 | 1-2 |
| 906 — | FL | 2F | 2F | 2F | 1F | 1F |
| 907 — | BU | AA BUILDING | AA BUILDING | AA BUILDING | AA BUILDING | AA BUILDING |
| 908 — | OP | EXTEND | EXTEND | EXTEND | EXTEND | EXTEND |
| 909 — | BR | TOKYO BRANCH | TOKYO BRANCH | TOKYO BRANCH | TOKYO BRANCH | TOKYO BRANCH |
| 910 — | O | ABC TRADING CO LTD. | ABC TRADING CO LTD. | ABC TRADING CO LTD. | ABC TRADING CO LTD. | ABC TRADING CO LTD. |
| 911 — | C | JP | JP | JP | JP | JP |
| 913 — | COLOR | TRUE | FALSE | FALSE | FALSE | TRUE |
| 914 — | IP ADDRESS | 192.1.2.1 | 192.1.2.10 | 192.1.2.100 | 192.1.2.101 | 192.1.2.200 |

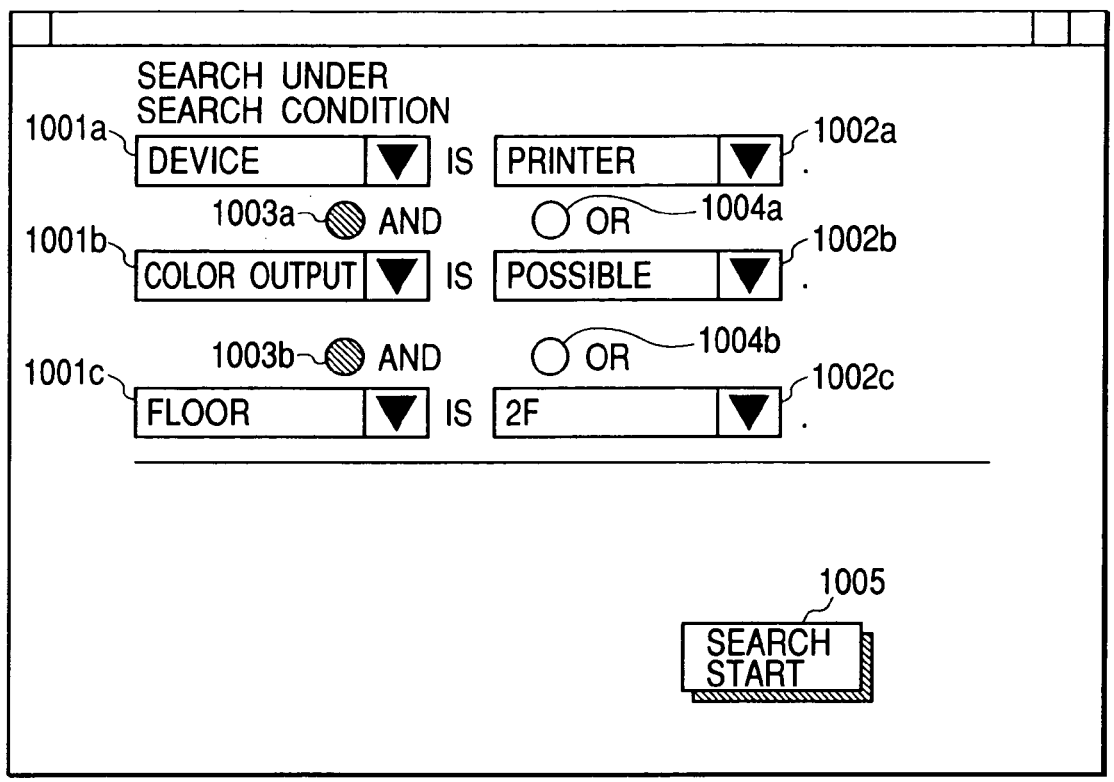

FIG. 13

| NM | LBP1110 |
|---|---|
| MAP | 10X+10Y |
| DV | PRINTER |
| BL | 2-1 |
| FL | 2F |
| BU | AA BUILDING |
| OP | EXTEND |
| BR | TOKYO BRANCH |
| O | ABC TRADING CO LTD. |
| C | JP |
| COLOR | TRUE |
| IP ADDRESS | 192.1.2.1 |

FIG. 35

| | | | | | |
|---|---|---|---|---|---|
| C | JP | JP | JP | JP | JP |
| O | ABC TRADING CO LTD. | ABC TRADING CO LTD. | ABC TRADING CO LTD. | ABC TRADING CO LTD. | ABC TRADING CO LTD. |
| BR | | TOKYO BRANCH | TOKYO BRANCH | TOKYO BRANCH | TOKYO BRANCH |
| OP | | EXTEND | EXTEND | EXTEND | EXTEND |
| BU | | | AA BUILDING | AA BUILDING | AA BUILDING |
| FL | | | | 2F | 1F |
| BL | | | | | |
| MAP | | | | | |
| CORRESPONDING MAP | MP101 (FIG. 37) | MP102 (FIG. 39) | MP103 (FIG. 41) | MP104 (FIG. 43) | MP105 (FIG. 45) |

| | | | | |
|---|---|---|---|---|
| C | JP | JP | JP | |
| O | ABC TRADING CO LTD. | ABC TRADING CO LTD. | ABC TRADING CO LTD. | — |
| BR | TOKYO BRANCH | TOKYO BRANCH | TOKYO BRANCH | — |
| OP | EXTEND | EXTEND | EXTEND | — |
| BU | AA BUILDING | AA BUILDING | AA BUILDING | — |
| FL | 1F | 2F | 2F | — |
| BL | 1-1 | 2-1 | 2-2 | |
| MAP | | | | |
| CORRESPONDING MAP | MP1-1 (FIG. 14) | MP2-1 (FIG. 16) | MP2-2 (FIG. 17) | UMP (FIG. 18) |

FIG. 51

| |
|---|
| EVENT NOTICE DESTINATION REGISTRATION |
| NOTICE CONDITION TAG |
| NOTICE CONDITION = (PAPER EMPTY \| PAPER JAM) |
| EVENT NOTICE DESTINATION TAG |
| EVENT NOTICE DESTINATION = TCP IP : 192.1.2.16:1025 |

FIG. 52

| NOTICE CONDITION | NOTICE PROTOCOL | NOTICE DESTINATION NETWORK ADDRESS |
|---|---|---|
| PAPER EMPTY \| PAPER JAM | TCP/IP | 192.1.2.16:1025 |
| PAPER EMPTY | TCP/IP | 192.1.2.18:2040 |
| | | | ns
SYSTEM FOR SEARCHING DEVICE ON NETWORK

BACKGROUND OF THE INVENTION

1. Field of the Invention

The present invention relates to a system for searching a device on network, particularly to a device search system for displaying a searched device and position information.

2. Related Background Art

There has been heretofore provided, for example, a so-called directory service such as lightweight directory access protocol (LDAP) to efficiently find various resources such as a printer, a server, and a scanner (hereinafter also referred to as "device") on network, and utilize the resources. The directory service functions as a telephone directory concerning so-called network, and is a service for managing and providing various information.

Therefore, by utilizing the directory service and searching the device connected to the network, a list of network addresses of usable devices on the network can be obtained.

Additionally, the definitions in the LDAP are described in RFC1777 issued by IETF.

However, in the synopsis list, the comprehensible position information of the device for use cannot be obtained.

For example, for a network printer as the device, a system has been demanded in which a user is notified of device hierarchical location information such as "the place of the printer closest to one's place on the floor" and "the place of the printer able to output a color image in the building" in a comprehensible manner.

Furthermore, another system has been demanded in which when an information processor on network is requested to execute printing or the like, the user is notified of information such as the place of the printer for the printing, the end state of one's requested printing, and the occurrence of errors such as jam and sheet shortage in the comprehensible manner.

Additionally, further system has been demanded in which the user is notified of the current status of the device (operation status, error occurrence status, and the like) in the comprehensible manner.

SUMMARY OF THE INVENTION

Wherefore, the present invention has been developed to remove the above-described disadvantage, and an object thereof is to provide a system in which the position, attribute, and status of a desired device on network can visually easily be grasped, so that the efficiency of operation using various devices on network can be enhanced.

According to a first aspect of the present invention, there is provided a network system comprising an information processor and a device. The device stores hierarchical position information indicating the position of the device hierarchically and icon data indicating the device, and transmits the stored hierarchical position information and the icon data to the information processor. Moreover, the information processor displays the received icon data together with the device position based on the received hierarchical position information.

Other objects and characteristics of the present invention will be apparent from the following description and drawings.

BRIEF DESCRIPTION OF THE DRAWINGS

FIG. 6 is an explanatory diagram showing device information registered to the server by the device.

FIG. 7 is an explanatory diagram showing device information managed by the server.

FIG. 11 is an explanatory view of one example of input state on the search condition input screen.

FIG. 12 is an explanatory view of a search condition formula for search information inputted in the search condition input screen.

FIG. 13 is an explanatory view showing one example of a search result transmitted to the client from the server.

FIG. 35 is a bit map list for the respective hierarchies to be searched in a second embodiment.

FIG. 51 is an explanatory view of an event notice destination registration request issued to the device from the client in a fourth embodiment.

FIG. 52 is a diagram of an event notice destination management table held by the device in the fourth embodiment.

DETAILED DESCRIPTION OF THE PREFERRED EMBODIMENTS

Embodiments of the present invention will be described hereinafter in detail with reference to the drawings.

First Embodiment

Figure 1:
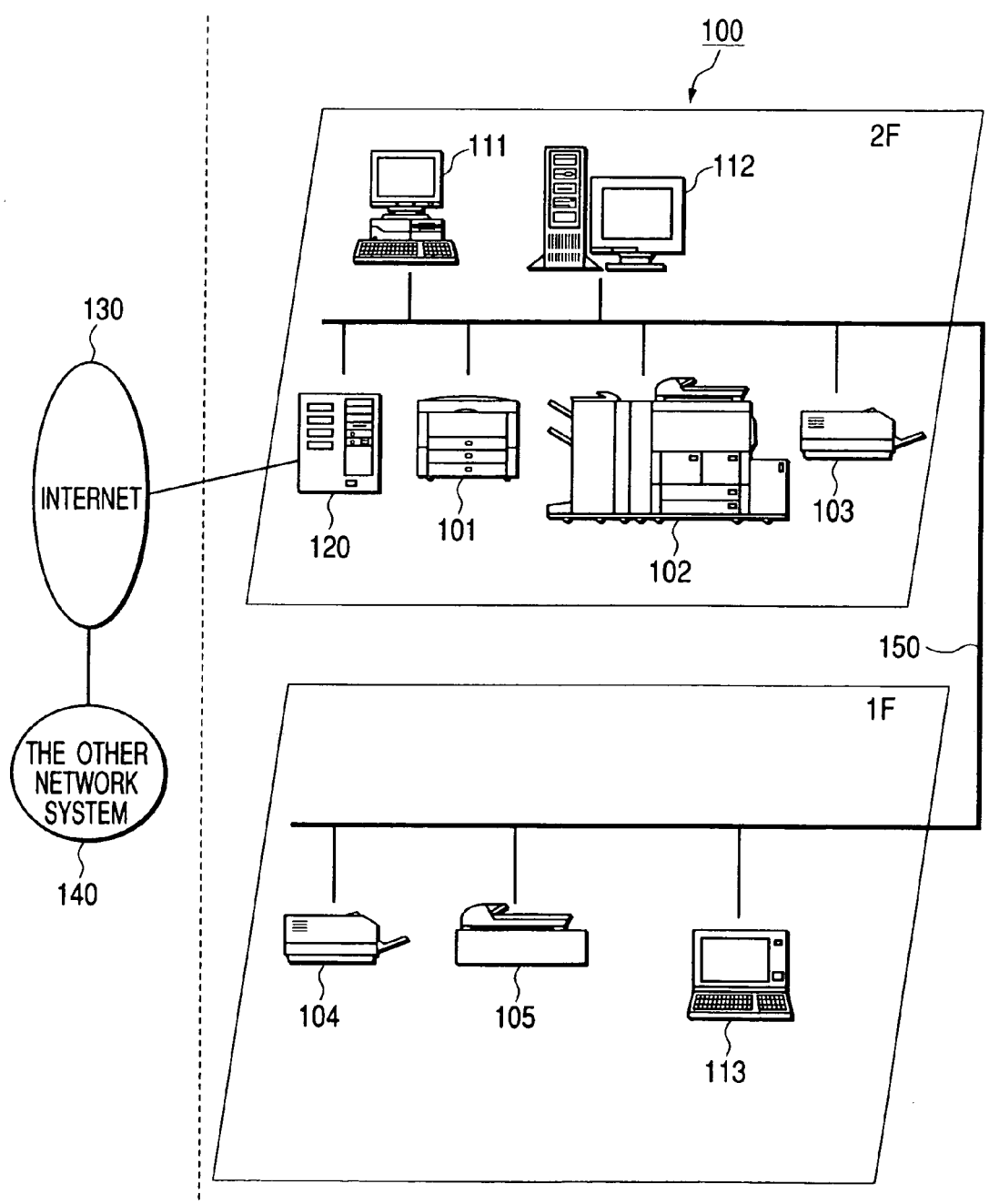
FIG. 1 is a block diagram showing the configuration of a network system to which the present invention is applied in a first embodiment.

The present invention is applied, for example, to a network system 100 shown in FIG. 1.

The network system 100 is used on office floors including first and second floors, and as shown in FIG. 1, personal computers (PC) 111, 113 as information processors on a client side, a personal computer (PC) 112 as the information processor on a server side, and various devices 101 to 105 are connected via LAN 150 so that communication can be performed with one another.

The PCs (client devices, hereinafter referred to simply as "client") 111, 113 as the information processors on the client side can execute the program of a network device search client in the present embodiment, issue inquiry information on the device satisfying desired conditions to the PC (server device, hereinafter referred to simply as "server") 112 as the server side information processor, and display the obtained search result.

Moreover, in this example, the client 111 is constituted of a desktop PC, and the client 113 is constituted of a notebook-size PC.

The server 112 is a PC able to execute the program of a network device search server in the present embodiment, and stores information on the devices 101 to 105 of the present system 100, and various devices (network device) of another network system 140, receives a device search inquiry from the clients 111, 113, and returns the search result.

The PCs used as the clients 111, 113 and server 112 have similar configurations, and operate network device search client software or network device search server software (both hereinafter referred to as "network device search software") by the constitution in FIG. 2.

Figure 2:
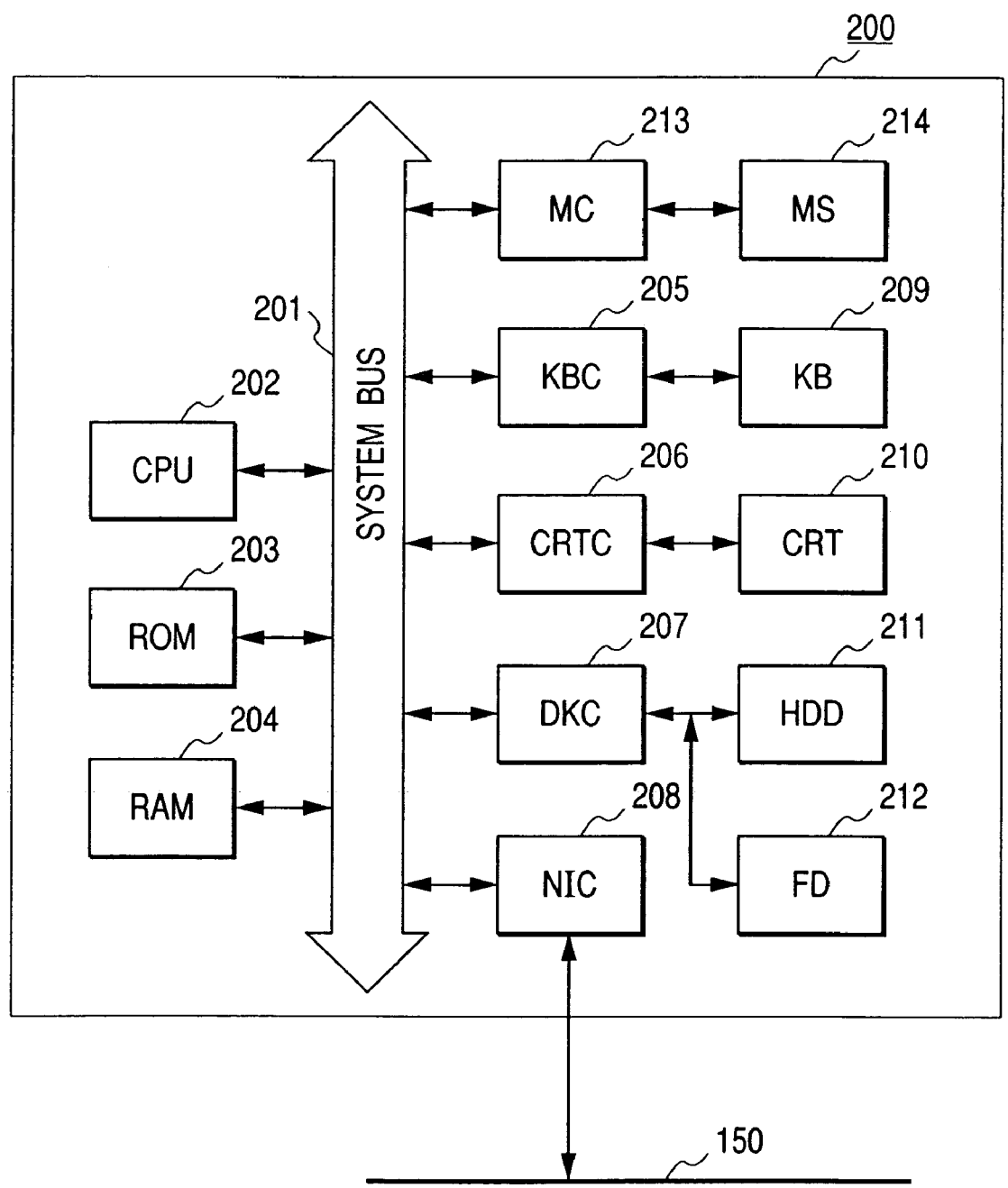
FIG. 2 is a block diagram showing the inner configuration of a personal computer for use as a client or a server in the network system.

Specifically, as shown in FIG. 2, a PC 200 is provided with: a CPU 202 for controlling PC general process; a ROM 203 for storing various programs and data for the process control in the CPU 202; a RAM 204 including the main memory, operation area, and the like of the CPU 202; a mouse (MS) 214; a mouse controller (MC) 213 for controlling an instruction input from the mouse (MS) 214; a keyboard (KB) 209; a keyboard controller (KBC) 205 for controlling the instruction input from the keyboard (KB) 209 and pointing device (not shown); a CRT display 210; a CRT controller (CRTC) 206 for controlling display on the CRT display 210; a hard disk drive (HDD) 211 and floppy disk drive (FDD) 212 for storing various programs and data (boot program, various applications, edition file, user file, network management program, and the like); a disk controller (DKC) 207 for controlling the access with the hard disk drive (HDD) 211 and floppy disk drive (FDD) 212; and a network interface card (NIC) 208 for bidirectionally exchanging data with the devices 101 to 105, other PCs or other network system 140 (see FIG. 1) via LAN 150, and these respective constituting units are interconnected via a system bus 201 so that they can communicate with one another.

Therefore, the network device search software is pre-stored in the ROM 203, hard disk drive (HDD) 211, or FD of the floppy disk drive 212, and is read and executed by the CPU 202, so that the process in the present system 100 described later is realized.

On the other hand, the devices 101 to 105 are constituted of a color printer, a copying machine, and the like.

Here, for example, the device 101 is a color printer (color LBP), and the device 102 is a multi function peripheral (MFP) provided with a copying function and a printer function. Moreover, the devices 103 and 104 are monochromatic printers, and the device 105 is a scanner.

The main configurations of these devices 101 to 105 are similar to one another. For example, as shown in FIG. 3, the device is provided with: a CPU 2302 for controlling a device general process; a ROM 2303 for storing various programs and data for the process control in the CPU 2302; a RAM 2304 including the main memory, operation area, and the like of the CPU 2302; an engine 2309 of a device function (printer function, copy function, or the like); an engine controller (EC) 2305 for controlling the driving of the engine 2309; a panel 2310 for receiving various operation instruction from a user and displaying various information; a panel controller (PC) 2306 for controlling input/output in the panel 2310 and managing the panel 2310; a hard disk drive (HDD) 2211; a disk controller (DKC) 2307 for controlling the access with the hard disk drive (HDD) 2211; a nonvolatile RAM (NVRAM) 2312; and a network interface card (NIC) 2308 for bidirectionally exchanging data with the server 112 and clients 111, 113 (see FIG. 1) via the LAN 150, and these constituting units are interconnected so that they can communication one another via a system bus 2301.

Figure 3:
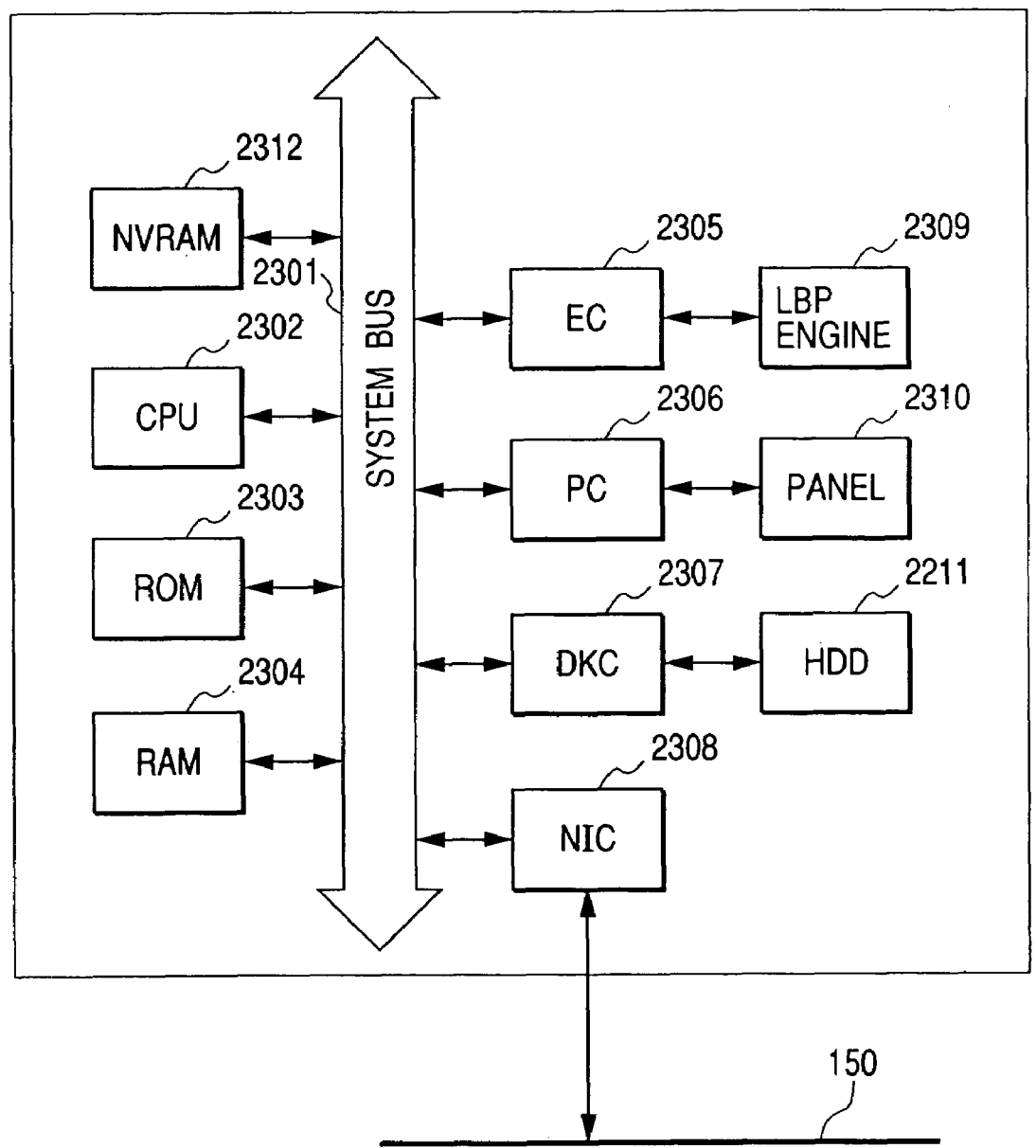
FIG. 3 is a block diagram showing the inner configuration of the device of the network system.

Additionally, when the device shown in FIG. 3 is, for example, the color LBP 101, the engine 2309 serves as an LBP engine for a printer output process or the like, and print data, and the like are temporarily spooled in the hard disk (HDD) 2211 as occasion demands.

In the network system 100, the client 111, server 112, color printer 101, MFP 102, and monochromatic printer 103 are installed on the second floor, and the monochromatic printer 104, scanner 105, and client 113 are installed on the first floor.

Moreover, the network system 100 is connectable to Internet 130 via a fire wall 120, and is also connectable to the other network system 140 via Internet 130.

Additionally, since the client 113 is the notebook-size PC, in FIG. 1 the client is connected to LAN 150 from the first floor, but sometimes disconnected from LAN 150, or connected to LAN 150 from the second floor.

Here, in the present embodiment, based on the device search result returned from the server 112, the clients 111, 113 display a bit map icon (hereinafter referred to simply a "icon") of the object device on the layout bit map corresponding to the position of the object device on the first or second floor, so that the user can visually grasp the place, attribute and current state of the object device. Particularly, the icon of the object device displayed on the layout bit map is changed in accordance with the state of the object device. This is the most characteristic configuration in the present embodiment.

Figure 4:
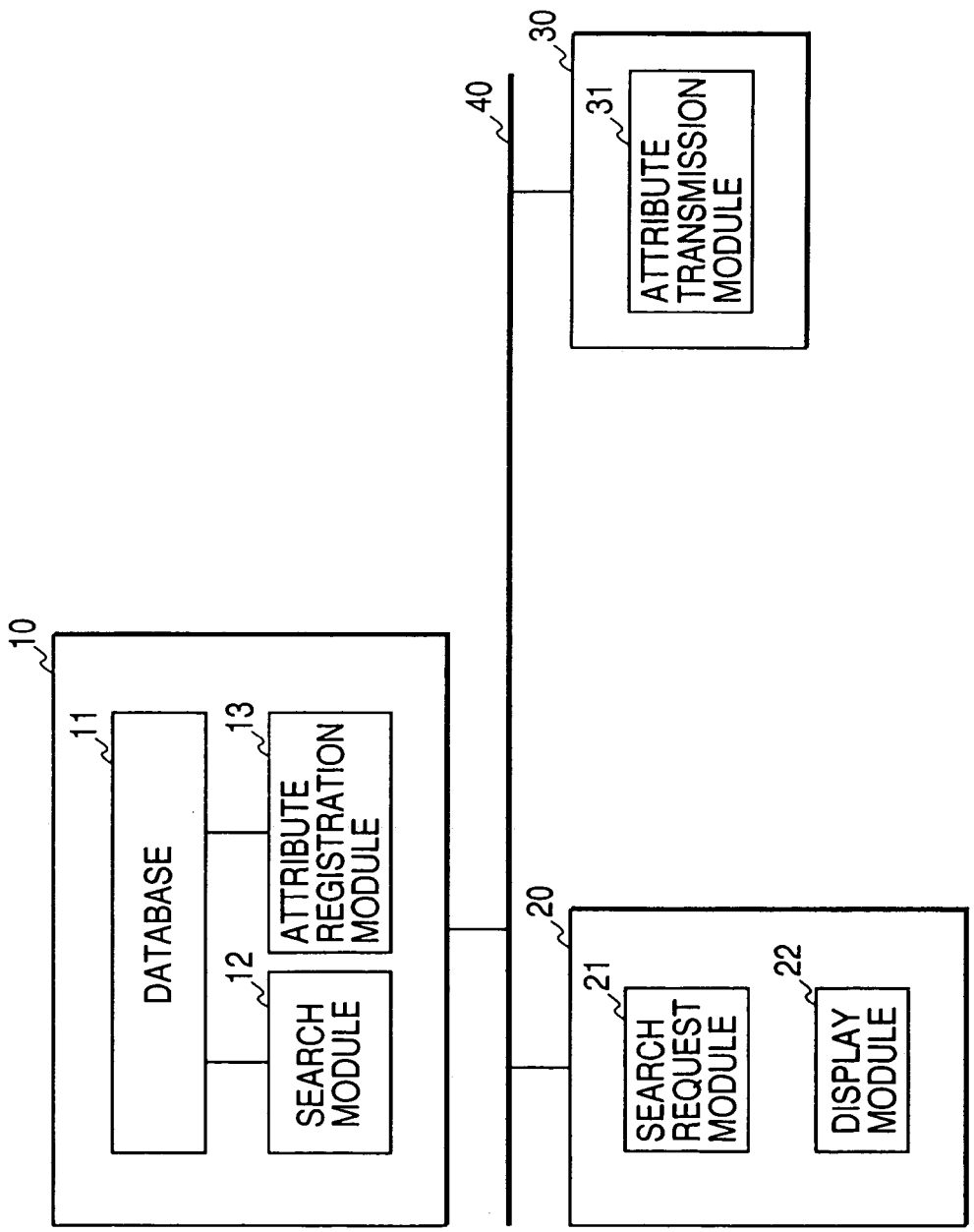
FIG. 4 is a block diagram showing the function of most characteristic configuration of the network system.

For this purpose, the network system 100 includes a functional configuration shown, for example, in FIG. 4.

The functional configuration shown in FIG. 4 is realized by executing predetermined processing programs such as network device search software in the CPU 202, 2302 shown in FIGS. 2 and 3.

As shown in FIG. 4, a client apparatus 20, a device 30, and a server apparatus 10 are disposed on a network 40.

The client apparatus 20 includes: a search request module 21, constituted, for example of a general-purpose computer, for transmitting a desired device search condition to the server apparatus and receiving the result; a display module 22 for visualizing/displaying the received search result; and the like.

The server apparatus 10 functions as a directory server including a database 11 for managing attribute information of the device on the network 40. In the database 11, identification information of the device on the network and various attribute information of the device are registered.

A search module 12 searches the device matching with the condition from the database 11 based on the device search condition received from the client apparatus 20, and transmits the search result to the client apparatus. A device attribute registration module 13 receives the device attribute from the device 30 or the like and registers the attribute in the database 11.

The device 30 is provided with a function of providing the client apparatus 20 with various services, and comprises, for example, a scanner, a printer, or a facsimile machine. A device attribute transmission module 31 transmits its attribute information to the server apparatus 10 to make a registration request.

Additionally, in the example of FIG. 1, the minimum unit of the device search system is shown, and a plurality of client apparatuses and devices are disposed on the network. Moreover, the device search system may be provided with a plurality of server apparatuses.

The configuration and general process of the network system will be described hereinafter in detail.

[Location Information of Device Managed by Server 112]

Figure 5:
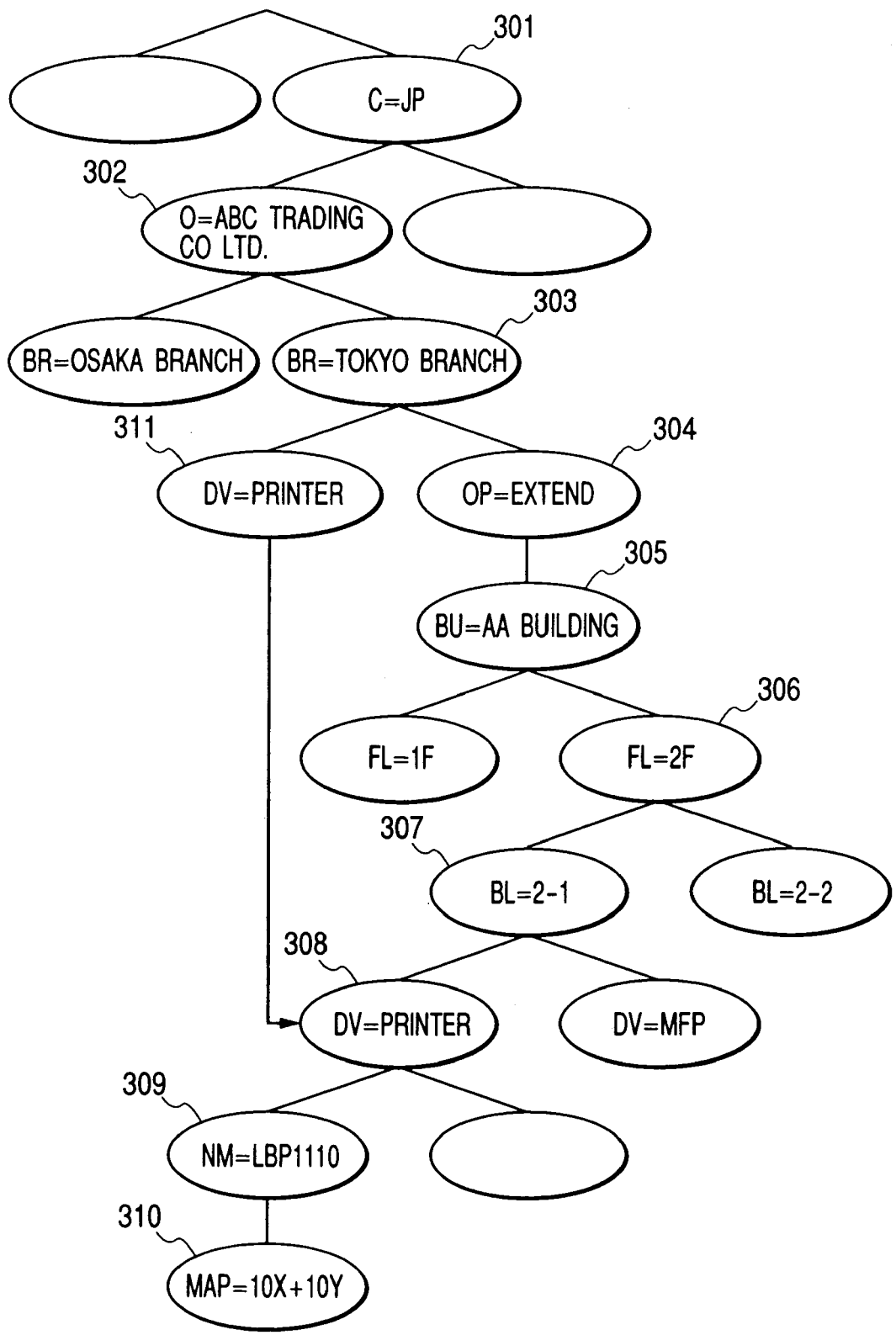
FIG. 5 is an explanatory view of the hierarchical structure of location information of the device managed by the server.

The device location information is managed by the hierarchical structure shown in FIG. 5 by the server 112.

In FIG. 5, the location information of the color LBP 101 shown, for example, by device name (nm) "LBP1110" is designated as follows, as shown by "301", "308":

(C=JP (501), o=ABC Trading Co., Ltd. (502),
BR=Tokyo Branch (503), op=extend (504),
BU=AA Building (505), fl=2F (506),
BL=2-1 (507), dv=printer (508)).

Respective entries C, O, BR, OP, BU, FL, BL, DV, UM, MAP are as follows:

C: country name ("JP" indicates Japan, "US" indicates America, and the like);

O: organization ("ABC Trading Co., Ltd.", "XYZ Products Company", and the like);

BR: branch, affiliate, and the like ("Tokyo Branch", "Osaka Branch", and the like);

OP: the presence of option information ("extend" indicates extension);

BU: building name ("AA Building", "BB Building", and the like);

FL: floor number ("1F", "2F", and the like);

BL: floor block ("1-1", "2-1", and the like);

DV: device ("printer", "MFP", and the like);

UM: device name ("LBP1110", "LBP3310", and the like); and

MAP: coordinates on the device map described later ("10X+10Y", and the like), and the respective entry attributes indicate attribute values of the respective determined ranges (values).

Additionally, the information may be set in the other hierarchy of the option information, or may be of data structure without setting the hierarchy of the option information.

In the present embodiment, by managing the location information of the devices on the network (the devices 101 to 105 of the present system 100 as the search object or other devices of the network system 140) by the hierarchical structure of the location information, the device position is specified, the device desired by the user is displayed by the icon so that the user can easily recognize, and the icon display is changed in accordance with the device state.

When the server 112 manages the location information of the respective devices in accordance with the hierarchical structure of the location information shown in FIG. 5 (hereinafter also referred to as "hierarchical location information"), as described above, the respective devices are turned on, and the information of the respective devices is transmitted to the server 112. For example, the device information is provided with a data format as shown in FIG. 6.

Specifically, each device registers its device information in accordance with the data format shown in FIG. 6 to the server 112 (see FIG. 4).

As shown in FIG. 6, the device information includes location information 902, 903 indicating the device position in accordance with the hierarchical location information shown in FIG. 5, and attribute information 913, 914 indicating the device attribute.

Moreover, a location information TAG 901 is added to the top of the location information 902, 903, a device attribute information TAG 912 is added to the attribute information 913, 914, various information included in the device information can therefore be identified on the reception side (server 112) of the device information.

FIG. 6 shows the device information held by the color LBP 101 of the present system 100 as one example, and the location information 902, 911 is set in the device information. The location information indicates that the color LBP 101 is as follows:

device name NM=LBP 1110;
    coordinate MAP on layout bit map=10X+10Y;
    device DV=printer, and indicates in accordance with the hierarchical location information shown in FIG. 5 that the color LBP 101 exists in a place shown by the following:

block BL of floor on which device is located=2-1;
    floor number FL of the floor=2F;
    building name BU of the floor AA Building;
    presence of option information OP=extend;
    branch name BR=Tokyo Branch;
    organization name O=ABC Trading Co., Ltd.;
    country name C=Japan (JP).

Moreover, as the attribute information 913, 914, color attribute 913 indicating whether or not color input/output is possible, and IP address 914 indicating network address are set, and here "TRUE", that is, "color input/output is possible with the device (color LBP) 101" is set in the color attribute 913.

Therefore, when the above-described device information is given to the server 112 from each device, the server 112 manages the device information of each device by the database as shown in FIG. 7.

In FIG. 7, each row indicates one piece of data on each registered device, that is, tuple, and each line indicates the attribute for each tuple.

In the example of the database shown in FIG. 7, the attribute information (902 to 914) are associated with the respective devices 101 to 105 and stored.

Moreover, there may be provided the attribute information other than the information shown in FIG. 7, such as an attribute indicating the presence/absence of a staple function, an attribute indicating the presence/absence of a double-surface print function, and a general device attribute.

The server 112 searches the device based on the device search request from the clients 111, 113 (device matching with the search condition inputted from the user) from the database shown in FIG. 7.

The device information obtained by the search is returned to the client as a device search request sender.

[Icon Information Held by Device]

Each device stores icon information for various events which possibly occur in the device in a memory unit.

Figure 8:
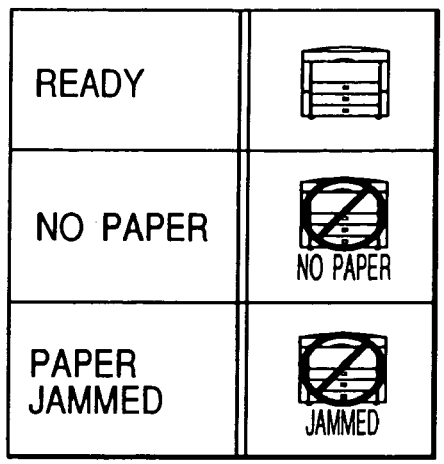
FIG. 8 is an explanatory view showing one example of icon information held by the device (color LBP).

For example, the color LBP 101 holds icon information indicating an operated state (ready), icon information indicating a paper shortage state (no paper), and icon information indicating a jam occurrence state (paper jammed) as shown in FIG. 8.

Figure 9:
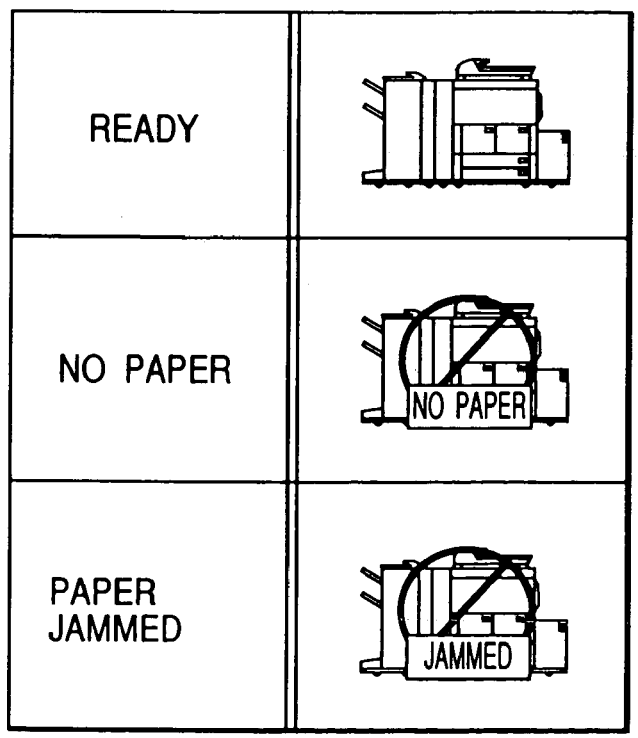
FIG. 9 is an explanatory view showing one example of icon information held by the device (MFP).

Moreover, the MFP 102 holds icon information indicating the operated state (ready), icon information indicating the paper shortage state (no paper), and icon information indicating the jam occurrence state (paper jammed) as shown in FIG. 9.

Other devices also hold various icon information indicating the device states.

Moreover, the device reads the icon information indicating the current device state from the memory unit in response to the request from the client, and transmits the information to the client as the request sender.

Additionally, the icon information held by the device is not limited to the icon information shown in FIGS. 8 and 9, and for example, an icon indicating that the device is being used, and an icon indicating occurrence of a read/write error in the hard disk or the like mounted on the device may be used. Moreover, when the device is FAX, an icon indicating that transmission/reception is being performed may be provided. Furthermore, when an icon indicating authentication error occurrence is displayed/outputted on MAP on the client side, the client side can promptly recognize the authentication error occurrence in the device, and it is therefore possible to monitor unfair invasion from a remote plate.

[Search Condition Input Operation by Clients 111, 113]

Figure 10:
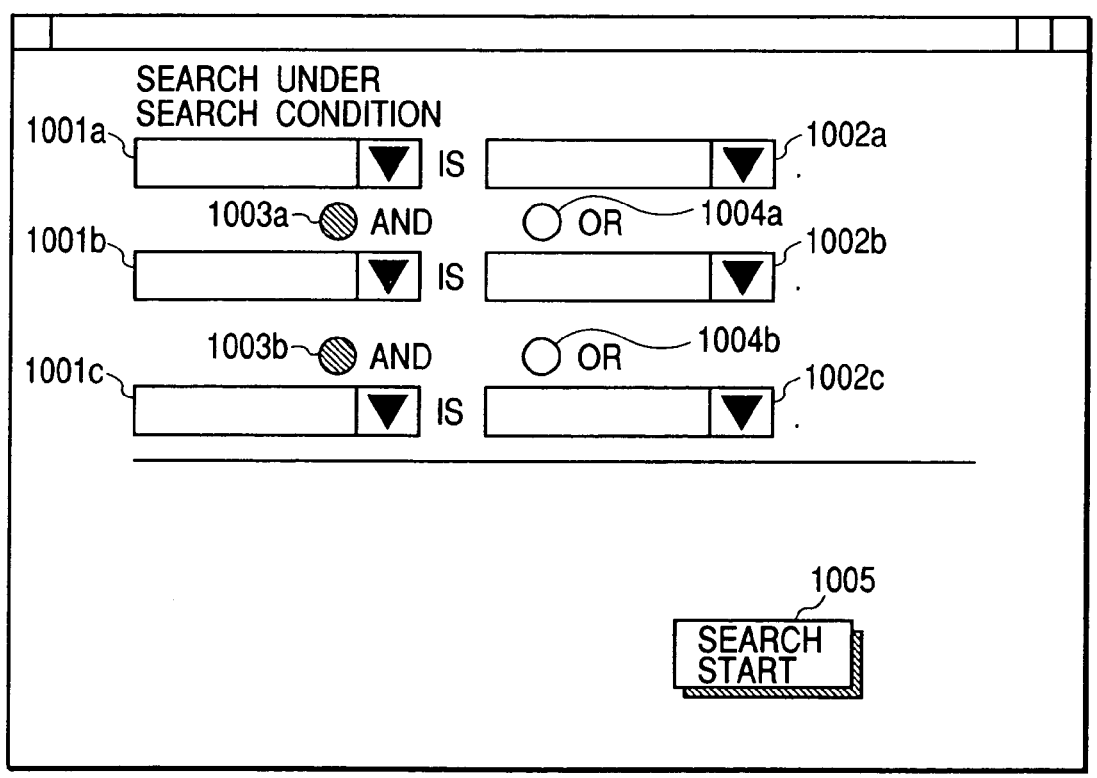
FIG. 10 is an explanatory view of a search condition input screen of the client.

FIG. 10 shows a screen in which the user inputs the condition for searching the desired device in the clients 111, 113 (search condition input screen). This screen is displayed, for example, on the CRT 210, and various search conditions can be inputted by the mouse 214 and keyboard 209 (see FIG. 2).

In FIG. 10, in input columns shown by "1001*a*", "1001*b*", "1001*c*", the entry of the search object device is inputted. Here, the entry can directly be inputted, but by operating the right end of the input column (black triangular mark), and displaying a pull-down menu, the desired entry can be selected from the menu.

In input columns shown by "1002*a*", "1002*b*", "1002*c*", the attribute information corresponding to the entries inputted in the input columns 1001*a*, 1001*b*, 1001*c* are inputted.

For these input columns 1002*a*, 1002*b*, 1002*c*, similarly to the input columns 1001*a*, 1001*b*, 1001*c*, both the direct input and the input from the pull-down menu are possible. For example, when the entry inputted in the input column 1001*a* is "device", by operating the right end of the input column 1002*a*, the pull-down menu of the printer, MFP, and scanner as the device attribute information is displayed. Therefore, when the desired attribute information is selected from the pull-down menu, the selected attribute information is set in the input column 1002*a*.

In columns shown by "1003*a*" and "1003*b*", the correlating of the respective information inputted in the input columns 1001*a* to 1001*c*, 1002*a* to 1002*c* by "AND" is designated, and in columns shown by "1004*a*" and "1004*b*", the correlating of the respective information inputted in the input columns 1001*a* to 1001*c*, 1002*a* to 1002*c* by "OR" is designated.

Section "1005" indicates a search start button. By operating the search start button 1005, the device search in the server 112 is started based on the input to the input columns 1001*a* to 1001*c*, 1002*a* to 1002*c*, and the designation by the designation column 1003*a*, 1003*b*, 1004*a*, 1004*b*.

FIG. 11 shows an input example in the search condition input screen shown in FIG. 10.

In FIG. 11, "the search object device is a printer", and "the printer can perform color output" are inputted as the search condition.

Additionally, as the search conditions, installation place conditions such as "a printer whose installation floor is the second floor" (see the input columns 1001*c* and 1002*c* of FIG. 11) and other various conditions can further be added. Here, for the simplicity of description, "the search object device is a printer" and "the printer can perform color output" are described as the inputted search condition.

For example, in the client 111, as shown in FIG. 11, when the search condition of "the search object device is a printer" and "the printer can perform color output" is inputted, and the search start button 1005 is depressed in the input state, the search condition is obtained as a search condition formula as shown in FIG. 12. As shown in FIG. 12, as the search condition formula, for the search condition shown in FIG. 11, the printer is indicated as the search object device (DV) and the condition that the color output is possible (TRUE) is indicated.

Subsequently, in response to depression of the search start button 1005, the search condition inputted in the input screen is transmitted to the server 112 as the search request.

According to the search condition input example shown in FIG. 11, the search condition shown in FIG. 12 is issued to the server 112.

On the other hand, the server 112 having received the search condition shown in FIG. 12 searches the device matching with the search condition formula of FIG. 12 from a database 900. For example, the device as the printer able to perform color output is searched from the devices 101 to 105 shown in the table. Here, only the device 101 (color LBP) corresponds to this.

Therefore, the server 112 returns the device information (location information, attribute information, and icon information) of the color LBP 101 shown in FIG. 13 as the search result to the client 111.

Additionally, when a plurality of devices matching with the search condition formula from the client are searched, the search result shown in FIG. 13 is constituted of a plurality of pieces of device information.

[Search Result Display in Clients 111, 113]

First, each of the clients 111, 113 holds MAP information (layout bit map information) of various places where the device shown by the hierarchical structure of the location information shown in FIG. 5 would be installed in the memory unit.

FIGS. 14 to 18 show MAP information of the first and second floors in C=Japan (JP), O=ABC Trading Co., Ltd., BR=Tokyo Branch, BU=AA Building as one example of MAP information held by the client.

Here, for the MAP information, actual desk arrangement and partition state on each floor are preset as a bit map.

Figure 14:
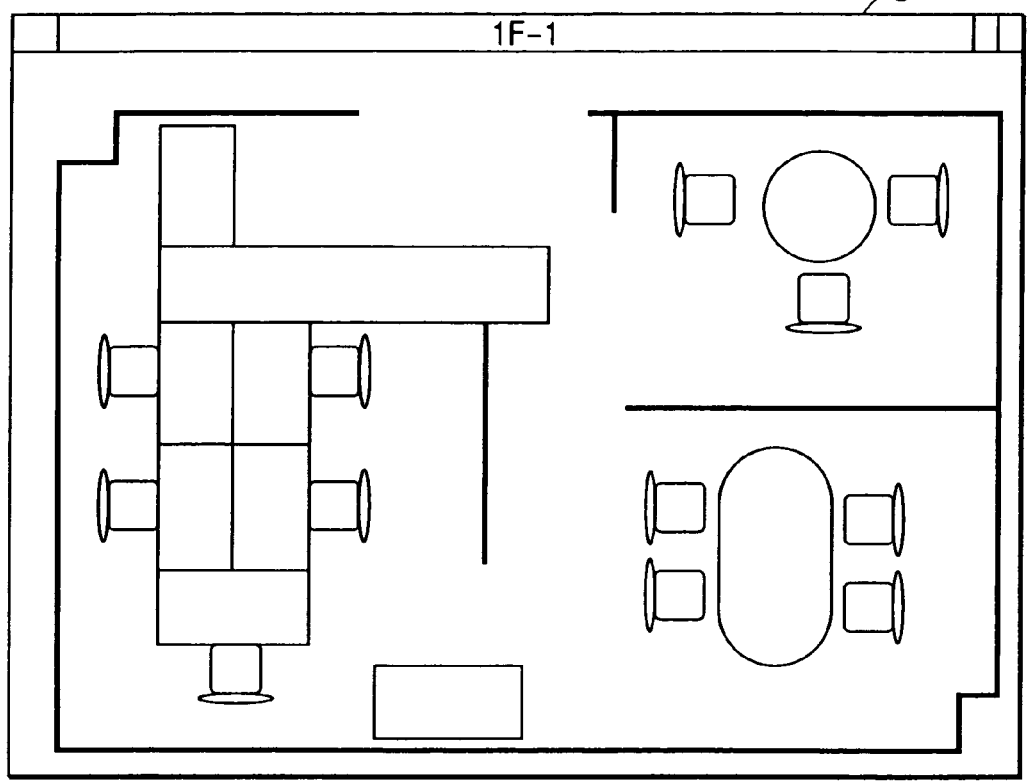
FIG. 14 is an explanatory view of a first example of layout bit map information held by the client.
Figure 15:
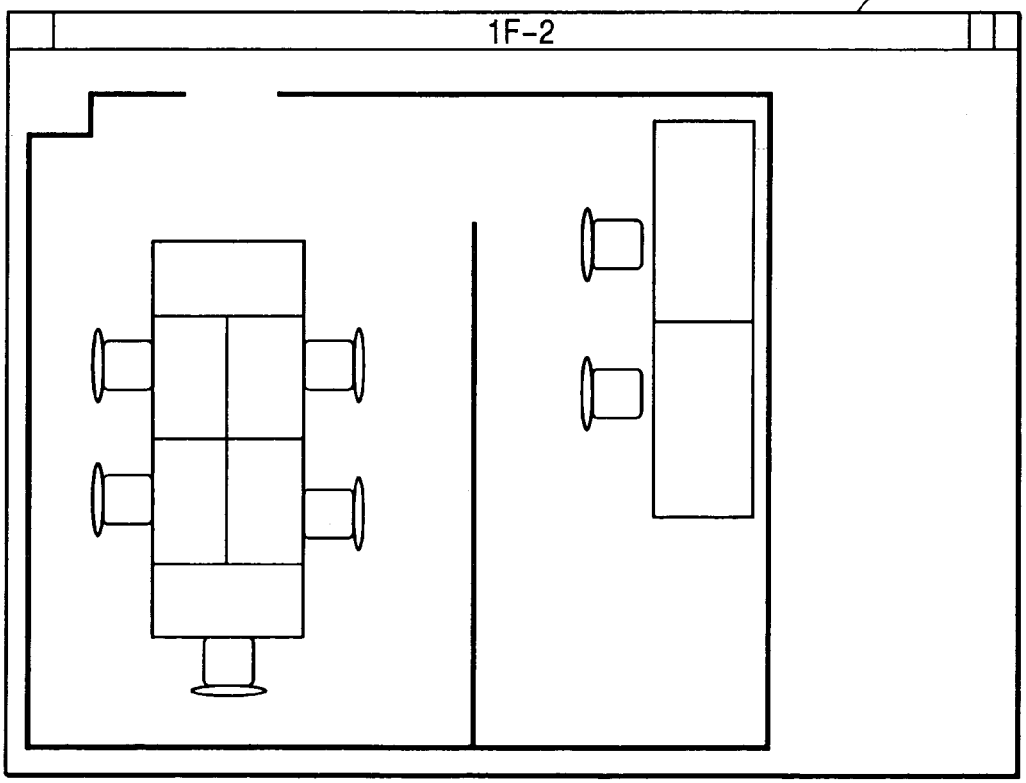
FIG. 15 is an explanatory view of a second example of layout bit map information held by the client.
Figure 16:
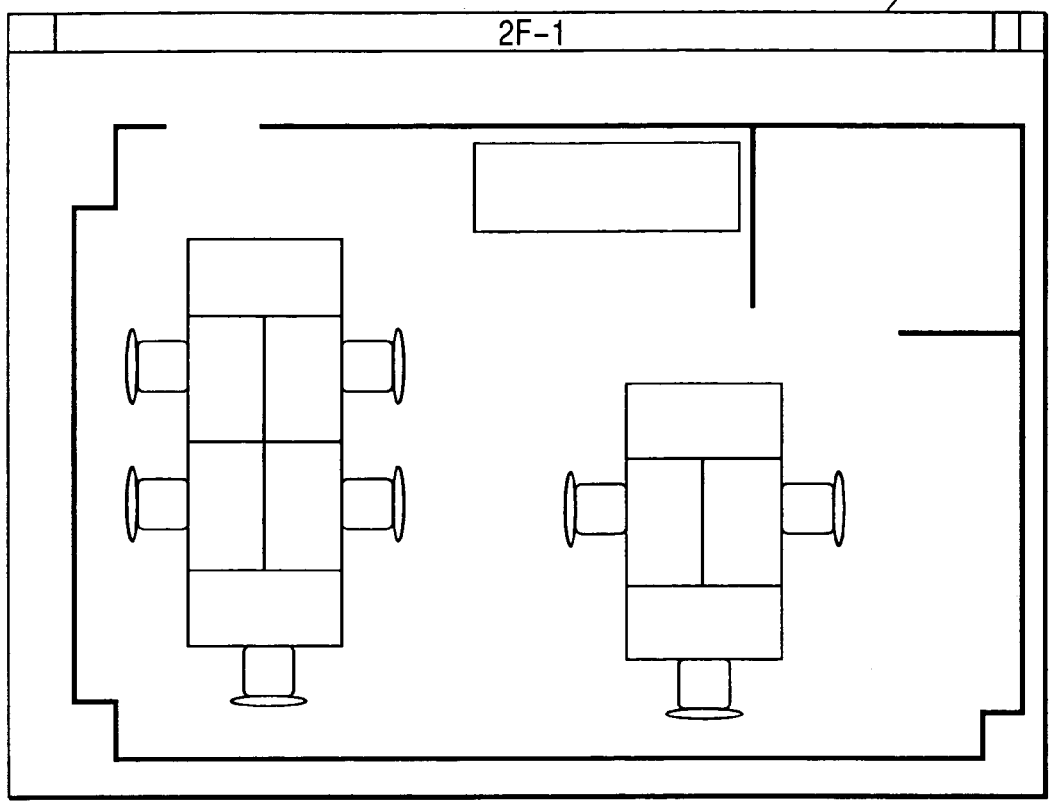
FIG. 16 is an explanatory view of a third example of layout bit map information held by the client.
Figure 17:
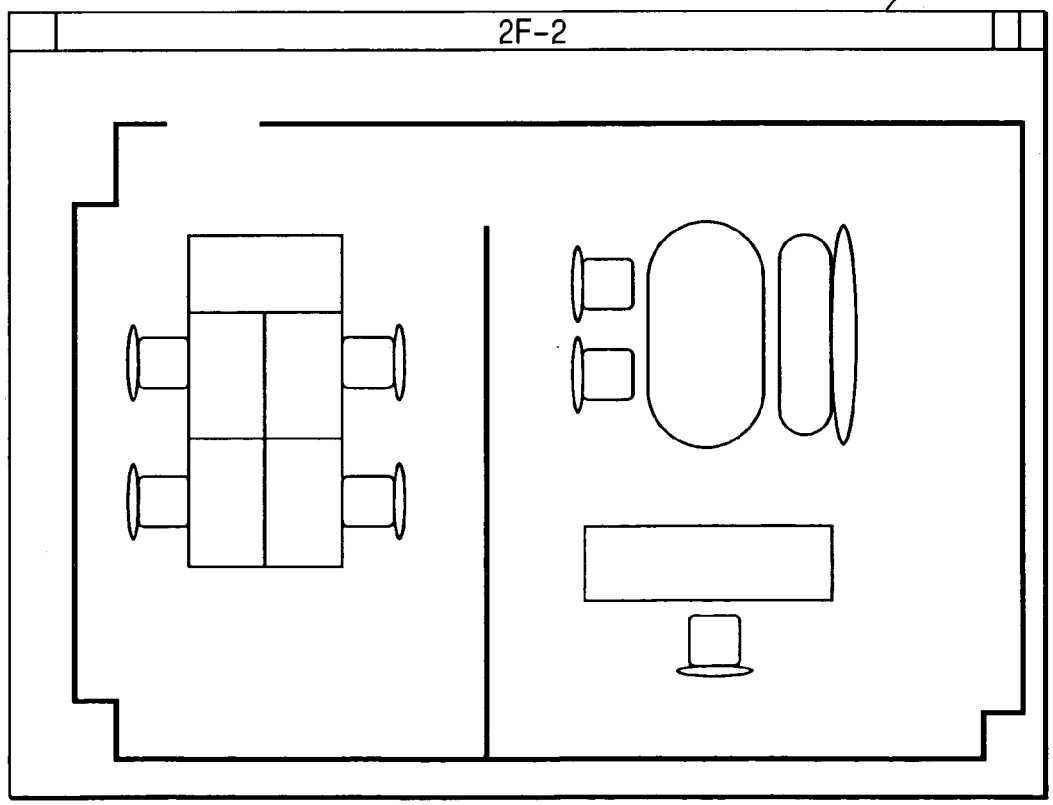
FIG. 17 is an explanatory view of a fourth example of layout bit map information held by the client.

FIG. 14 shows MAP information MP1-1 of one block of the first floor, FIG. 15 shows MAP information MP1-2 of two blocks of the first floor, FIG. 16 shows MAP information MP2-1 of one block of the second floor, and FIG. 17 shows MAP information MP2-2 of two blocks of the second floor.

Figure 18:
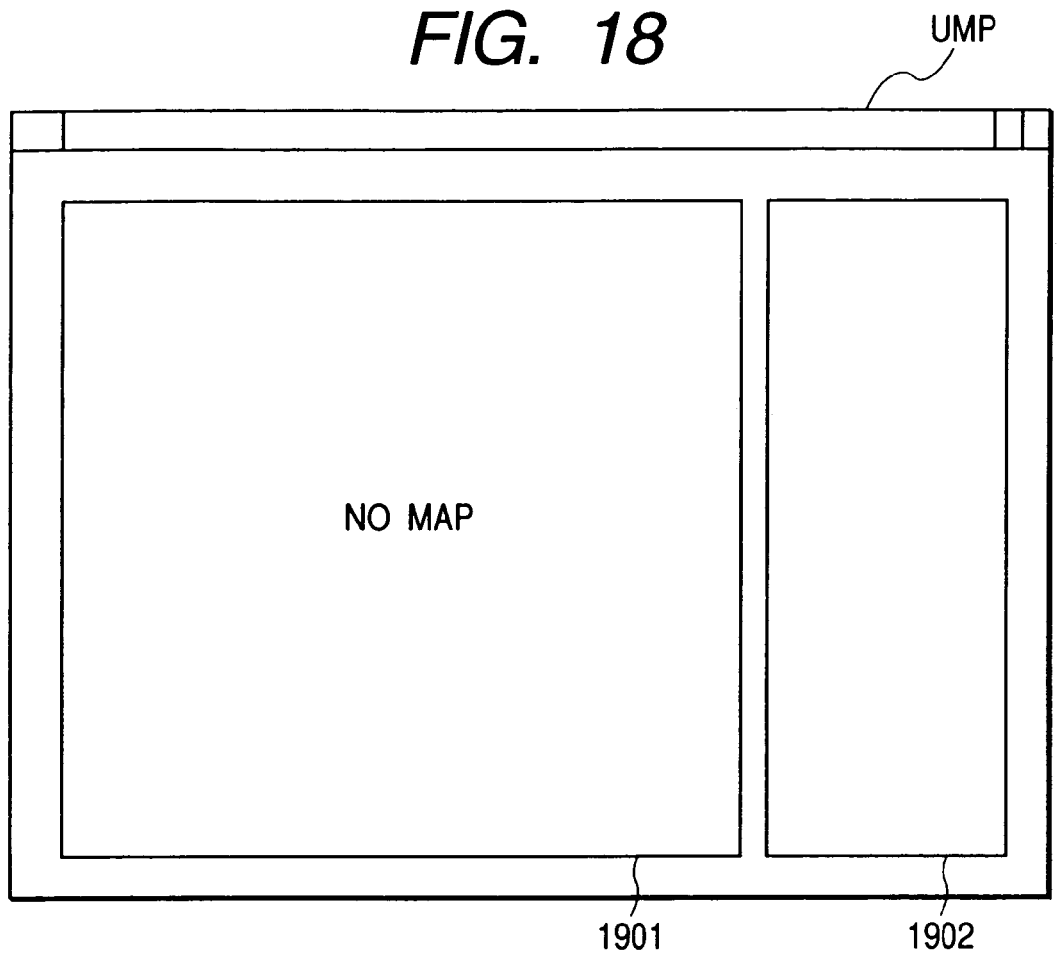
FIG. 18 is an explanatory view of one example of layout bit map information (UMP) held by the client.

FIG. 18 shows MAP (unknown MAP) information UMP for use, for example, when the MAP information corresponding to the location information included in the search result from the server 112 is held in the memory unit (there is no attribute value), or when there is no location information in the device information of the device searched by the server 112 (the device holds no location information), or when the corresponding device is not searched by the server 112.

In the MAP information UMP shown in FIG. 18, a message indicating that there is no MAP information is displayed in column "1901", and column "1902" displays an icon of a device able to be searched in the server 112 but including no location information, or an icon of the search object device unable to be searched.

Figure 19:
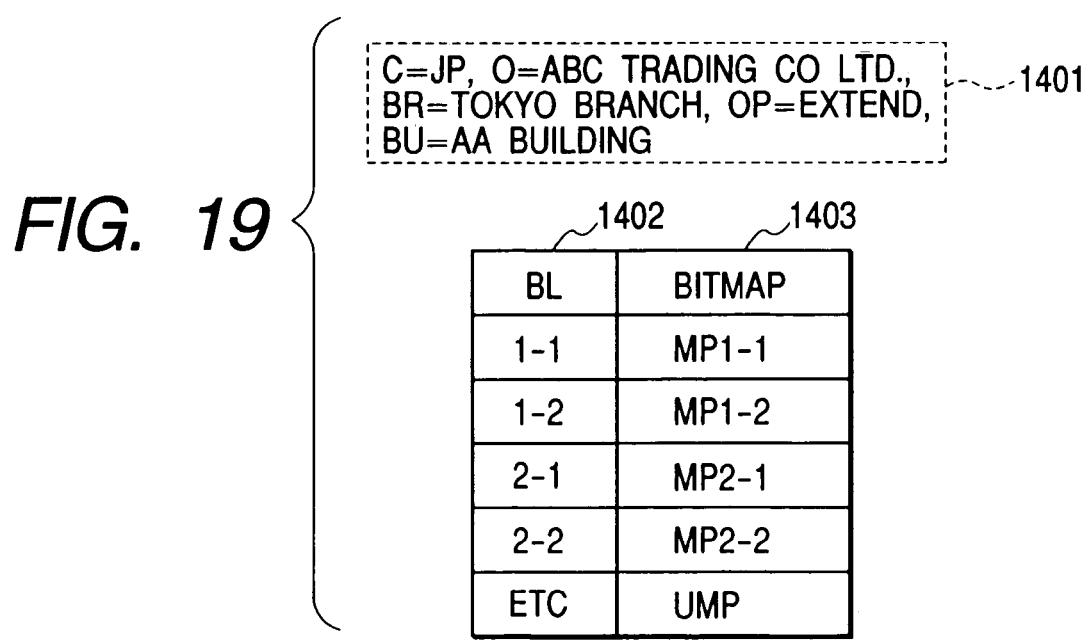
FIG. 19 is an explanatory view of table information for associating and managing the layout bit map information with the location information.
Figure 20:
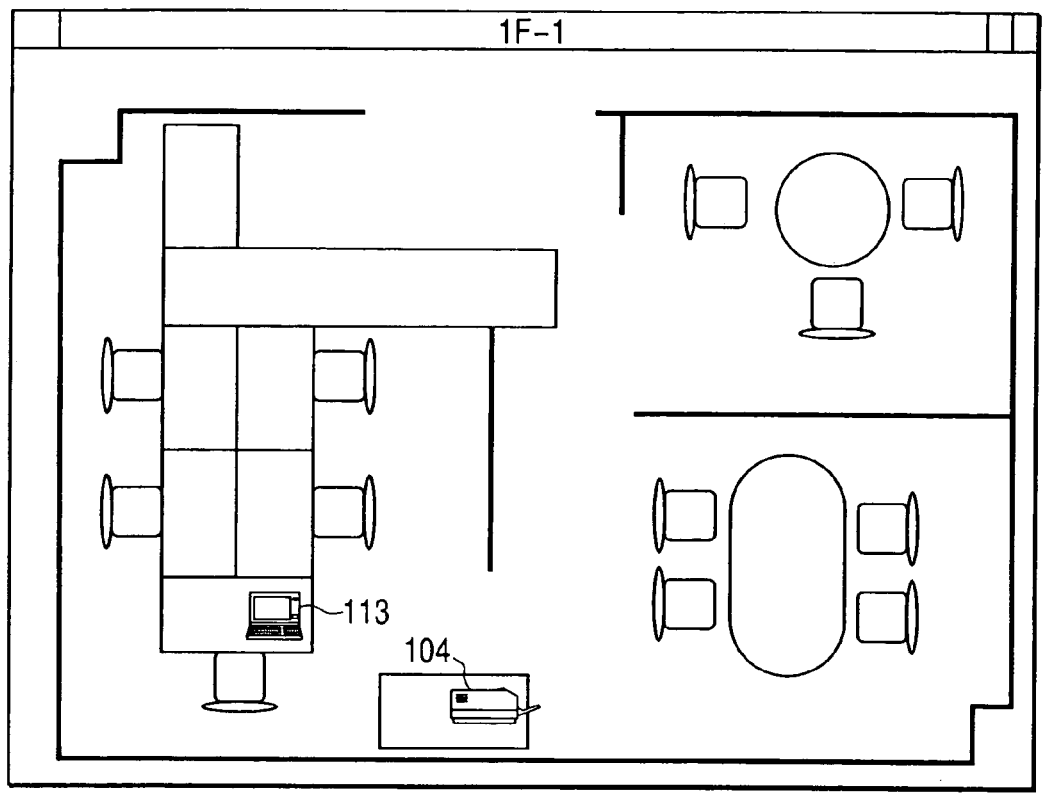
FIG. 20 is an explanatory view of the first example when an icon indicating the device is displayed on the layout bit map in the client.
Figure 21:
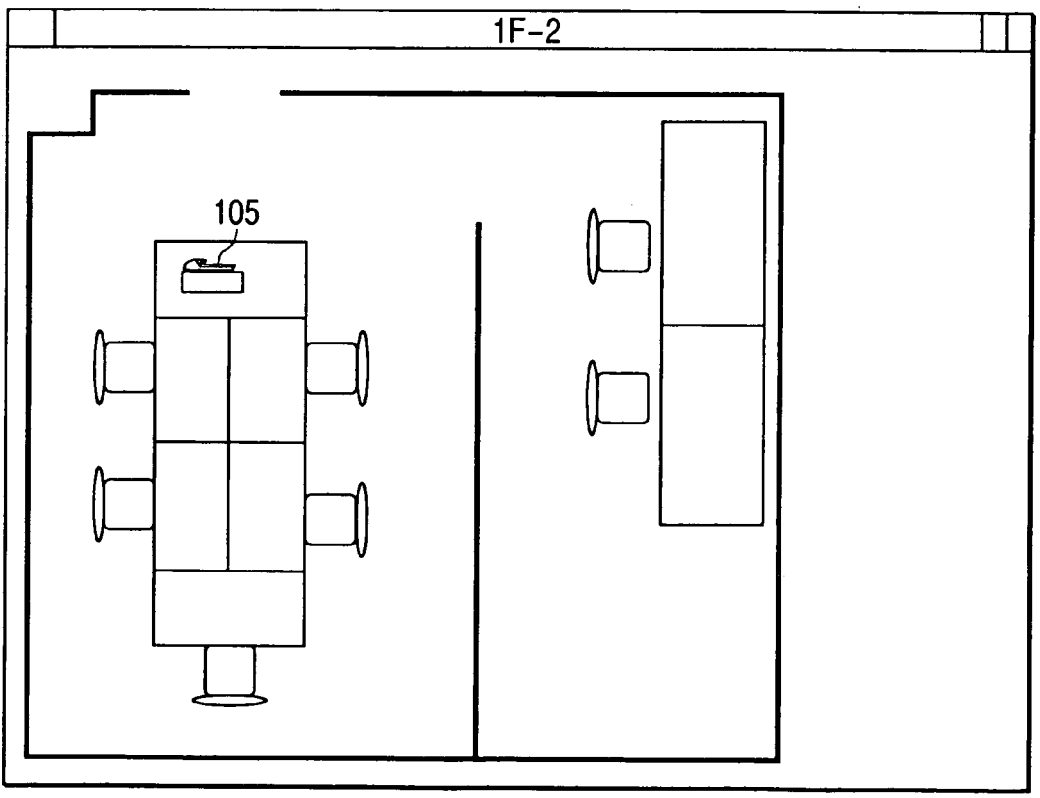
FIG. 21 is an explanatory view of the second example when the icon indicating the device is displayed on the layout bit map in the client.

For the MAP information as shown in FIGS. 14 to 18, the correspondence with each block (BL) is managed as a MAP correspondence table as shown in FIG. 19. In the example of FIG. 19, the MAP information is managed for the blocks 1-1, 2-2 of the first and second floors, and the like.

Therefore, when location information "1401" in FIG. 19 is designated, the MAP information is selected based on the information of the floor (FL) hierarchy and block (BL) hierarchy and the MAP correspondence table of FIG. 19, and displayed on the CRT 210.

In this case, on the MAP displayed on the CRT 210, the received icon information is overlapped and displayed in the position shown by the location information (coordinate information ("10X+10Y") on the MAP) of the search result from the server 112.

Therefore, the position, block, and floor of the desired device can visually be indicated.

FIGS. 20 to 23 show one example of screen display on the above-described CRT 210.

As shown in FIGS. 20 to 23, the installation position, block, and floor of the desired device, server and client can securely be grasped at one glance.

[Search Result Display in Clients 111, 113]

The client 111 periodically issues a device status obtaining request to the device, obtains the status information from the device, and reflects the information on the icon display on the MAP.

In response to the device status obtaining request from the client 111, the device transmits the icon information corresponding to the status to be notified to the client 111.

The client 111 overlaps and displays the icon information received from the device on the MAP, and the device status is comprehensibly notified to the user.

Specifically, for example, when the search result is transmitted from the server 112, the client 111 periodically transmits the device status obtaining request to the device indicated by the search result, for example, to the color LBP 101.

The color LBP 101 responds to the reception of the device status obtaining request, recognizes its current state, obtains the icon information corresponding to the current state, and transmits the obtained icon information to the client 111.

Figure 24:
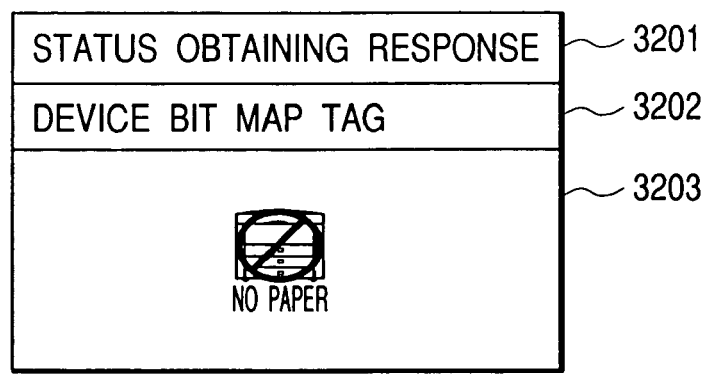
FIG. 24 is an explanatory view of a response to a device status obtaining request issued to the device from the client.

Here, the device status obtaining request (request packet) follows a format shown, for example, in FIG. 24. Specifically, the response packet to the device status obtaining request includes a field 3201 indicating that the content of the present packet is the response to the device status obtaining request, a tag field 3201 indicating that the subsequent information is icon information indicative of the current device status, and a field 3203 for storing the icon information indicating the current device status.

When the client 111 receives the response packet shown in FIG. 24, the icon information included in the response packet is overlapped and displayed in the predetermined position on the MAP as described above. Since the display of the icon information is executed for every reception of the response packet, as a result, the corresponding icon information is displayed on the MAP in accordance with the current status of the color LBP 101.

Additionally, the display of the icon information may be executed only when there is a change in the periodically received icon information.

Therefore, for example, when the color LBP 101 changes from the operated state to the jam occurrence state, the icon information on the MAP in the client 111 is also changed from the icon information indicating the operated state to the icon information indicating the jam occurrence state and displayed. Consequently, not only the position, block and floor of the device but also the current status of the device can constantly and explicitly be indicated.

Figure 25:
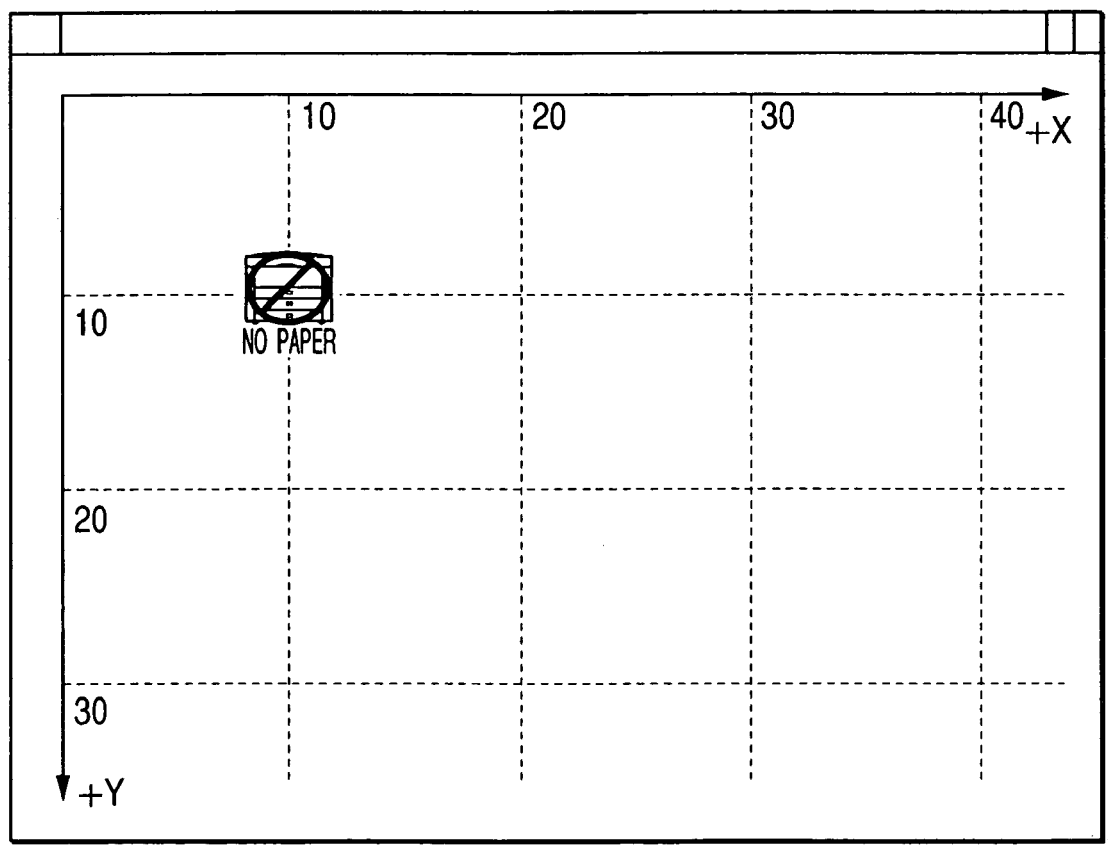
FIG. 25 is an explanatory view of a processing for overlapping and displaying the icon indicating the device in a predetermined position on the layout bit map.

FIG. 25 shows the arrangement of the icon on the MAP when the icon is overlapped and displayed on the MAP in accordance with the device status as described above.

Here, as a result of search in the server 112, it is indicated that the color LBP 101 installed in block 2-1 on the second floor is searched, the coordinate MAP on the MAP included in the location information is "10X+10Y" and that paper shortage occurs in the color LBP 101.

Figure 26:
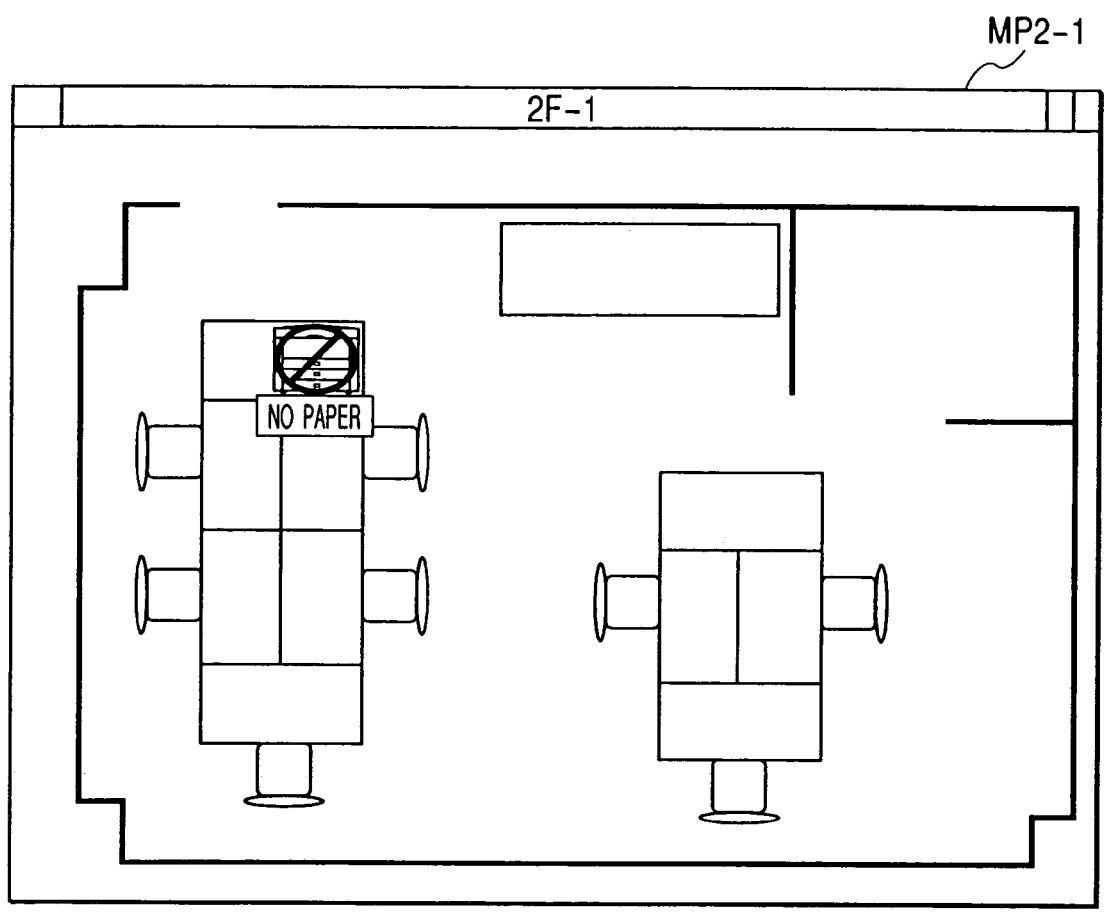
FIG. 26 is an explanatory view showing that the icon on the layout bit map is changed in accordance with the device status.
Figure 27:
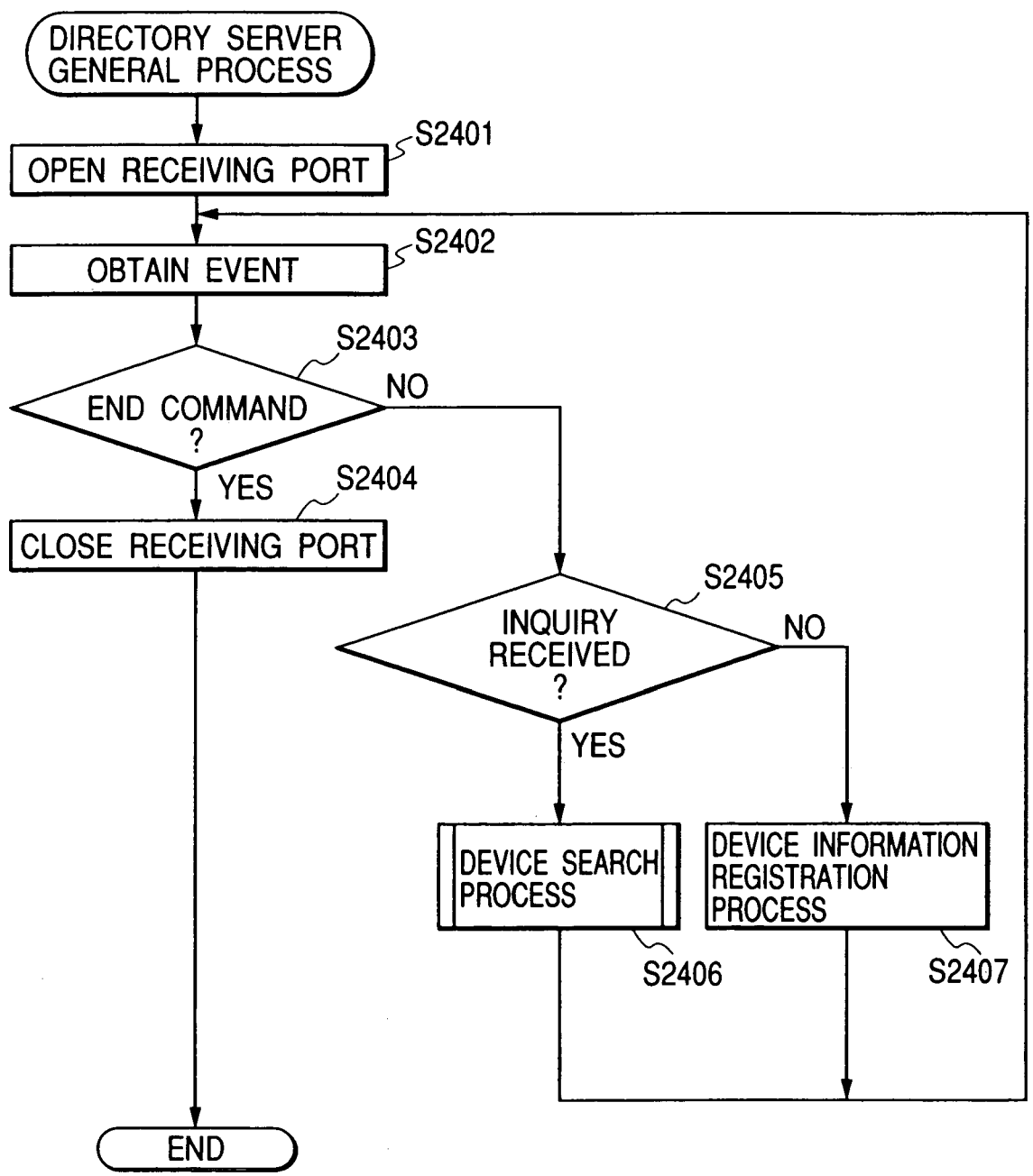
FIG. 27 is a flowchart showing the general process of the server.
Figure 28:
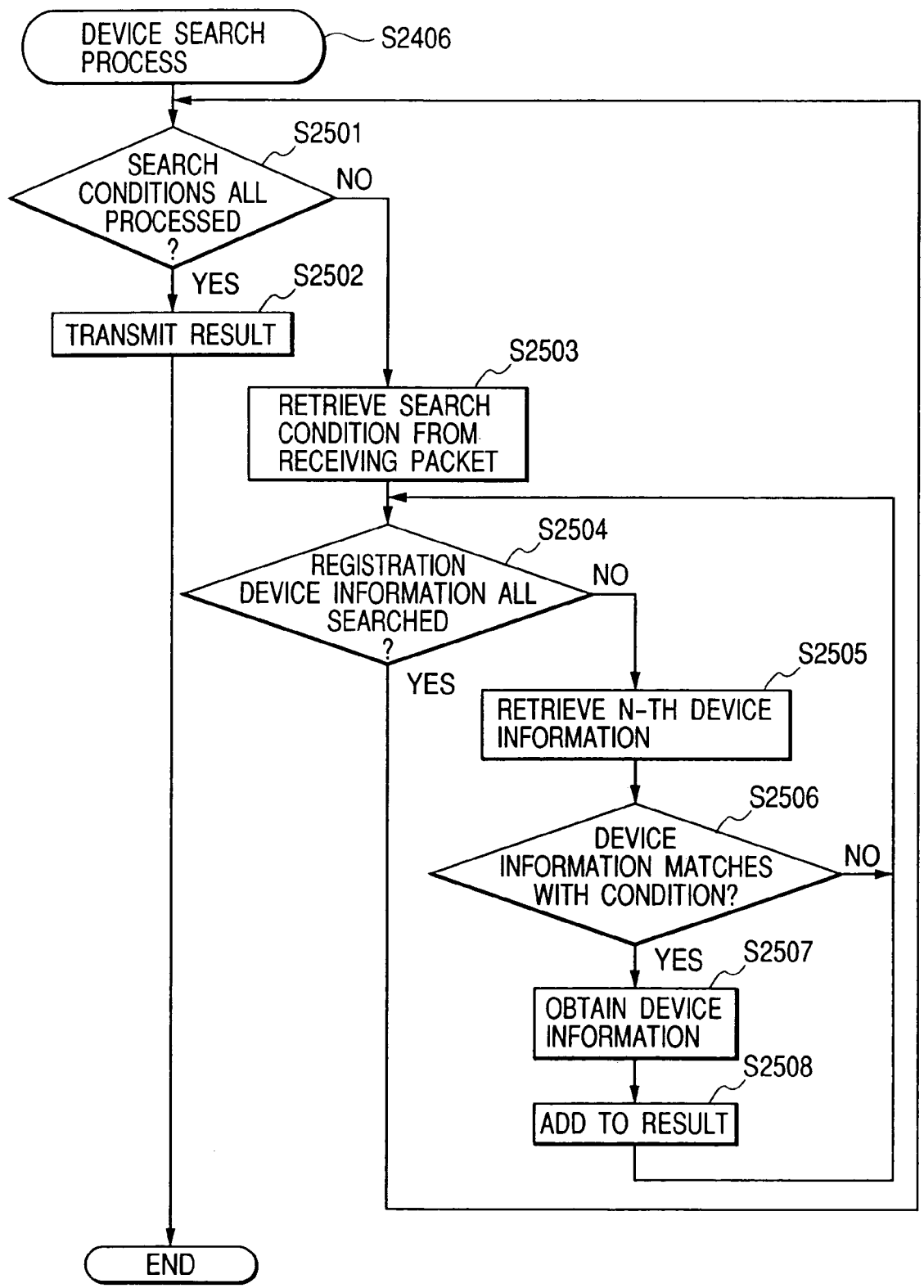
FIG. 28 is a flowchart showing a device search processing in the server general process.

Therefore, the icon indicating the paper shortage state as shown in FIG. 25 is disposed, overlapped and displayed in the coordinate 10X+10Y on MAP information MP2-1 shown in FIG. 16 (MAP information of block 2-1 of the second floor). As a result, the display screen of the CRT 210 obtains a screen state as shown in FIG. 26.

As described above, for example, when the screen of FIG. 22 is displayed, it is seen that the color LBP 101 is installed in the vicinity of a table near an entrance of block 2-1 on the 2F floor. When the screen of FIG. 26 is displayed, it is seen that the color LBP 101 is installed in the vicinity of the table near the entrance of the block 2-1 on the 2F floor, but that the color LBP 101 is unusable because of paper shortage. Moreover, when the icon of the color LBP 101 on the screen of FIG. 22 changes to the icon on the screen of FIG. 26, it can be known beforehand that paper shortage occurs in the color LBP 101.

[Processing Flow in Server 112, Clients 111, 113, and Devices]

FIGS. 27 to 34 are flowcharts showing the above-described processes in the server 112, clients 111, 113, and respective devices.

Additionally, the flowcharts of FIGS. 27 to 34 show processing programs executed in the server 112, clients 111, 113, and respective devices.

Specifically, by executing the processing programs shown in the flowcharts of FIGS. 27 to 34 by the CPU (201, 2302) of the server 112, clients 111, 113, and respective devices, the following process by the function shown in FIG. 4 is realized.

(1) Registration Process of Device Location Information: See FIG. 33

Here, for the simplicity of description, among various devices, the color LBP 101 is noted, and the location information registration process will be described.

The color LBP 101 holds the device information including the location and attribute information in the nonvolatile RAM 2312.

When power turns on, the CPU 2302 performs connection to the server 112 (step S3001).

When the connection to the server 112 is established, the device information held in the nonvolatile RAM 2312 is read, and registered in the server 112 in accordance with the format shown in FIG. 6 (step S3002).

After finishing the registration to the server 112, the CPU 2302 releases the connection to the server 112 (step S3003).

After the power turns on, the respective devices including the color LBP 101 register the device information of the devices themselves to the server 112.

(2) General Process of Server 112: See FIG. 27

The processing program executed in the server 112 is constituted of an event drive type program. When a certain event occurs, the event is analyzed, and the corresponding processing is executed.

Additionally, for the simplicity of the description, among various processings executed in the server 112, mainly the device search processing and device information registration processing will be described.

In the server 112, when power turns on, the CPU 202 opens a receiving port (step S2401), and obtains the event (step S2402).

Subsequently, the CPU 202 judges whether the event obtained in the step S2402 is an end command or not (step S2403).

As a result of judgment in the step S2403, when the obtained event is the end command, the CPU 202 closes the receiving port opened in the step S2401 (step S2404), and ends the present processing.

As a result of judgment in the step S2403, when the obtained event is not the end command, the CPU 202 judges whether the obtained event is a device search request from the client (inquiry request) or not (step S2405).

As a result of judgment of step S2403, when the obtained event is the device search request, the CPU 202 executes a device search processing (step S2406). Thereafter, the CPU returns to the step S2402, and repeatedly executes the subsequent processing steps.

Additionally, the processing of step S2406 will be described later in detail.

As a result of judgment of the step S2403, when the obtained event is not the device search request, the CPU 202 judges that the event is a registration request of device information from the device, and executes a device information registration processing (step S2407).

Specifically, the device information from each device is registered to the database shown in FIG. 7. This table information is stored in the hard disk drive (HDD) 211.

(2-1) Device Search Processing (Step S2406): See FIG. 28

The present processing is repeatedly executed until the processing for all the search conditions included in the device search request from the client (here, client 111) is ended with respect to the device information registered in FIG. 7.

In the server 112, the CPU 202 first judges whether the processing from step S2503 by a device search unit 413 is completely executed with respect to all search conditions in the device search request (received packet) from the client 111 (step S2501).

As a result of judgment of the step S2501, when the processing for all the search conditions is ended, the device information of the searched device (location information, attribute information) is returned as the search result to the client 111 as the device search request issuer (step S2502).

After ending the processing of the present step S2502, the present processing ends.

On the other hand, as a result of judgment of the step S2501, when the processing for all the search conditions is not ended, the search condition included in the device search request is successively retrieved (step S2503).

Subsequently, in order to obtain the device information satisfying the search condition retrieved in the step S2503, it is judged whether or not all the device information registered in FIG. 7 is searched (step S2504).

As a result of judgment of the step S2504, when the search for all the device information is ended, the CPU 202 having recognized this returns to the step S2501 to execute a processing for the next search condition, and repeatedly executes the subsequent processing steps.

As a result of judgment of the step S2504, when the search for all the device information is not ended, the device information indicated by counter n for successively searching all the device information is obtained from the device information registered in FIG. 7 (step S2505).

It is judged whether or not the device information obtained in the step S2505 matches with the object search condition (step S2506).

As a result of judgment of the step S2506, when the object device information fails to match with the object search condition, the CPU counts up the counter n, then returns to the step S2504 to execute a processing for the next device information, and repeatedly executes the subsequent processing step.

As a result of judgment of the step S2506, when the object device information matches with the object search condition, the device information is obtained from the database (step S2507), and the information is added to the search result to be transmitted to the client 111 in the step S2502 (step S2508).

Thereafter, the CPU counts up the counter n, then returns to the step S2504 to execute the processing for the next device information, and repeatedly executes the subsequent processing step.

Additionally, in the step S2508, the device information satisfying the individual search conditions can be obtained as the search result. However, for example, when the individual search conditions are interconnected via "AND", among the device information obtained in the step S2508, only the device information satisfying all the search conditions is finally transmitted to the client 111.

(3) General Process of Clients 111, 113: See FIG. 29

The processing program executed in the clients 111, 113 is constituted of the event drive type program. When a certain event occurs, the event is analyzed, and the corresponding processing is executed.

Moreover, the clients 111, 113 start a status obtaining process (program) as occasion demands. The status obtaining process is a process of periodically inquiring of the current device status with respect to the found device as the device search result returned from the server 112 (device status obtaining request), and displaying the icon indicating the device status in an appropriate position on the layout bit map in accordance with the device status information transmitted as the response (polling notice system).

Additionally, for the simplicity of description, here the client 111 is noted, and the process thereof will be described.

In the client 111, the CPU 202 obtains the event (step S2601).

Subsequently, the CPU 202 judges whether or not the event obtained in the step S2601 is an end command (step S2602).

As a result of judgment in the step S2602, when the obtained event is the end command, the CPU 202 ends the present processing.

As a result of judgment in the step S2602, when the obtained event is not the end command, the CPU 202 judges whether the obtained event is a device search command from the user or not (step S2603).

The device search command is generated by inputting the search condition by the user from the search condition input screen shown in FIG. 10, and operating (clicking) the search start button 1005.

As a result of judgment of step S2603, when the obtained event is the device search command, the CPU 202 executes a device search request issue processing including a processing for issuing the device search request to the server 112 (step S2604).

Thereafter, the CPU 202 returns to the step S2061, and repeatedly executes the subsequent processing steps.

Additionally, the processing of step S2604 will be described later in detail.

As a result of judgment of the step S2603, when the obtained event is not the device search command, the CPU 202 judges whether or not the obtained event is a search result from the server 112 (the result of the device search request in the step S2604: see FIG. 13) (step S2605).

As a result of judgment of the step S2605, when the obtained event is the search result, the CPU 202 executes a search result processing including a processing of displaying the search result on the CRT 210, a processing of obtaining the device status, a processing of changing the icon on the MAP displayed on the CRT 210, and the like (step S2606).

Thereafter, the CPU 202 returns to the step S2061, and repeatedly executes the subsequent processing steps.

Additionally, the processing of the step S2606 will be described later in detail.

As a result of judgment of the step S2605, when the obtained event is not the search result, that is, when the obtained event is not any one of the end command, device search command, and device search result, the CPU 202 executes a processing corresponding to the obtained event (step S2607).

Thereafter, the CPU 202 returns to the step S2061, and repeatedly executes the subsequent processing steps.

(3-1) Device Search Request Issue Processing (Step S2604): See FIG. 30

First, the search condition inputted from the user is obtained from the search condition input screen shown in FIG. 10 (step S2701).

Subsequently, the search condition obtained in the step S2701 is converted to the form of a search condition formula shown in FIG. 12, a search request packet including the search condition formula is generated, and a device search request is issued to the server 112 (step S2702).

Additionally, when the search condition formula obtained in the step S2702 is stored in the hard disk drive 211, and used for the next search, the re-input of the search condition from the user can be omitted.

(3-2) Search Result Processing (Step S2606): See FIG. 31

It is first judged according to the search result from the server 112 whether or not one or more devices are found (step S2801).

As a result of judgment of the step S2801, when the device is not found, a message indicating that is displayed on the CRT 210 (step S2804).

Thereafter, the present processing ends.

As a result of judgment of the step S2801, when the device is found, the search result is held in the hard disk drive (HDD) 211 (step S2802). Therefore, for example, the search result shown in FIG. 13 is stored in the hard disk drive (HDD) 211.

Thereafter, with respect to the respective search results saved in the hard disk drive (HDD) 211, the following status obtaining process is executed (step S2803).

Thereafter, the present processing ends.

(3-2-1) Status Obtaining Process (Step S2803): See FIG. 32

The present process is a program for obtaining the device status at a certain constant interval, and displaying the icon in accordance with the device status on the MAP.

When the present process is executed, the CPU 202 first judges with respect to all the search results held in the hard disk drive (HDD) 211 by the step S2802 (see FIG. 31) whether or not the processing from step S2902 is executed (step S2901).

As a result of judgment of the step S2901, when the processing for all the search results is completely executed, the CPU 202 starts a polling timer (inner timer or the like) to obtain the device status at the certain interval (step S2913).

Thereafter, the CPU waits for a time-out event of the polling timer (step S2914). In this state, when the time-out event of the polling timer is generated, the CPU returns to the step S2901, and executes the subsequent processing steps again.

As a result of judgment of the step S2901, when the processing for all the search results is not executed, the processing from the next S2902 is executed.

Specifically, first the device information for one device is obtained from the unprocessed search result in the hard disk drive (HDD) 211 (step S2902).

Subsequently, IP address of the device information obtained in the step S2901 is used as the address, and the device status obtaining request is transmitted (step S2903).

For example, with the processing for the device information shown in FIG. 13, since the IP address is "192.1.2.1", the device status obtaining request packet is transmitted to this address.

Thereafter, the CPU waits for a response to the device status obtaining request packet shown in FIG. 24 from the device corresponding to the address of the device status obtaining request packet.

When the response packet is received from the device of the address of the device status obtaining request (the device corresponding to the device information obtained in the step S2902) (step S2904), the icon information (see FIG. 24) included in the response packet is obtained (step S2905).

Subsequently, it is judged whether or not the MAP information corresponding to the information (see FIG. 13) indicated by "BL" of the device information obtained in the step S2902 is held by MAP correspondence table shown in FIG. 19 (step S2906).

Concretely, by referring to the MAP correspondence table shown by "1402" and "1403" of FIG. 19, and judging whether or not the MAP information corresponding to C, O, BR, OP, BU, BL information shown by "1401" of FIG. 19 exists, it is judged whether or not MAP display is possible.

Additionally, here, when the location information in the device information includes the respective information shown by "1401" of FIG. 19, it is judged that the MAP display is possible.

As a result of judgment of the step S2906, when the MAP display is possible, it is judged whether or not the MAP is displayed on the CRT 210 now (step S2907).

As a result of judgment of the step S2907, when MAP is being displayed on the CRT 210, the icon obtained in the step S2905 is overlapped and displayed in the position indicated by coordinate information MAP of the device information on the MAP (step S2909).

Therefore, for example, with the processing for the device information shown in FIG. 13, since the BL information is "2-1", MAP information MP2-1 shown in FIG. 16 is displayed as MAP, and the icon indicating the current status of the device of the object device information is displayed in the position indicated by the coordinate information MAP (=10X+10Y) on the MAP. Specifically, when the device of the object device information is the color LBP 101, and the color LBP 101 is now in the paper shortage occurrence state, on the CRT 210, the screen of the icon indicating that the color LBP 101 is in the paper shortage occurrence state is displayed.

Thereafter, the CPU returns to the step S2901 to execute the processing for the next search result, and repeatedly executes the subsequent processing step.

As a result of judgment of the step S2907, when the MAP corresponding to the CRT 210 is not displayed, the MAP is displayed on the CRT 210 (step S2908).

Thereafter, the CPU advances to the step S2909, and executes a processing for overlapping and displaying the icon on the MAP.

As a result of judgment of the step S2906, when MAP display is not possible, it is judged whether or not unknown MAP information shown in FIG. 18 is now displayed on the CRT 210 (step S2910).

As a result of judgment of the step S2910, when the unknown MAP is displayed on the CRT 210, the icon obtained in the step S2905 is displayed in a device column (column "2902" of FIG. 16) on the unknown MAP. As a result, the icon of the device whose location information is unregistered is displayed in the device column on the unknown MAP.

Thereafter, the CPU returns to the step S2901 to execute the processing for the next search result, and repeatedly executes the subsequent processing step.

As a result of judgment of the step S2910, when the unknown MAP is not displayed on the CRT 210, the unknown MAP is displayed on the CRT 210 (step S2911).

Thereafter, the CPU advances to the step S2912, and executes a processing for displaying the icon in the icon column of the MAP.

(4) Response Process to Device Status Obtaining Request of Device: See FIG. 34

Here, for the simplicity of description, among various devices the color LBP 101 is noted, and the response process to the device status obtaining request (device status response process) will be described.

In the color LBP 101, when device power turns on, the CPU 2302 first opens the receiving port to receive the device status obtaining request from the clients 111, 113, and is ready for reception (step S3101).

By the processing of the step S3101, the device status obtaining request from a certain client (here, client 111) is received (step S3102), the status of the device (color LBP 101) is examined, and the icon information to be notified to the client 111 is determined (step S3103). For example, when the paper shortage occurs in the color LBP 101, among various icon information held in the memory unit, the icon information indicating "paper shortage" is determined as the icon information to be notified to the client 111.

Subsequently, by the icon information determined in the step S3103, in accordance with the format as shown in FIG. 24, the response packet to the device status obtaining request from the client 111 is generated (step S3104), and transmitted to the client 111 (step S3105).

Thereafter, the CPU returns to the step S3102, and waits for reception of the device status obtaining request from the client.

As described above, in the present embodiment, when in the clients 111, 113, the position information of the device matching with the search condition designated by the user is obtained, and the device icon is displayed on the MAP, the user can easily understand the device and position.

Particularly, in the present embodiment, since the icon on the MAP is changed in accordance with the device status (operating, paper shortage, paper jammed, no toner, door open, and the like) obtained by the communication with the device corresponding to the icon on the MAP by the polling system, the user can visually and easily know the device status. Therefore, the user can efficiently select and use the usable device.

Moreover, in the present embodiment, since in the clients 111, 113, the icon information (device bit map icon information) indicating the device status is directly obtained from the device during the device status obtaining request (during reception of the response), it is unnecessary to hold beforehand the icon information indicating various statuses of the device in the server 112 and clients 111, 113. This can prevent the memory resources of the server 112 and clients 111, 113 from being consumed. Moreover, when a large number of clients are present, it is unnecessary to install the icon information in the respective clients. Therefore, a user's burden on the client side can be lightened, and the device in the unknown status effectively fails to be displayed.

Second Embodiment

Here, a form provided with a layout bit map for each hierarchy of the location information (position information) of the hierarchical structure as shown in FIG. 5 will be described.

First, in the above-described first embodiment, as shown in FIG. 19, as the layout bit map, there are five layout bit maps in total: respective block (BL) bit maps (MP1-2, MP1-2, MP2-1, MP2-2); and unknown bit map UMP.

On the other hand, in the second embodiment, each hierarchy is provided with the layout bit map. For this case, a display method on the client side will be described hereinafter.

Additionally, the display method of the present embodiment includes the above-described client display method.

FIG. 35 is a diagram showing a bit map list corresponding to each hierarchy to be searched (hereinafter referred to as "bit map correspondence list").

A list shown below the bit map correspondence list corresponds to management information of MAP information shown in FIG. 19.

In the present embodiment, the icon information (device bit map icon) is displayed based on the attribute information right subordinate to the attribute of the hierarchy to be searched. The hierarchical relation is shows in FIG. 5.

For example, when all the devices are searched on the search condition of "BU=AA Building", the right subordinate attribute FL (see FIG. 5) is used as the position information for displaying the icon of the device, and displayed on the layout bit map.

First a processing of displaying the search result on the client side will be described.

For example, when all the devices in ABC Trading Co., Ltd. are searched, the user on the client side (client 111) selects and inputs "company name (O)" in the input column 1001a of the search item from the pull-down menu on the search condition input screen shown in FIG. 10, inputs "ABC Trading Co., Ltd." in the input column 1002a of the attribute value, and depresses the search start button 1005 to execute the device search.

Then the client 111 having executed the device search obtains the search result from the server 112 with the procedure described in the first embodiment. Subsequently, the client 111 overlaps and displays the device bit map icon on the layout bit map based on the search result obtained from the server 112.

Figure 36:
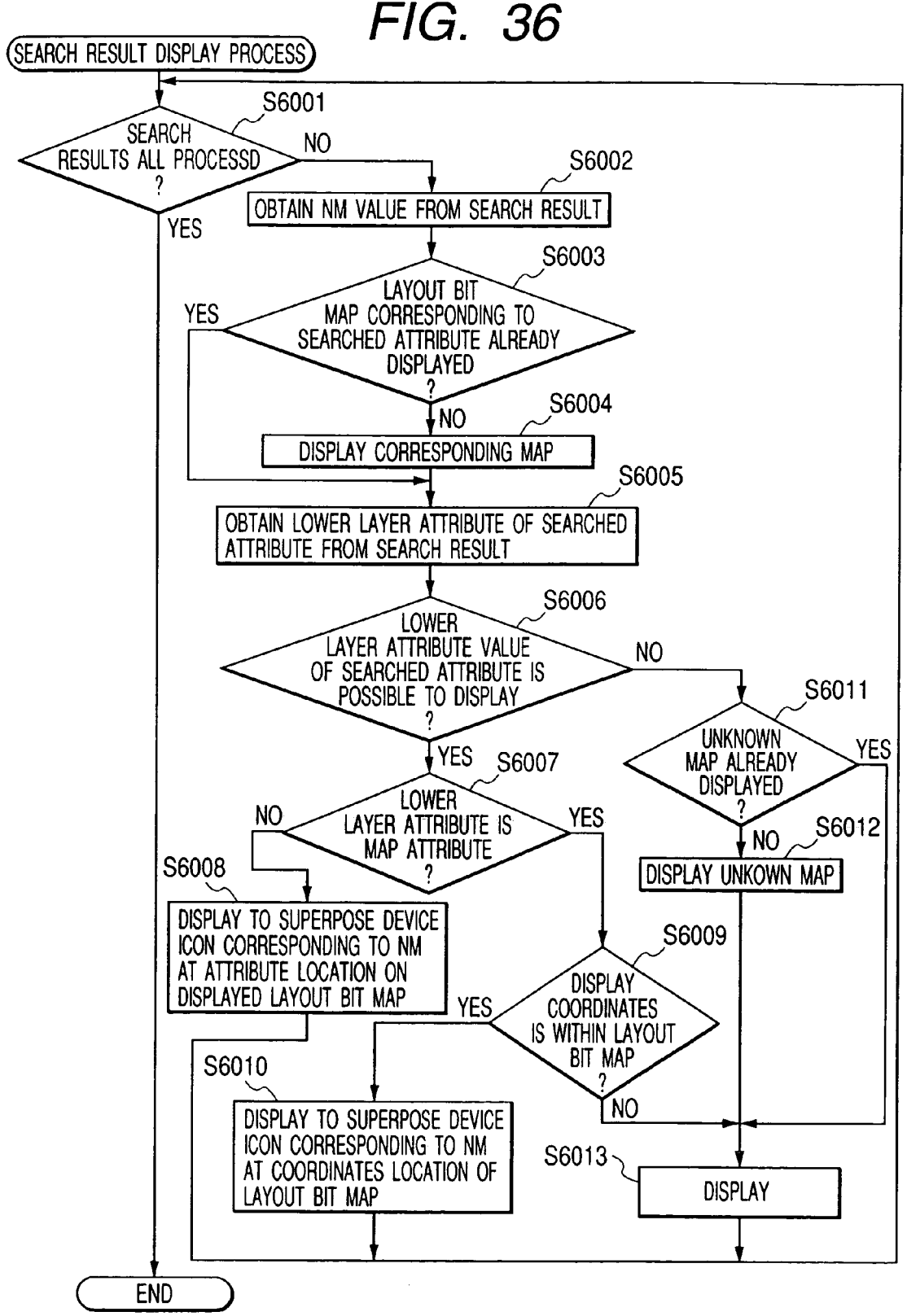
FIG. 36 is a flowchart showing a search result display processing performed by the search client in the second embodiment.

In this case, the display processing of the client 111 is shown in a flowchart of FIG. 36.

Specifically, when the search result display processing starts, it is judged whether the display of all obtained search results is finished (step S6001), and the display processing is all repeated until all the results are processed.

As a result of judgment of the step S6001, when all of the search results are not processed, the device name (NM) information is obtained from the location information of the search result. This is performed to display the device bit map icon in steps S6008, S6010, S6013 described later.

Subsequently, it is judged whether the layout bit map corresponding to the attribute of the searched condition has been already displayed (step S6003).

Figure 37:
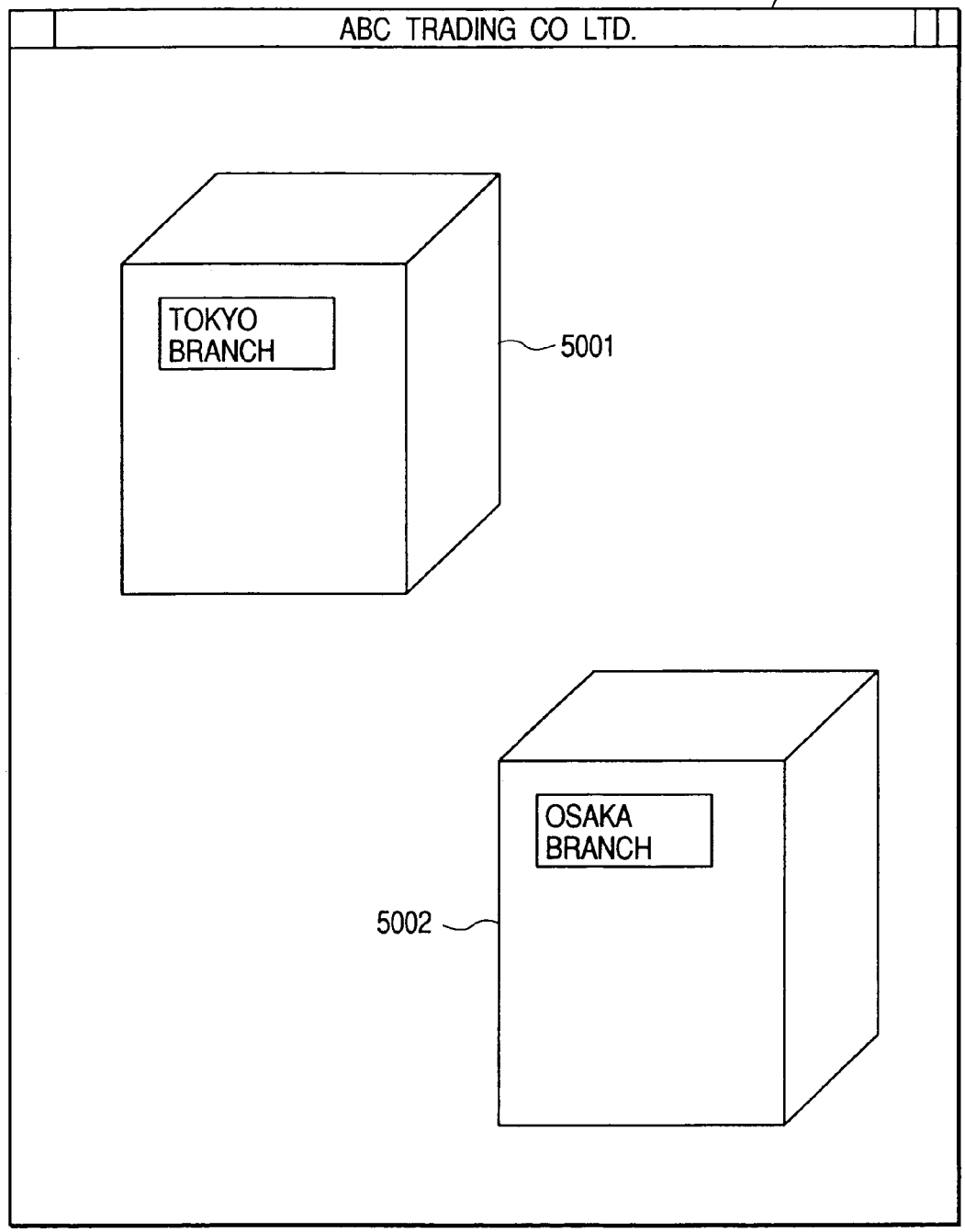
FIG. 37 is a diagram showing the layout bit map displayed when search is performed with "attribute=O, attribute value=ABC Trading Co., Ltd.".

Here, since the search is executed on the condition "attribute=O, attribute value=ABC Trading Co., Ltd.", by referring to the bit map correspondence list shown in FIG. 35, the device bit map icon of the search result is displayed on the layout bit map MP101 as shown in FIG. 37. Therefore, it is judged in the step S6003 whether the layout bit map MP101 of FIG. 37 has been already displayed.

As a result of judgment of the step S6003, when the layout bit map is not displayed, the corresponding layout bit map is displayed on the screen (step S6004), the process shifts to a processing of the next step S6005.

On the other hand, as a result of judgment of the step S6003, when the layout bit map is already displayed, the processing of the step S6004 is skipped, the lower layer attribute of the searched attribute and the attribute value are obtained from the search result (step S6005).

Subsequently, it is judged whether the obtained lower layer attribute value can be displayed (step S6006).

As a result of the judgment, when the attribute value of the device is not out of the range, or the attribute value is not inputted, it is judged that the display is impossible, and the process advances to step S6011.

It is judged in the step S6011 whether the map UMP is already displayed. When the map is not displayed, Unknown map UMP is displayed (step S6012).

Subsequently, the device bit map icon corresponding to the device name (NM value) obtained in the step S6002 is displayed in the device column 1902 of Unknown map UMP (step S6013).

On the other hand, as a result of judgment of the step S6006, when the obtained lower layer attribute value can be displayed, it is judged whether the lower layer attribute is MAP attribute (icon display coordinate information) (step S6007).

Figure 38:
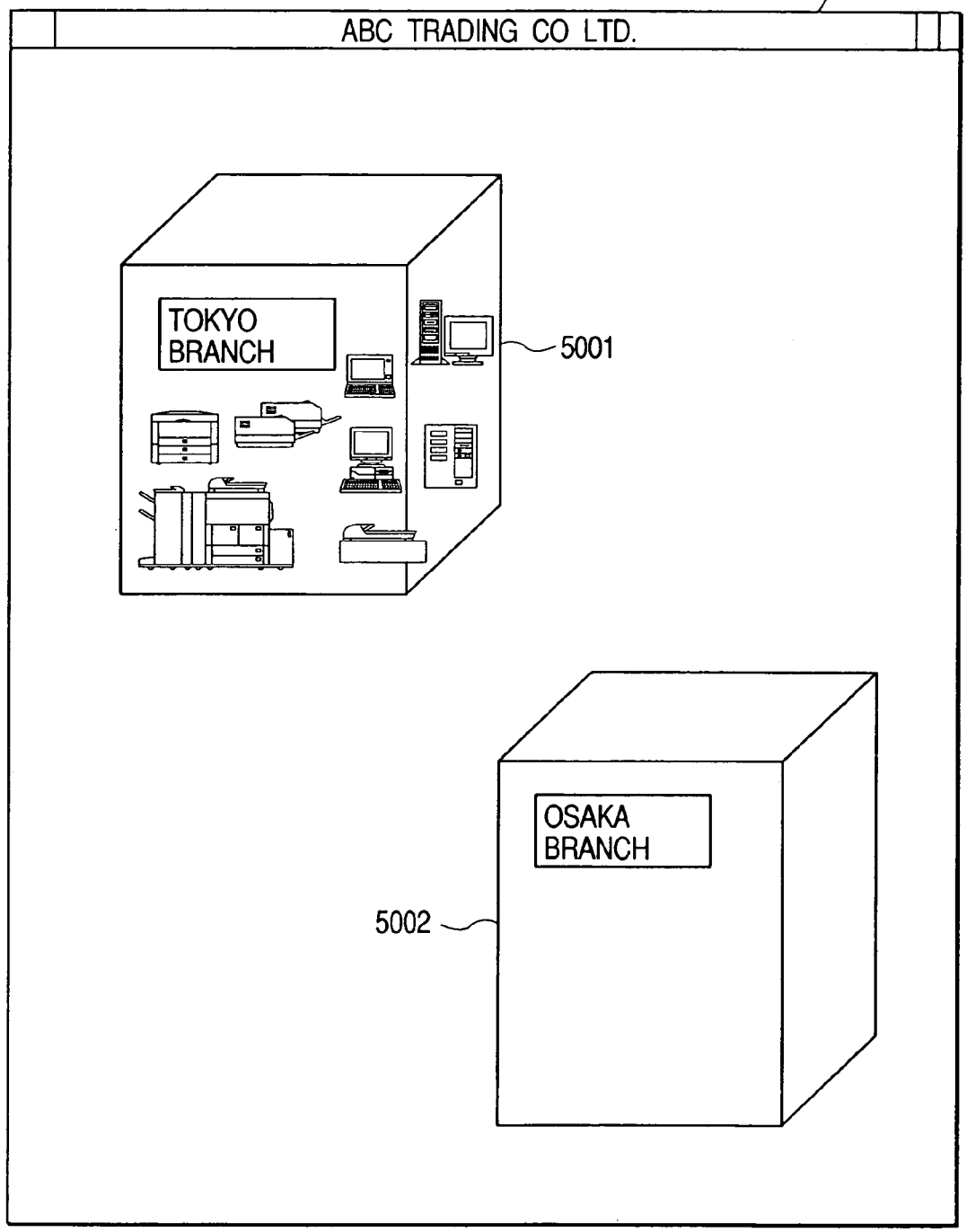
FIG. 38 is a diagram showing a result display when all the devices are searched on the condition "attribute=O, attribute value=ABC Trading Co., Ltd.".

As a result of the judgment, when the attribute is not MAP attribute, the device bit map icon corresponding to the device name (NM value) obtained in the step S6002 is overlapped and displayed in the attribute position on the displayed layout bit map (step S6008). Here, since in the hierarchical location information the attribute value of the layer BR under the layer O is "Tokyo Branch" (see FIG. 5), the icon corresponding to the obtained device name is displayed in the position of Tokyo Branch 5001. As a result, the display is obtained as shown in FIG. 38.

Moreover, when the device position is searched in more detail, the user selects "block name (BL)" from the pull-down menu, and inputs "block name (BL)" in the input column 1001a of the search item on the search condition input screen of FIG. 10, inputs "2-1" in the input column 1002a of the attribute value, and depresses the search start button 1005 to execute device search.

Thereby, the client 111 obtains the search result from the server 112 in the procedure described in the first embodiment. Subsequently, the client 111 overlaps and displays the device bit map icon on the layout bit map based on the search result obtained from the search server PC. Also in this case, the processing flow of FIG. 36 is executed.

In this case, as a result of judgment of the step S6007, the lower layer attribute obtained in the step S6005 is MAP attribute, and the process therefore advances to step S6009.

It is judged in the step S6009 whether the coordinate range shown in the MAP information is in a range of the layout bit map. Subsequently, within the range, the device bit map icon corresponding to the device name (NM value) obtained in the step S6002 is overlapped and displayed in the coordinate position of the displayed layout bit map (step S6010).

Figure 22:
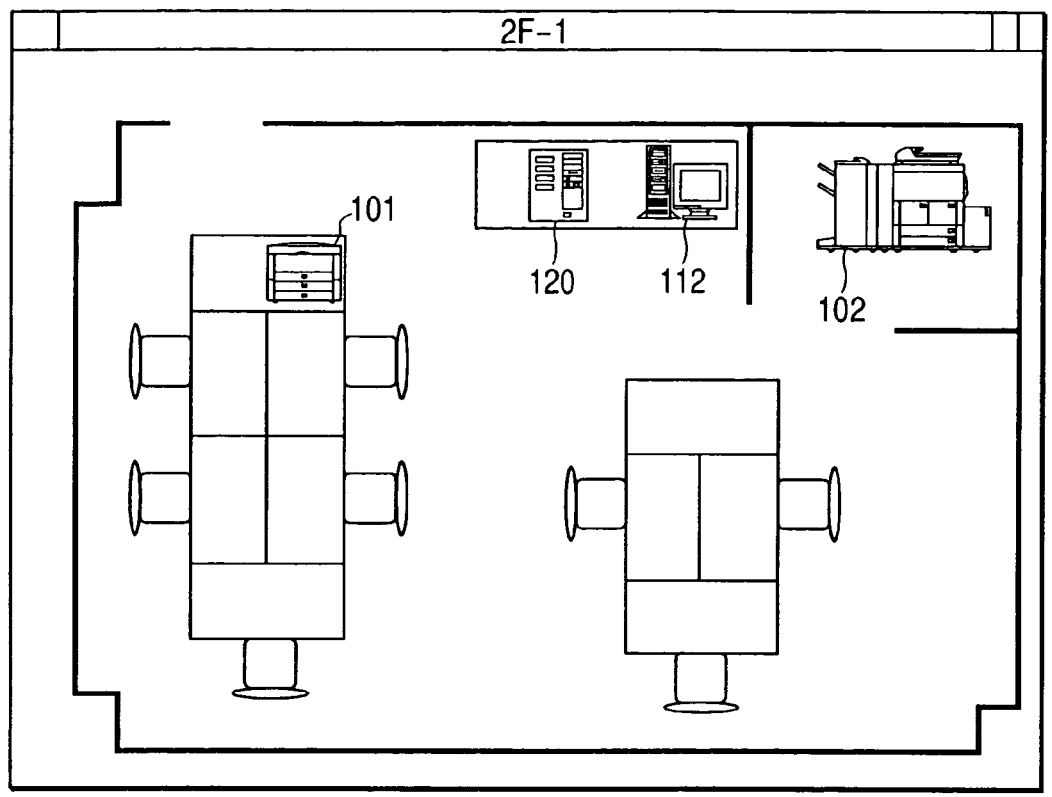
FIG. 22 is an explanatory view of the third example when the icon indicating the device is displayed on the layout bit map in the client.
Figure 23:
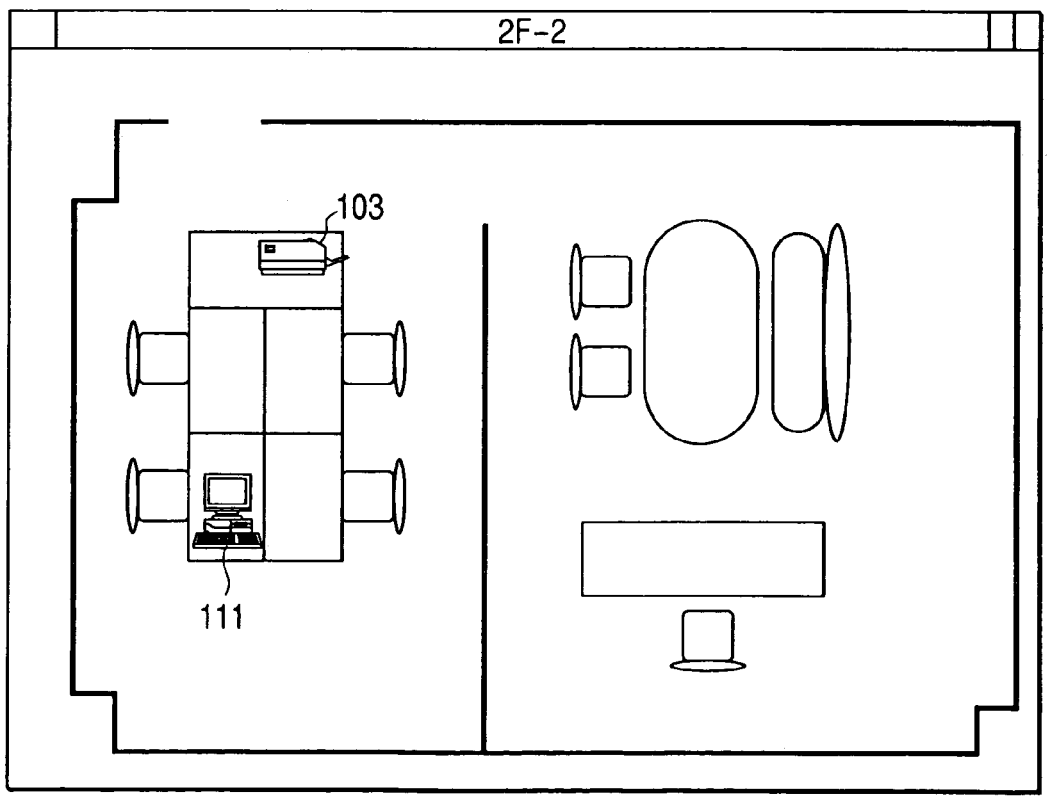
FIG. 23 is an explanatory view of the fourth example when the icon indicating the device is displayed on the layout bit map in the client.

Here, since the search is executed on the condition "attribute=BL, attribute value=2-1", by referring to the bit map correspondence list shown in FIG. 35, the device icon of the search result is displayed on the layout bit map MP2-1 shown in FIG. 16. Moreover, since the attribute subordinate to the attribute BL of the hierarchical location information is MAP attribute (see FIG. 5), the icon indicating each device of the search result is displayed on the coordinate of the layout. As a result, the display is obtained as shown in FIG. 22.

Additionally, as a result of judgment of the step S6009, when the coordinate range indicated by the MAP information is not in the range of the layout bit map, the process advances to step S6013 to display the device bit map icon corresponding to the device name (NM value) obtained in the step S6002 is displayed in the device column 1902 of Unknown map UMP.

Some other display examples of the search result will next be described.

As described above, FIG. 37 shows layout bit map MP101 for use in the search on "attribute=O, attribute value=ABC Trading Co., Ltd.". In this case, the device bit map icon of the device whose attribute value of the lower layer attribute BR of the attribute O is "Tokyo Branch" is displayed in 5001, and the device bit map icon of the device whose attribute value is "Osaka Branch" is displayed in layout bit map 5002.

Therefore, when all the devices are searched on condition "attribute=O, attribute value=ABC Trading Co., Ltd.", the result is displayed as shown in FIG. 38.

Figure 39:
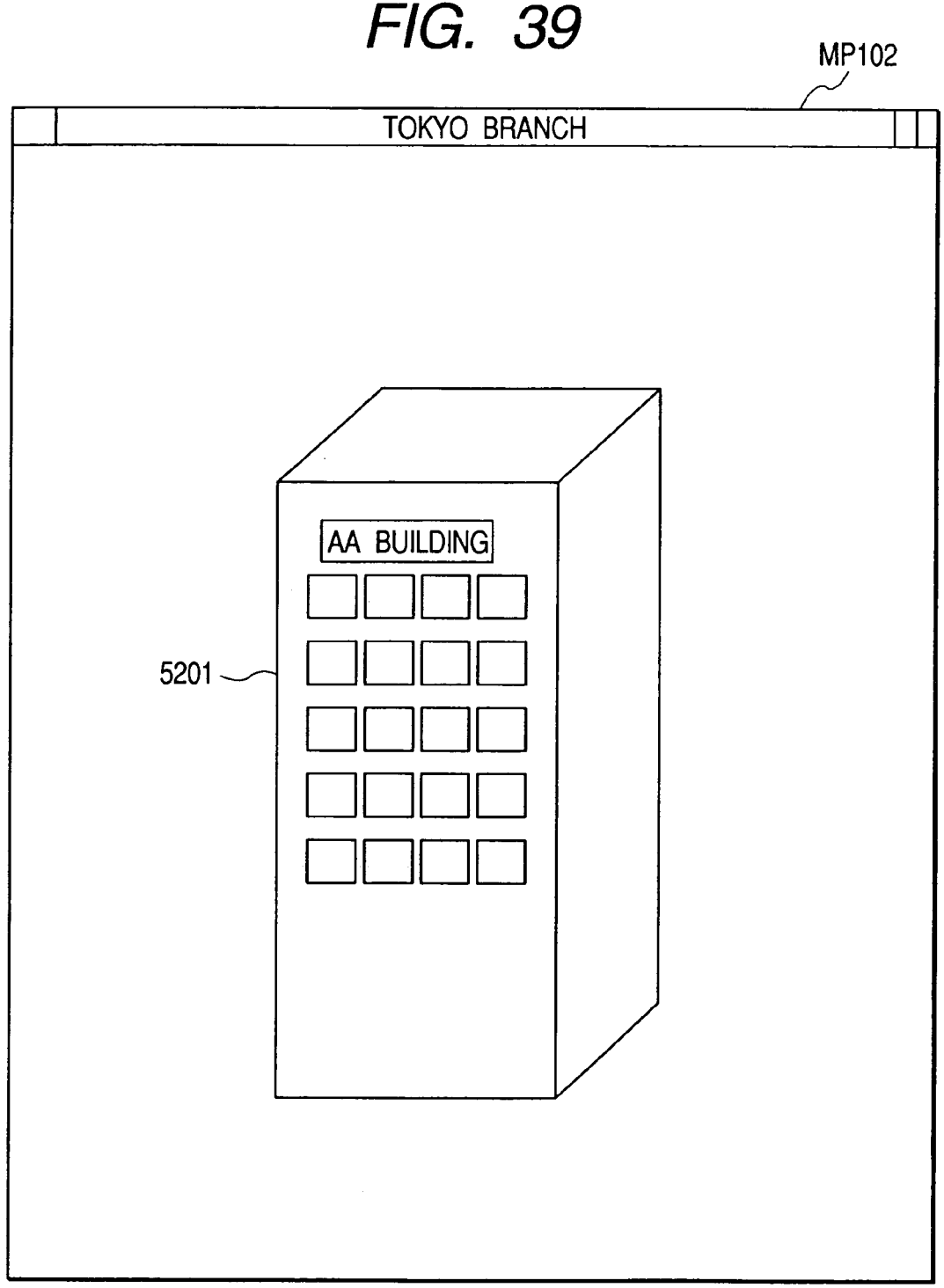
FIG. 39 is a diagram showing the layout bit map displayed when search is performed with "attribute=BR, attribute value=Tokyo Branch".

FIG. 39 shows a layout bit map MP102 for use in the search on condition "attribute=BR, attribute value=Tokyo Branch". In this case, the lower layer attribute of the attribute BR is OP, the OP indicates OPTION, and it is indicated that detailed information is present in further lower layer. The device bit map icon of the device in which the attribute value of the attribute BU is AA Building is displayed in a layout bit map 5201.

Figure 40:
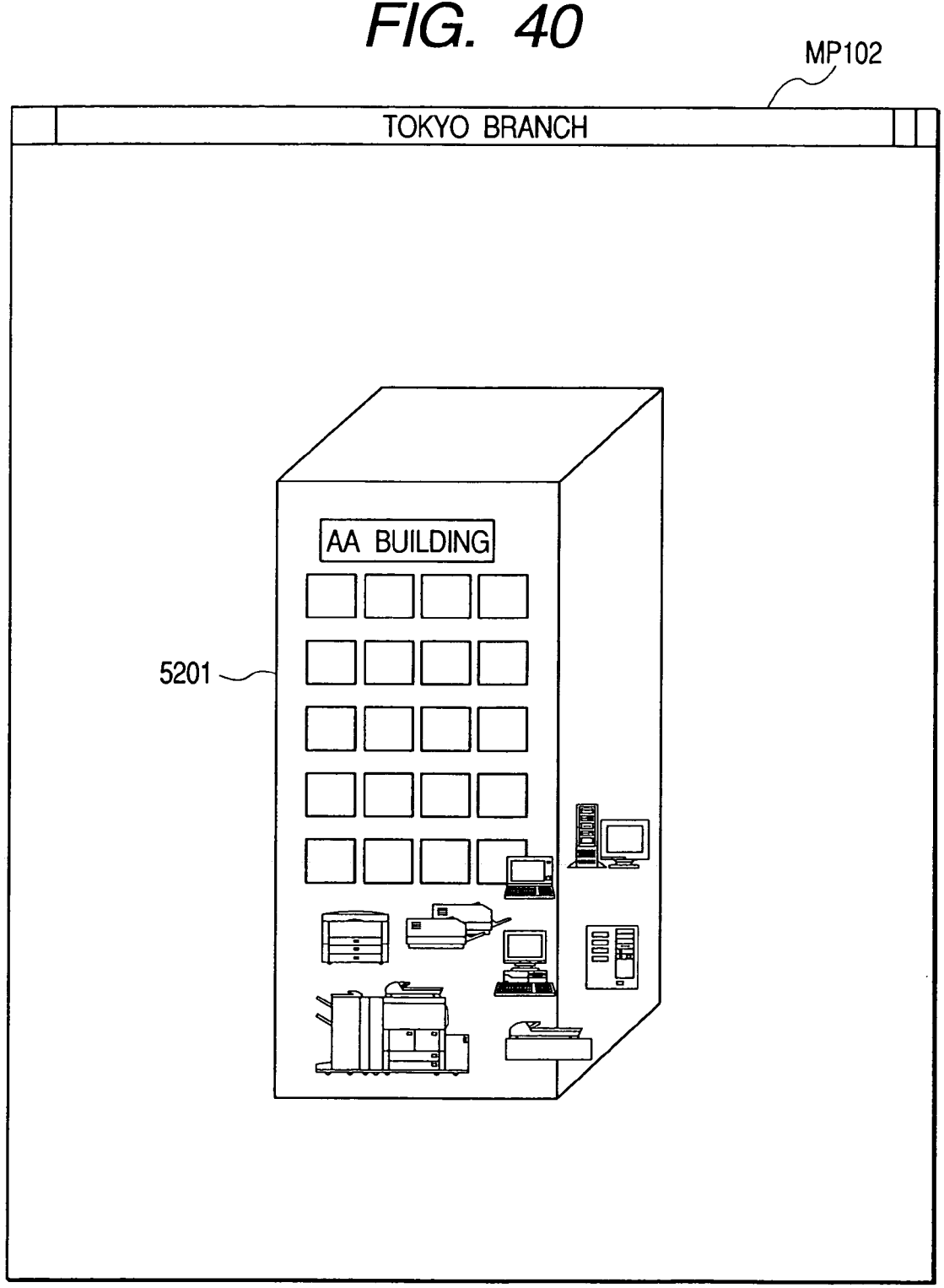
FIG. 40 is a diagram showing the result display when all the devices are searched on the condition "attribute=BR, attribute value=Tokyo Branch".

Therefore, when all the devices are searched on condition "attribute=BR, attribute value=Tokyo Branch", the result is displayed as shown in FIG. 40, and the device bit map icon of the device present in the AA Building is displayed in the layout bit map 5201 as shown in FIG. 40.

Figure 41:
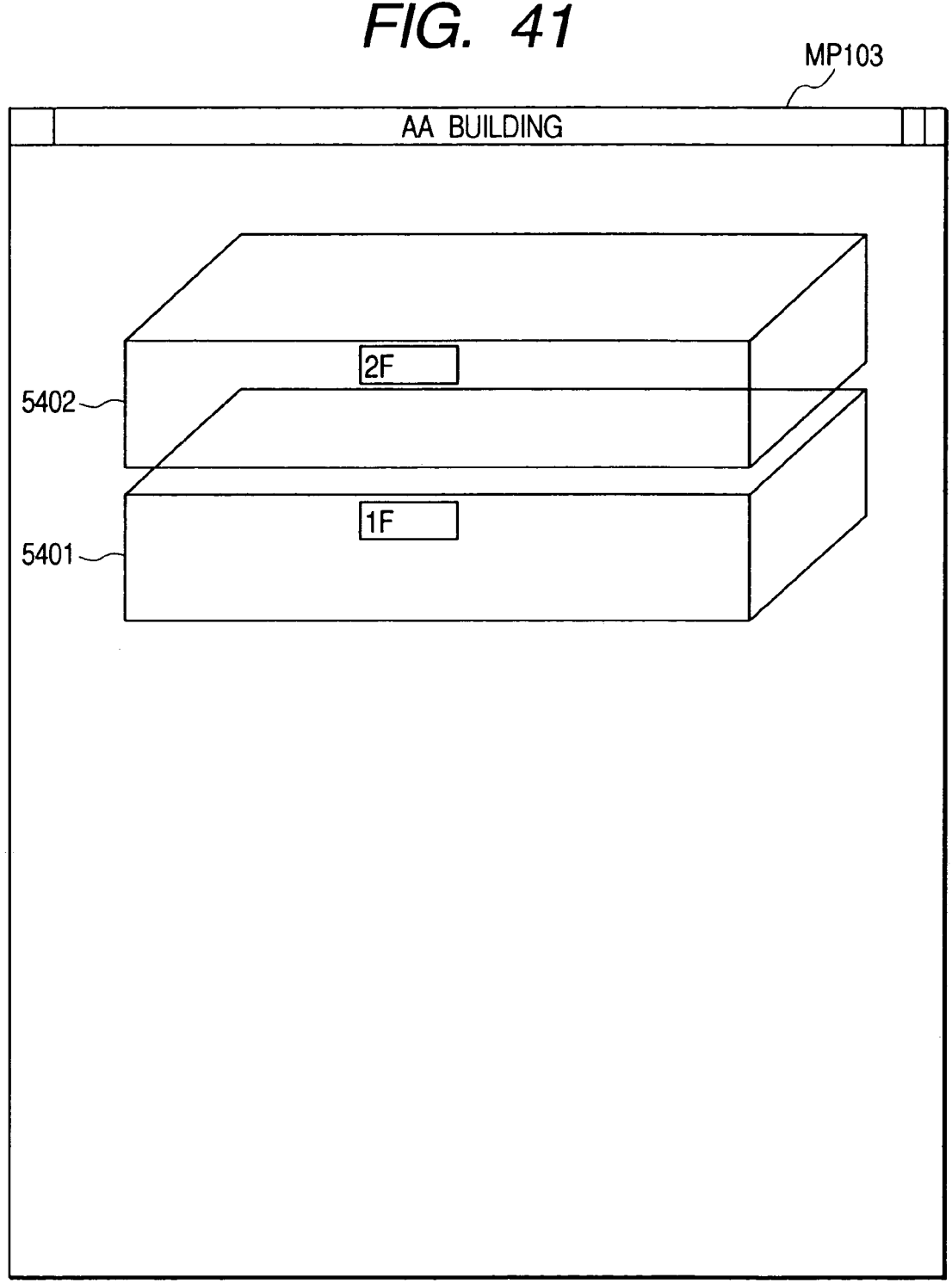
FIG. 41 is a diagram showing the layout bit map displayed when search is performed with "attribute=BU, attribute value=AA Building".

FIG. 41 shows a layout bit map MP103 for use in the search on condition "attribute=BU, attribute value=AA Building". In this case, the device bit map icon of the device in which the attribute value of the lower layer attribute FL of the attribute BU is 2F is displayed on a layout bit map 5402, and the device bit map icon of the device whose attribute value is 1F is displayed on a layout bit map 5401.

Figure 42:
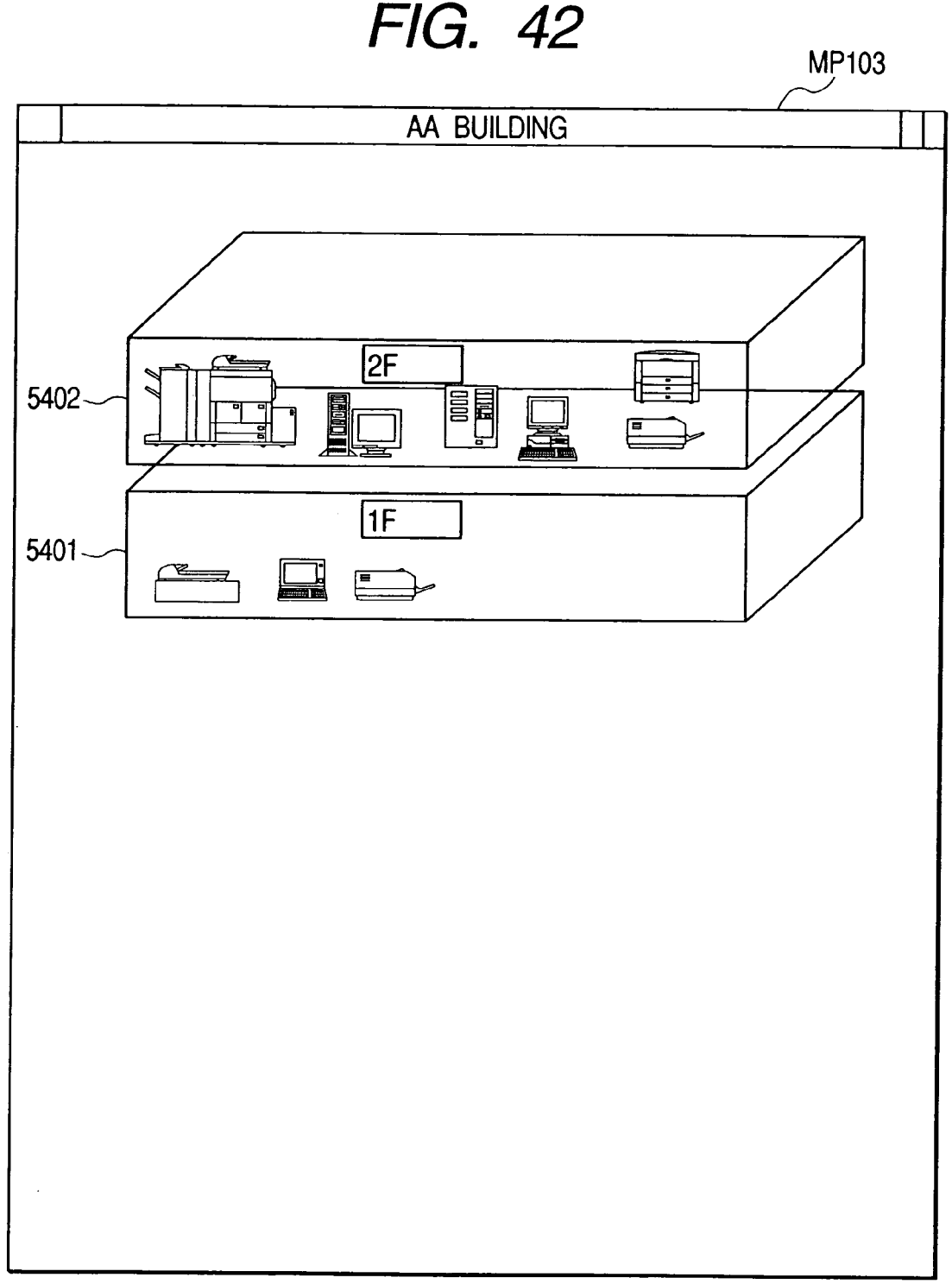
FIG. 42 is a diagram showing the result display when all the devices are searched on the condition "attribute=BU, attribute value=AA Building".

Therefore, when all the devices are searched on condition "attribute=BU, attribute value=AA Building", the result is displayed as shown in FIG. 42, and the device bit map icons of all the devices present in 2F floor are displayed in the layout bit map 5402, and the device bit map icons of all the devices present in 1F floor are displayed in the layout bit map 5401 as shown in FIG. 42.

Figure 43:
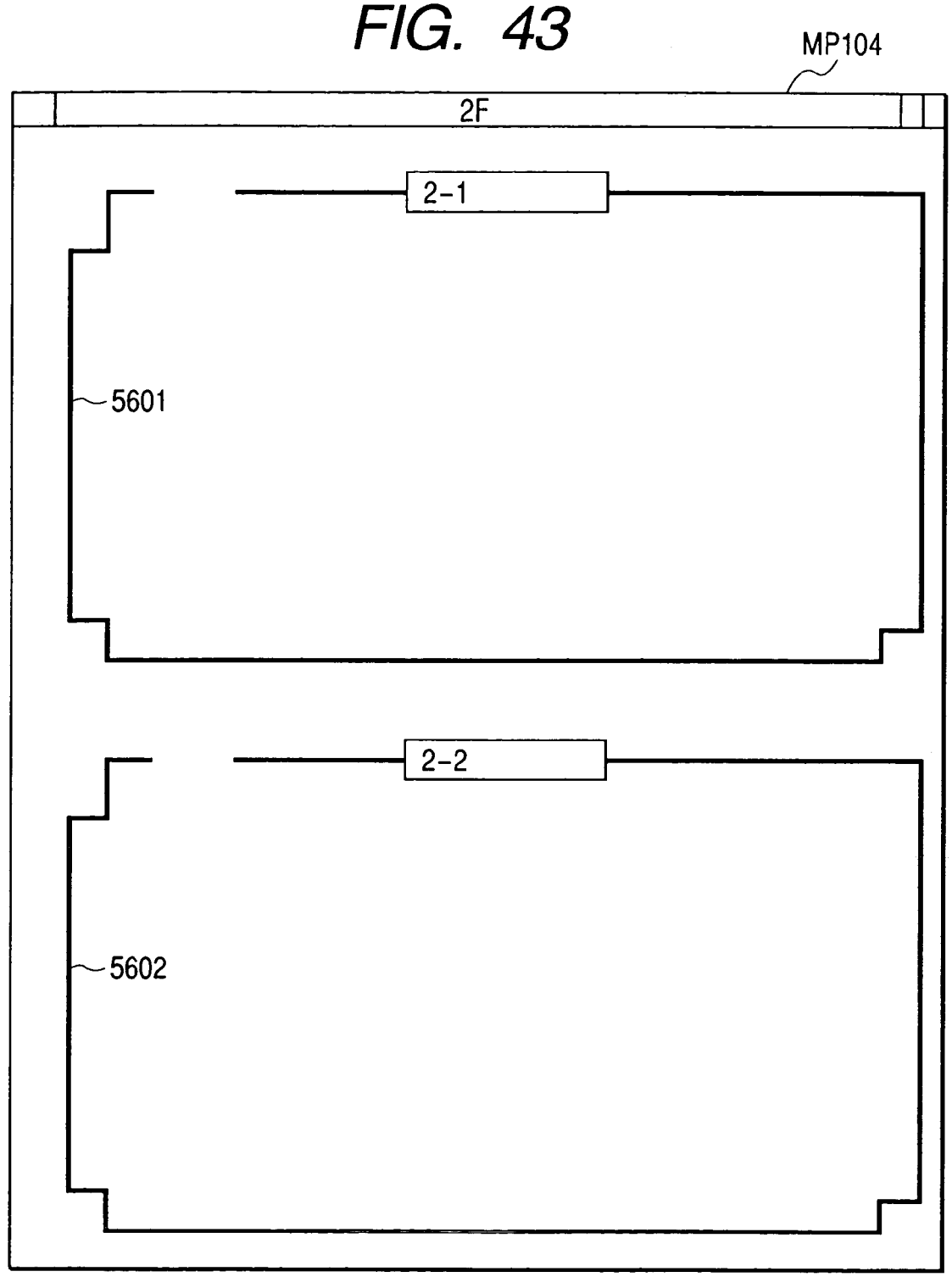
FIG. 43 is a diagram showing the layout bit map displayed when search is performed with "attribute=FL, attribute value=2F".

FIG. 43 shows a layout bit map MP104 for use in the search on condition "attribute=FL, attribute value=2F". In this case, the device bit map icon of the device in which the attribute value of the lower layer attribute BL of the attribute FL is "2-1" is displayed on a layout bit map 5601, and the device bit map icon of the device whose attribute value is "2-2" is displayed on a layout bit map 5602.

Figure 44:
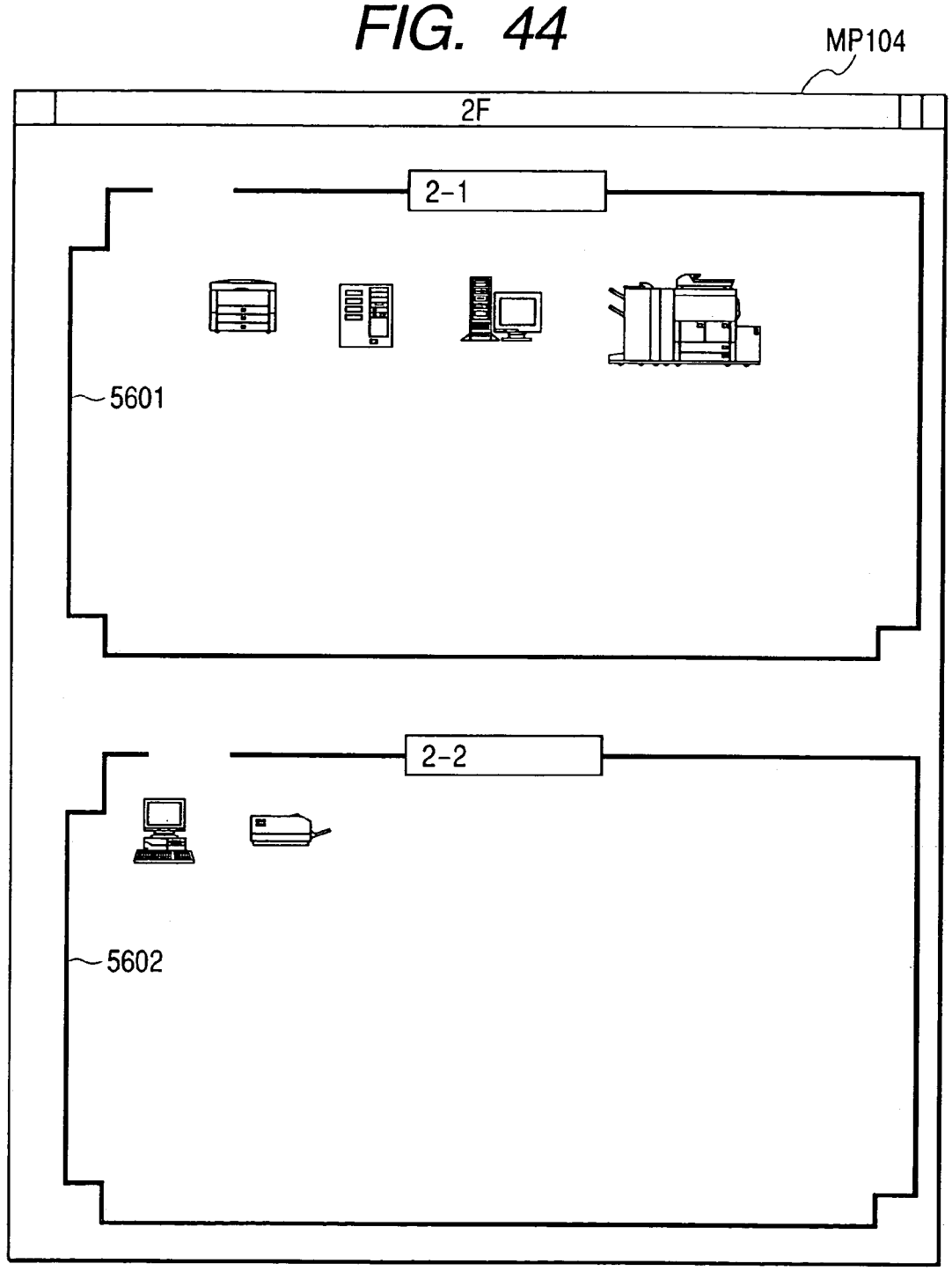
FIG. 44 is a diagram showing the result display when all the devices are searched on the condition "attribute=FL, attribute value=2F".

Therefore, when all the devices are searched on condition "attribute=FL, attribute value=2F", the result is displayed as shown in FIG. 44, and the device bit map icons of all the devices present in 2F-1 are displayed on the layout bit map 5601, and the device bit map icons of all the devices present in 2F-2 are displayed on the layout bit map 5602 as shown in FIG. 44.

Figure 45:
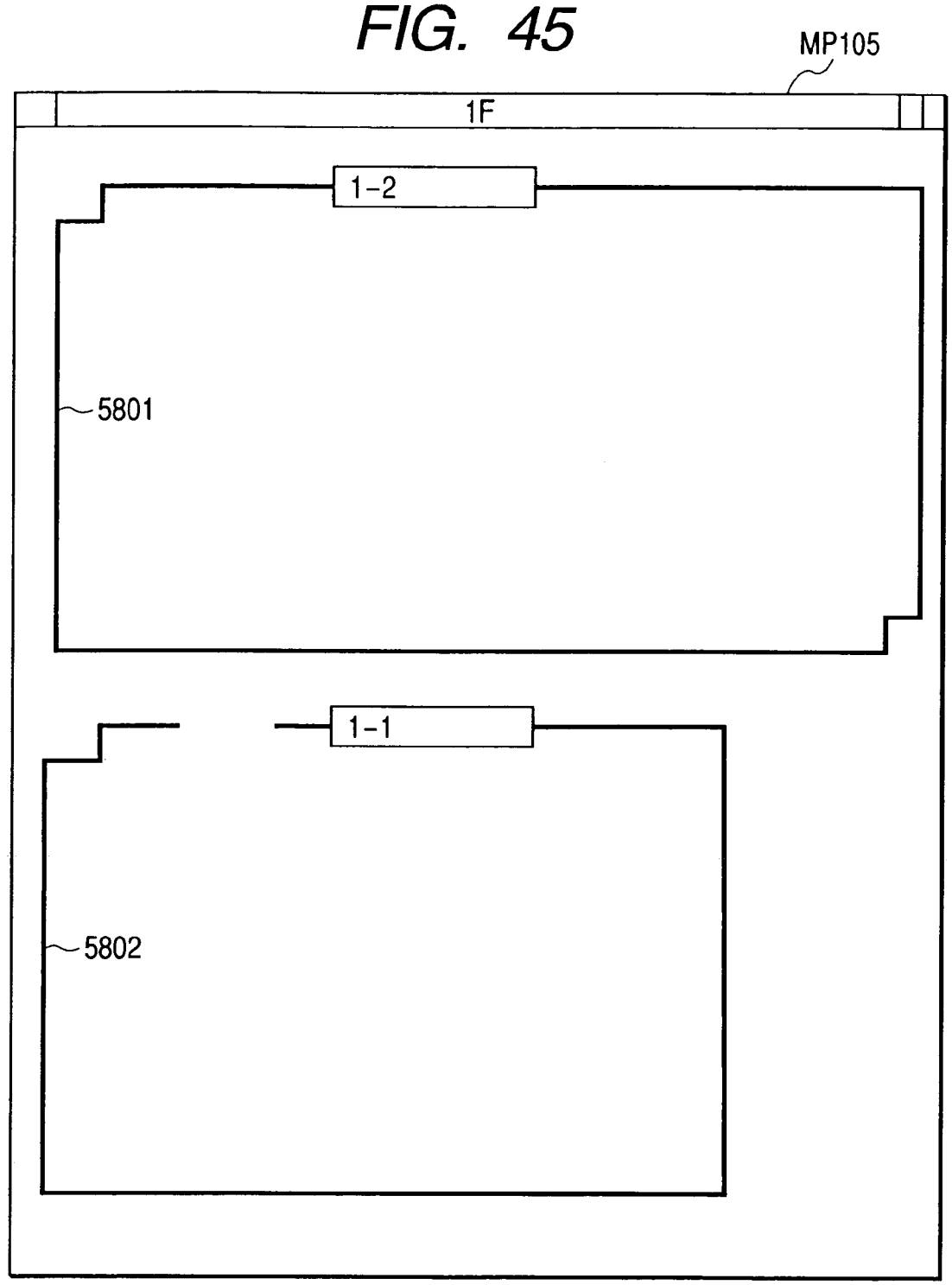
FIG. 45 is a diagram showing the layout bit map displayed when search is performed with "attribute=FL, attribute value=1F".
Figure 46:
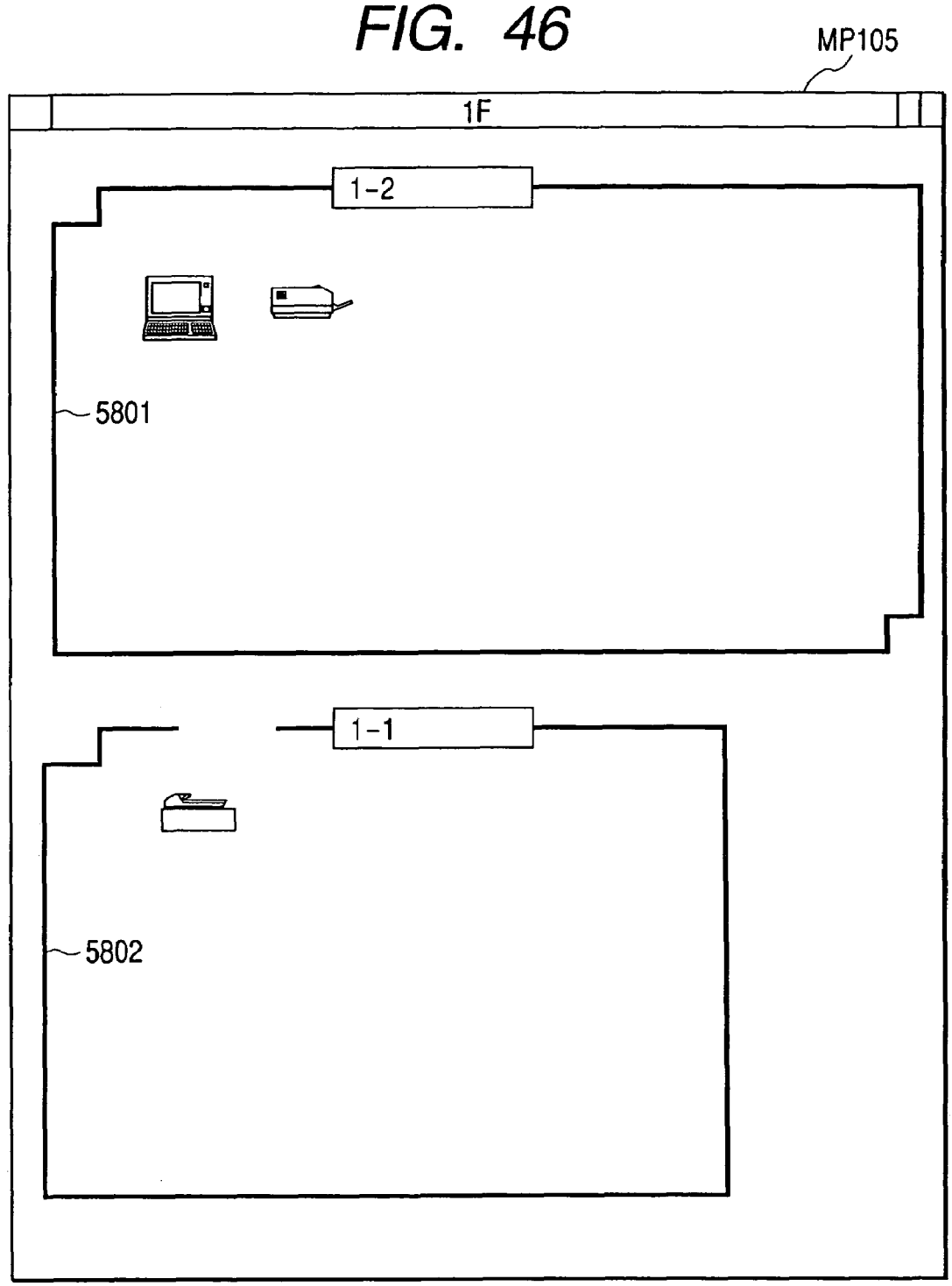
FIG. 46 is a diagram showing the result display when all the devices are searched on the condition "attribute=FL, attribute value=1F".

FIG. 45 shows a layout bit map MP105 for use in the search on condition "attribute=FL, attribute value=1F".

In this case, for the search result display, the device bit map icon of the device in which the attribute value of the lower layer attribute BL of the attribute FL is "1-2" is displayed on a layout bit map 5801, and the device bit map icon of the device whose attribute value is "1-1" is displayed on a layout bit map 5802.

As described above, according to the present embodiment, the search and display for each layer of the location information can be performed from a detail display to a rough display in accordance with the user's search request level.

Third Embodiment

In the first and second embodiments, the layout bit map (MAP), held by the client 111, for representing the searched device position has been described, but in a third embodiment, a case where the layout bit map is held by the server 112 will be described.

Since the third embodiment is based on the first and second embodiments, mainly respects different from those of the above-described embodiments will be described in the third embodiment.

In the third embodiment, various layout bit maps, and the correspondence table of the hierarchical position information to the layout bit map shown in FIG. 19 are stored in the hard disk of the server 112.

Figure 48:
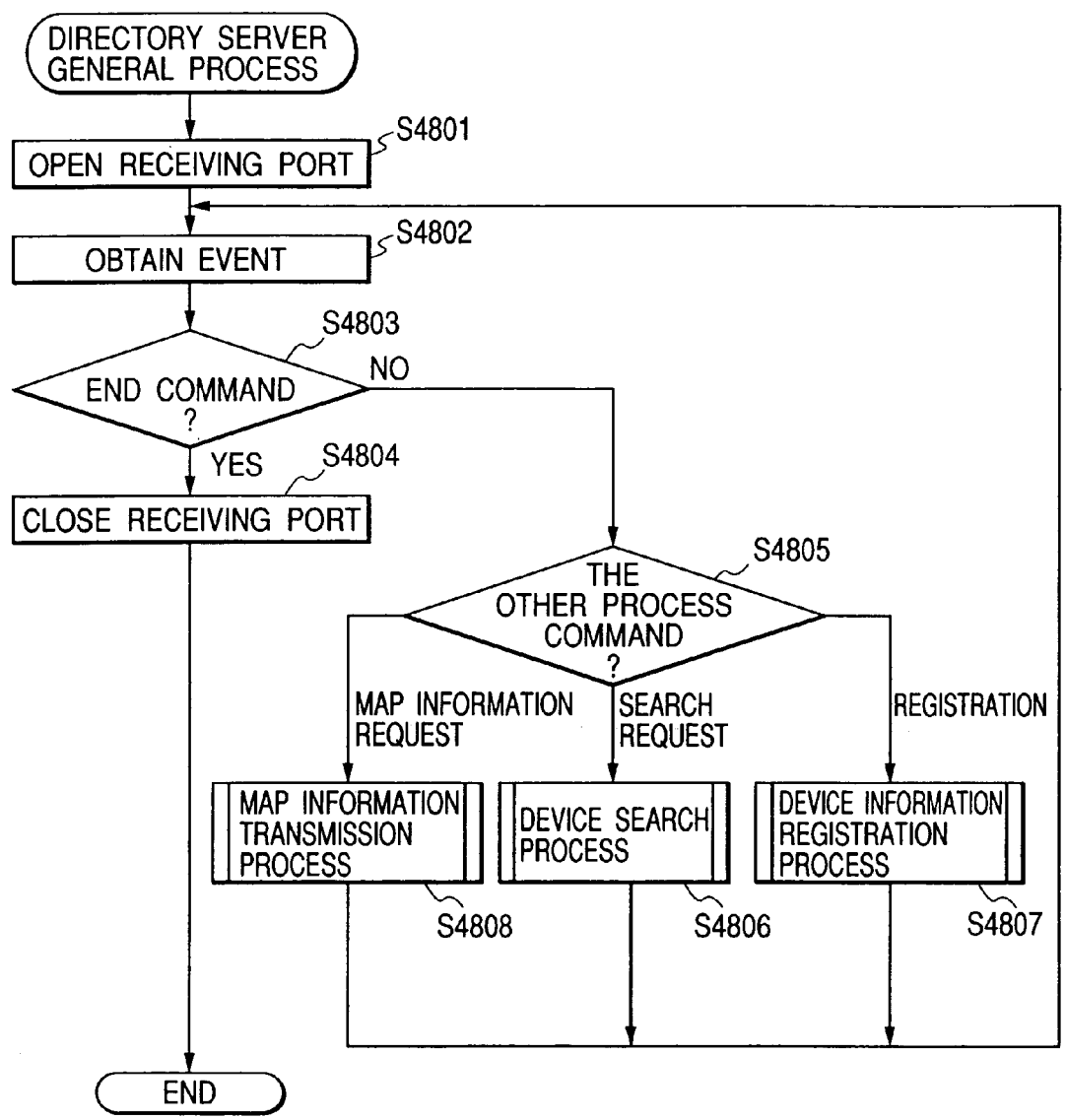
FIGS. 48 and 49 are flowcharts showing a server process in a third embodiment.

FIG. 48 is a flowchart showing the general process of the server 112, and a processing of step S4808 is added to the flowchart (FIG. 27) of the first embodiment.

In step S4805, when the obtained event is MAP information obtaining request from the client, the process advances to step S4808 to execute a processing for returning the corresponding MAP information to the client as the MAP information requester.

Figure 49:
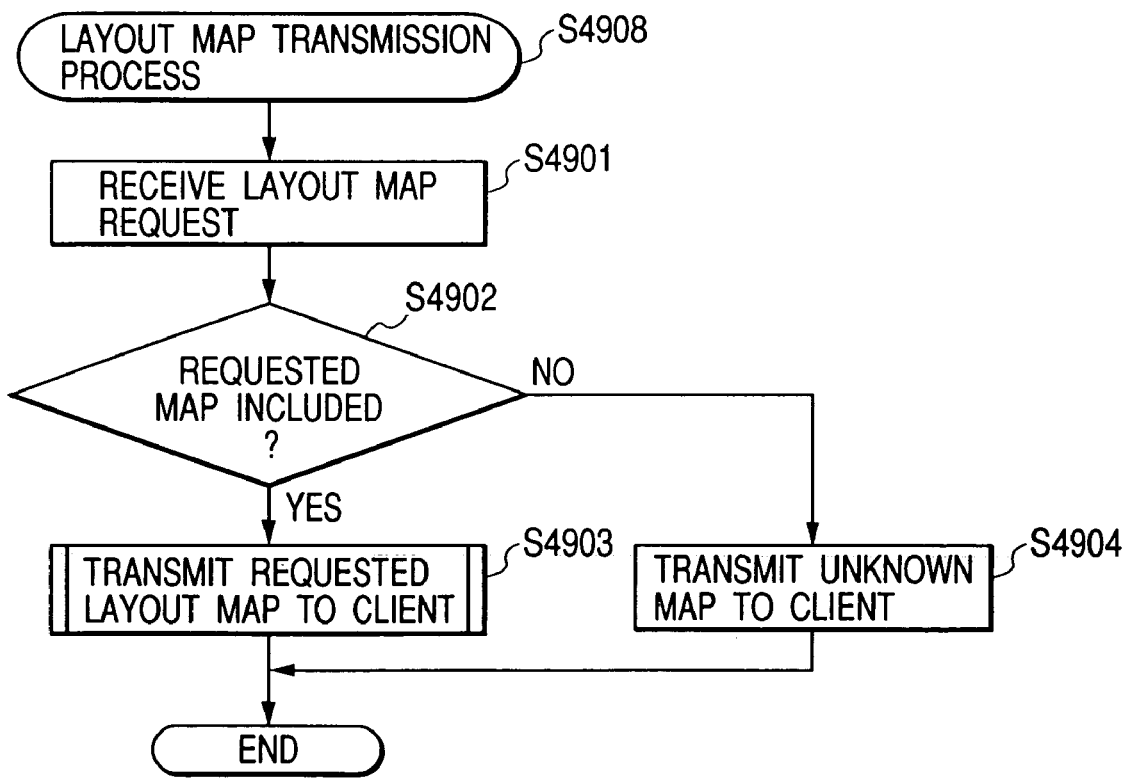

FIG. 49 is a flowchart of the processing of the step S4808 of FIG. 48 in the server 112, that is, a MAP information transmission processing.

First, when the MAP information obtaining request (MAP information download request) is received from the client (step S4901), it is judged whether or not the MAP information corresponding to the location information included in the MAP information obtaining request is held (step S4902).

Concretely, for example, by referring to the correspondence table shown in FIG. 19, and judging whether the MAP information corresponding to the location information notified from the client is present or not, it is judged whether or not MAP display is possible in the client 111.

Additionally, here, when the location information in the device information includes the respective information shown in "1401" of FIG. 19, it is judged that MAP display is possible.

As a result of judgment of the step S4902, when the MAP display is possible in the client 111, the MAP information corresponding to the location information notified from the client is obtained from the memory unit, and transmitted to the client 111 (step S4903).

As a result of judgment of the step S4902, when the MAP display is impossible in the client 111, the unknown MAP information UMP shown in FIG. 18 is obtained from the memory unit, and transmitted to the client 111 (step S4904).

By the processing shown in FIGS. 48, 49, the server 112 can transmit the MAP information requested from the client to the client as the requester.

A processing of receiving the MAP information from the server 112 from the client will next be described with reference to a flowchart of FIG. 50.

Figure 50:
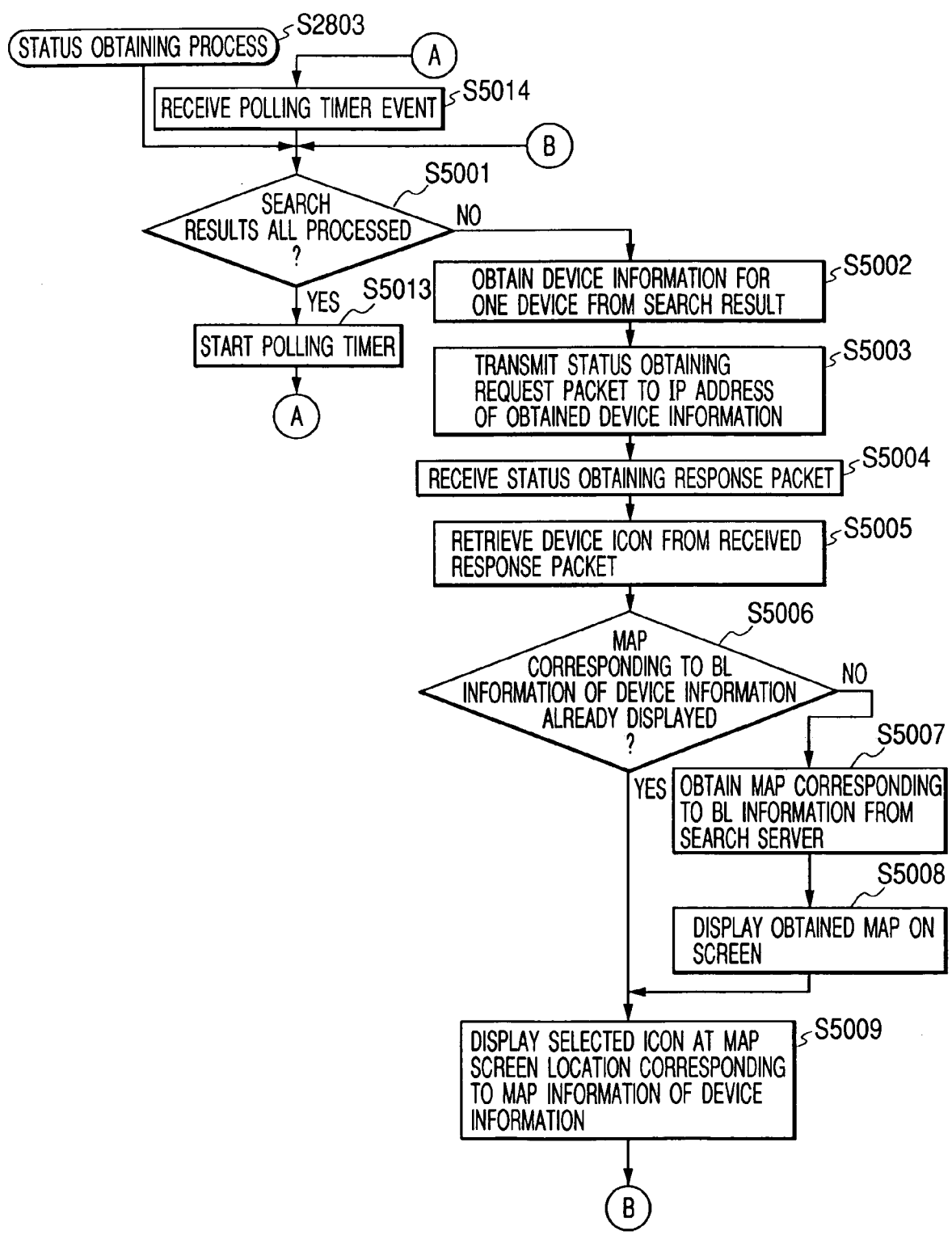
FIG. 50 is a flowchart showing a client process in the third embodiment.

FIG. 50 is a flowchart showing a status obtaining process started in the step S2803 of the search result display processing (FIG. 31) in the client. The status obtaining process is executed in the first embodiment based on the processing of the flowchart of FIG. 32, but in the third embodiment based on the flowchart of FIG. 50.

When the status obtaining process is executed, first the CPU 202 judges, with respect to all the search results held in the hard disk drive (HDD) 211 by the step S2802 (see FIG. 31), whether or not the processing from step S5002 is executed (step S5001).

As a result of judgment of the step S5001, when all the search results are processed, the CPU 202 starts the polling timer (inner timer or the like) to obtain the device status at the certain interval (step S5013).

Thereafter, the CPU waits for the time-out event of the polling timer (step S5014). In this state, when the time-out event of the polling timer is generated, the CPU returns to the step S5001, and executes the subsequent processing steps again.

As a result of judgment of the step S5001, when all the search results are not processed, the processing from the next S5002 is executed.

Specifically, first the device information for one device is obtained from the unprocessed search result in the hard disk drive (HDD) 211 (step S5002).

Subsequently, the IP address of the device information obtained in the step S5001 is used as the address, and the device status obtaining request is transmitted (step S5003).

For example, with the processing for the device information shown in FIG. 13, since the IP address is "192.1.2.1", the device status obtaining request packet is transmitted to this address.

Thereafter, the CPU waits for a response to the device status obtaining request packet shown in FIG. 24 from the device corresponding to the address of the device status obtaining request packet.

When the response packet is received from the device of the address of the device status obtaining request (the device corresponding to the device information obtained in the step S5002) (step S5004), the icon information (see FIG. 24) included in the response packet is obtained (step S5005).

Subsequently, it is judged whether or not the MAP information corresponding to the information indicated by the location information (BL information or the like: see FIG. 13) of the device information obtained by the step S5002 is already displayed on the CRT 210 (step S5006).

As a result of judgment of the step S5006, when the MAP information is displayed on the CRT 210, the icon information obtained in the step S5005 is overlapped and displayed in the position indicated by coordinate information MAP of the device information with respect to the MAP information (step S5009).

Therefore, the CPU returns to the step S5001 to execute the processing for the next search result, and repeatedly executes the subsequent processing step.

As a result of judgment of the step S5006, when the MAP information is not displayed on the CRT 210, the MAP information corresponding to the location information of the device information is obtained (step S5007).

Specifically, the MAP information obtaining request including the location information of the device information is transmitted to the server 112. After the MAP information obtaining request is transmitted, the MAP information (or unknown MAP information) corresponding to the location information of the device information is received from the server 112.

Subsequently, the MAP information obtained in the step S5007 is displayed on the CRT 210 (step S5008).

Thereafter, the process advances to the step S5009, and a processing of overlapping and displaying the icon on the MAP is executed.

Thereby, for example, with the processing for the device information as shown in FIG. 13, since BL information is "2-1", MAP information MP2-1 shown in FIG. 16 is transmitted as MAP from the server 112, and the icon indicating the current status of the device of the object device information is displayed in the position indicated by the coordinate information MAP (=10X+10Y) on the MAP.

The third embodiment has been described above.

Additionally, in the first embodiment, since the layout bit map is held by the client 111, during the display of the search result on the client 111, it is unnecessary to transfer the layout bit map to the client 111 from the server 112, the processing and time during the display can be reduced, and the traffic of the network system can effectively be reduced.

On the other hand, in the third embodiment, since the layout bit map is held by the server 112, the map information can one-dimensionally be managed in the server apparatus, the necessity of holding the unnecessary map information by the client 111 is obviated, update and other maintenance processes can be facilitated, and the load of the memory resource of the client 111 can effectively be reduced.

Therefore, by considering the network load and client ability, the first or third embodiment may appropriately be employed.

Fourth Embodiment

In the first embodiment, the client 111 periodically polls the status from the device, and reflects the obtained status in the MAP display.

In a fourth embodiment, the client 111 obtains the status from the device by event notice, and reflects the obtained status in the MAP display.

In the periodical polling for obtaining the device status as in the first embodiment, even when the packet is temporarily lost on the network, the device status can securely be obtained.

On the other hand, in the obtaining of the status by the event notice from the device as in the fourth embodiment, as compared with the obtaining by the polling, the network traffic can effectively be reduced. Therefore, considering the certainty of the status obtaining, network load, and the like, the first or fourth embodiment may be selected.

Since the fourth embodiment is based on the first embodiment, mainly the respects different from the first embodiment will be described hereinafter.

First, the client 111 transmits an event notice destination registration request shown in FIG. 51 to the device to receive an event notice from the device.

The event notice destination registration request includes notice condition information indicating the occurrence of an event requiring the event notice, and event notice destination information indicating the notice destination.

In an example of FIG. 51, the issuer of the event notice destination registration request (the device indicated by the search result from the server 112) is the color LBP 101, "paper empty" and "paper jam" are set to the notice condition information, and the IP address indicating the client (client 111) is set to the event notice destination information.

On the other hand, the device (color LBP 101) holds the received event notice destination registration request (FIG. 51) in an event notice destination management table shown in FIG. 52. In the event notice destination management table, the event notice destination address, network protocol for notifying the event, and event condition to be notified are associated and stored.

Figure 53:
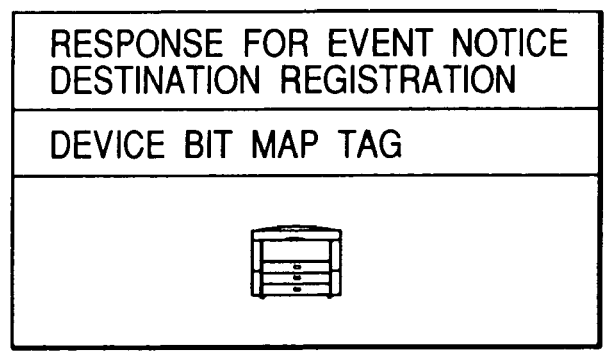
FIG. 53 is an explanatory view of a response for event notice destination registration transmitted to the client from the device in the fourth embodiment.

Furthermore, for the event notice destination address described in the received event notice destination registration request (FIG. 51), a response (registration end) of event notice destination registration is returned as shown in FIG. 53. Thereby, in the client having ended the registration, the icon indicating the status at the time is displayed as the initial state of icon display (until a first event notice is issued from the device).

Figure 54:
FIG. 54 is an explanatory view of an event notice returned to the client from the device in the fourth embodiment.

Then, in the color LBP 101, for example, when paper runs out, the information (event notice destination information or the like) of the client for the event notice is obtained from the event notice destination held in the event notice destination management table (FIG. 52), and the event notice is issued to the client (here, client 111), for example, as shown in FIG. 54.

As shown in FIG. 54, the event notice includes icon information corresponding to the event generated in the device (icon information indicating occurrence of paper shortage), and the location information of the device.

The process of the client 111 will next be described with reference to flowcharts of FIGS. 55 to 57.

Figure 29:
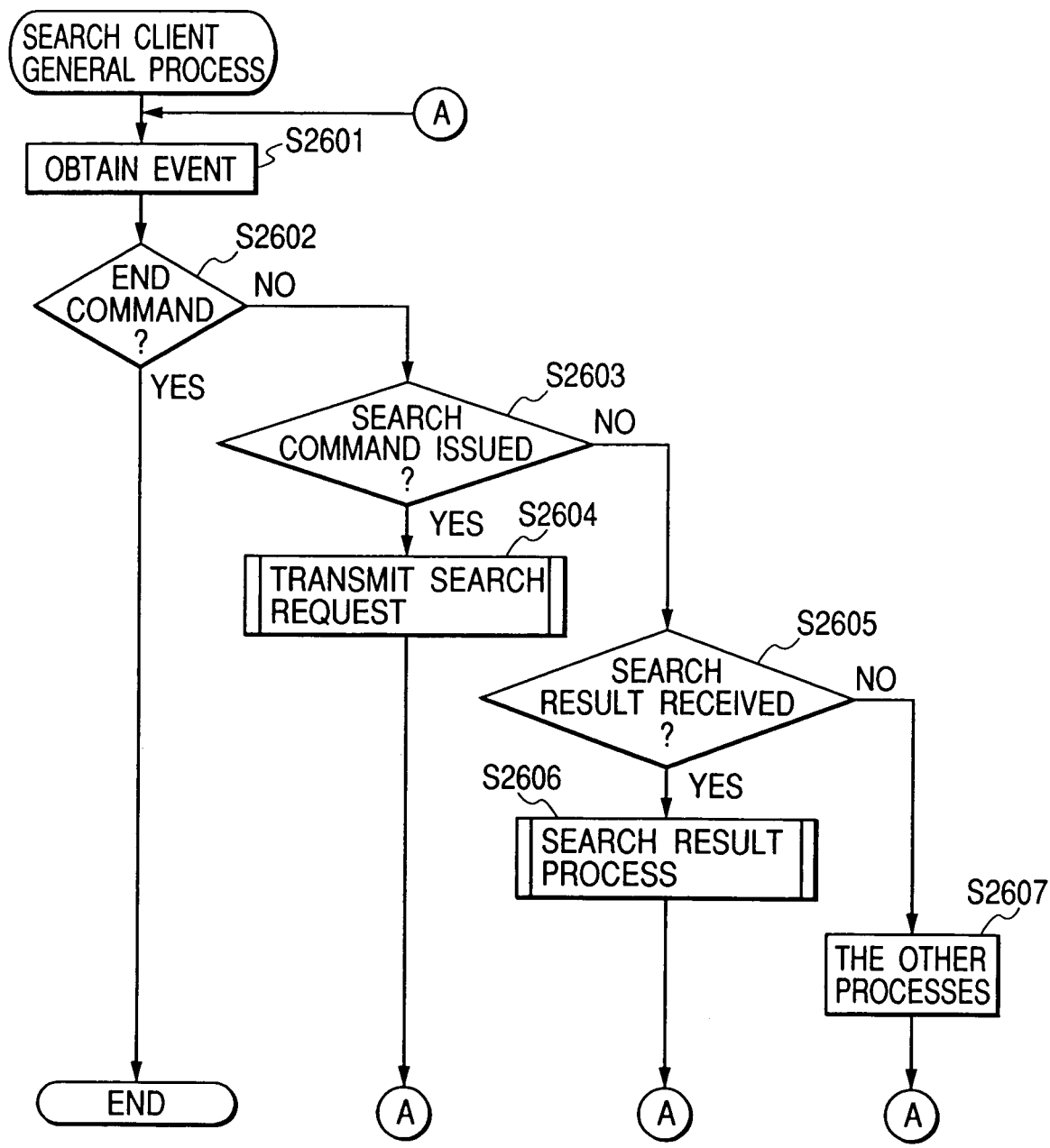
FIG. 29 is a flowchart showing the general process of the client.
Figure 30:
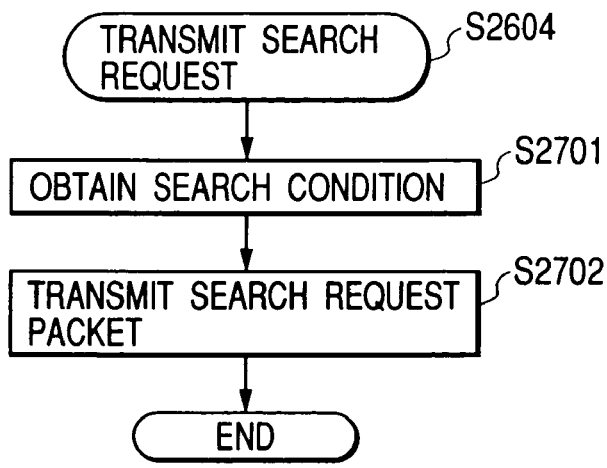
FIG. 30 is a flowchart showing a device search request issue processing in the client general process.
Figure 31:
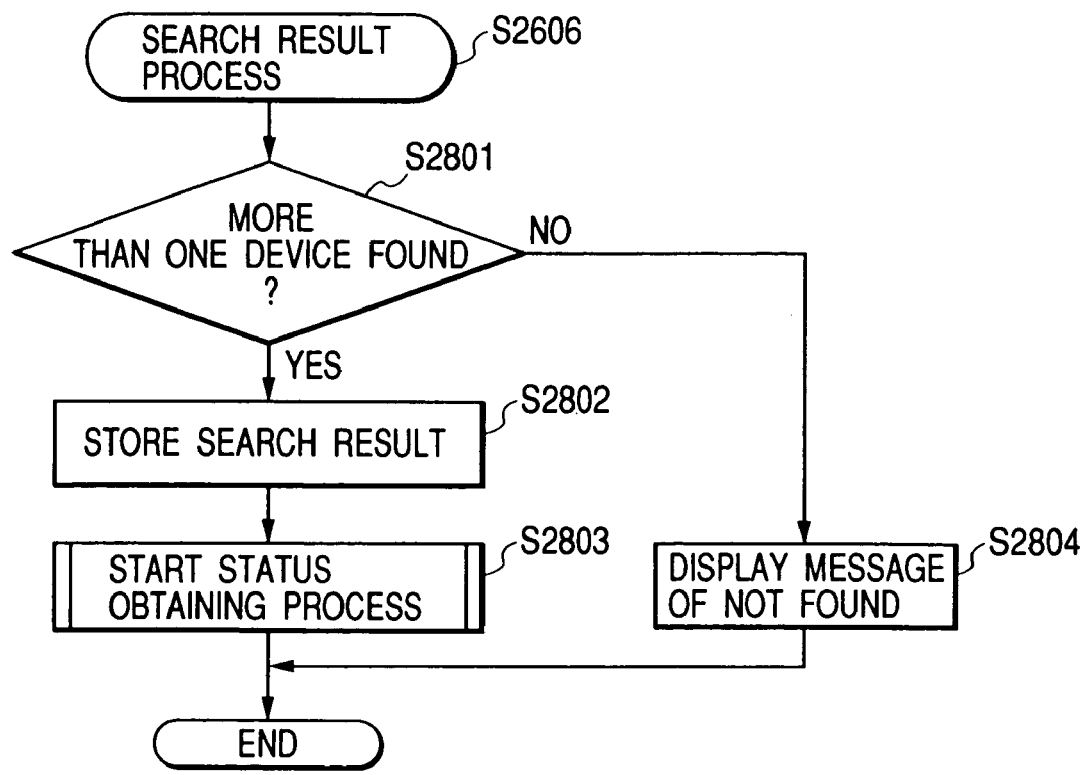
FIG. 31 is a flowchart showing a device search result processing in the client general process.
Figure 32:
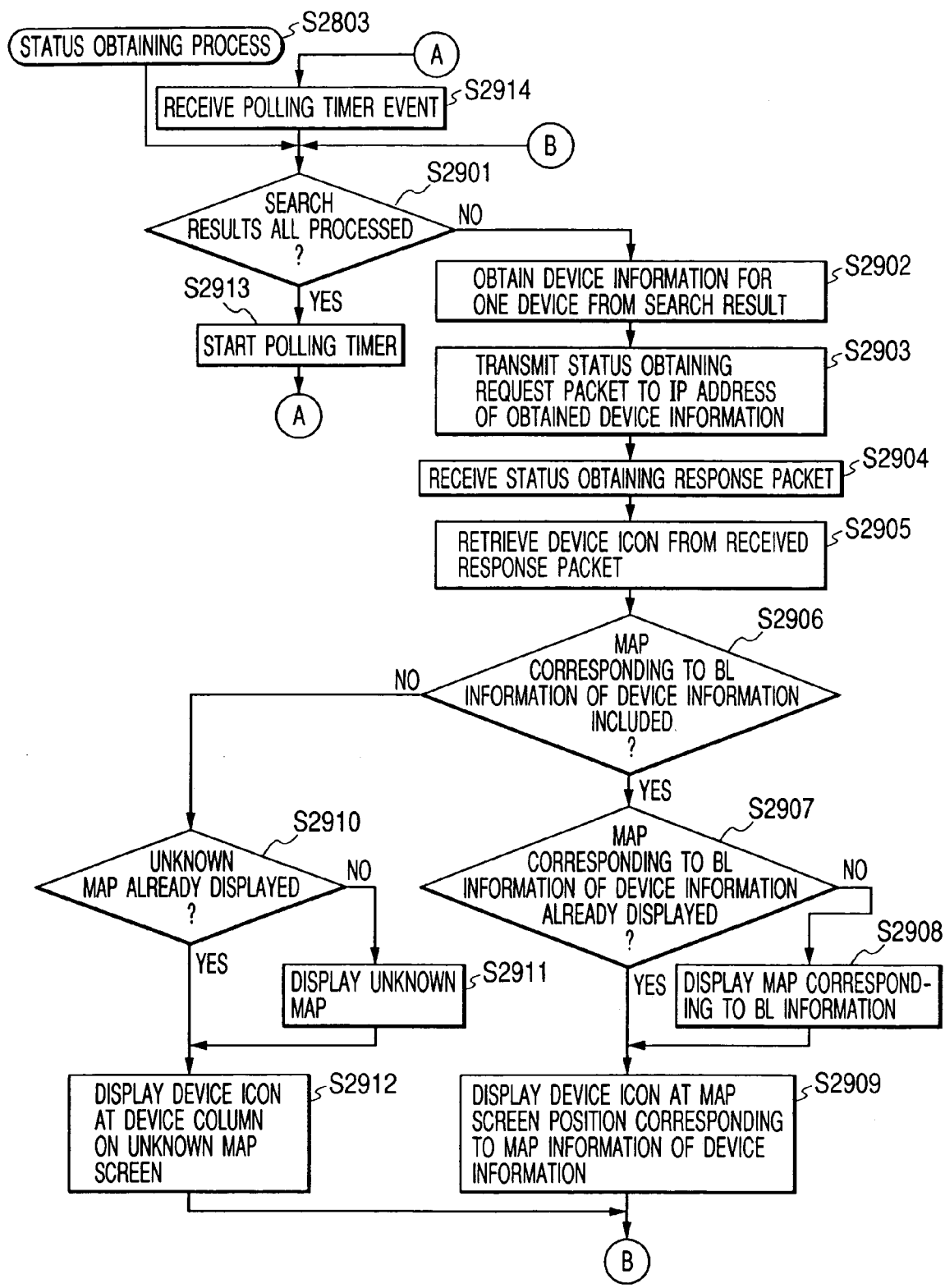
FIG. 32 is a flowchart showing the status obtaining process of the device search result processing.
Figure 33:
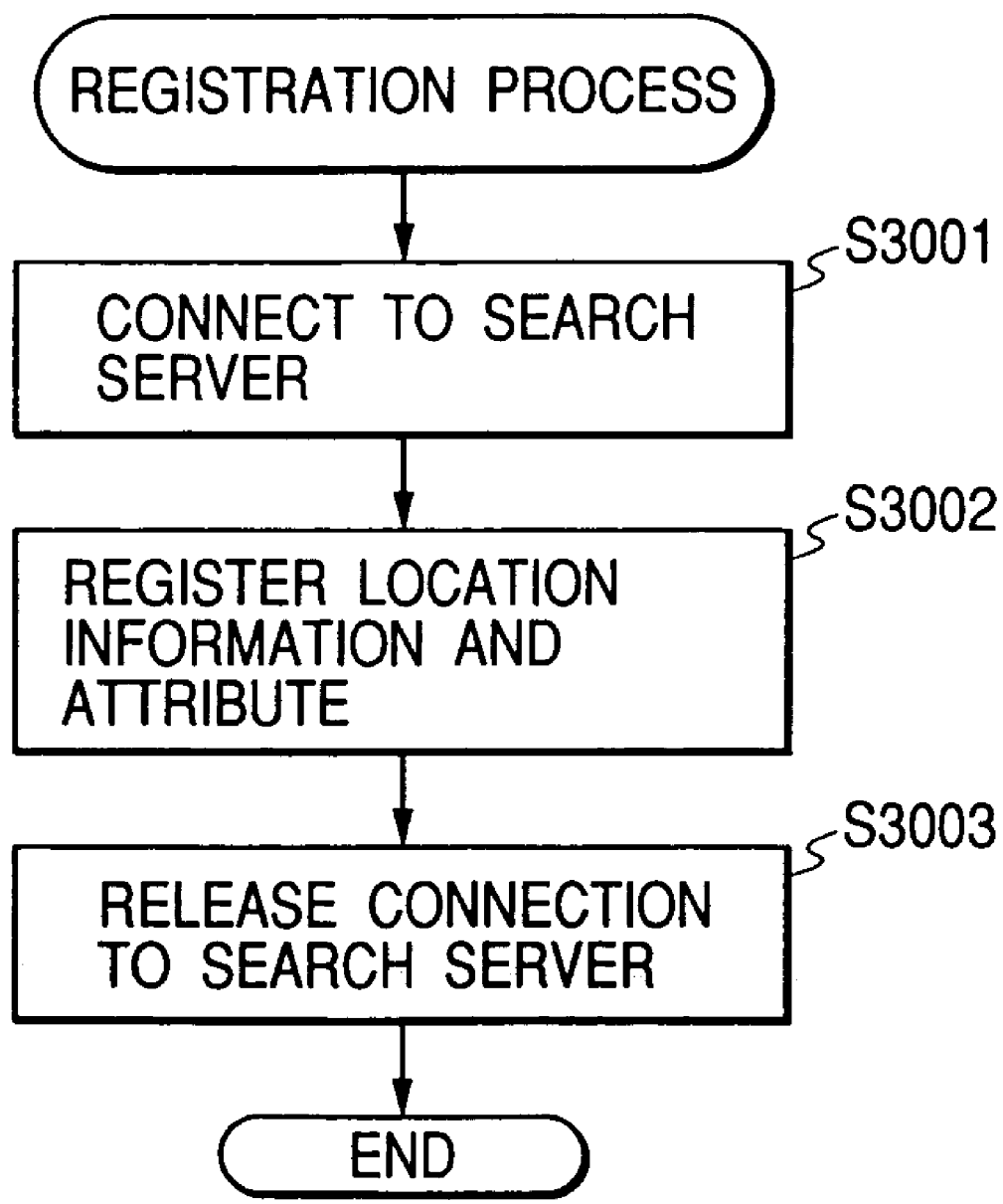
FIG. 33 is a flowchart showing a registration processing of device information of the device to the server.
Figure 34:
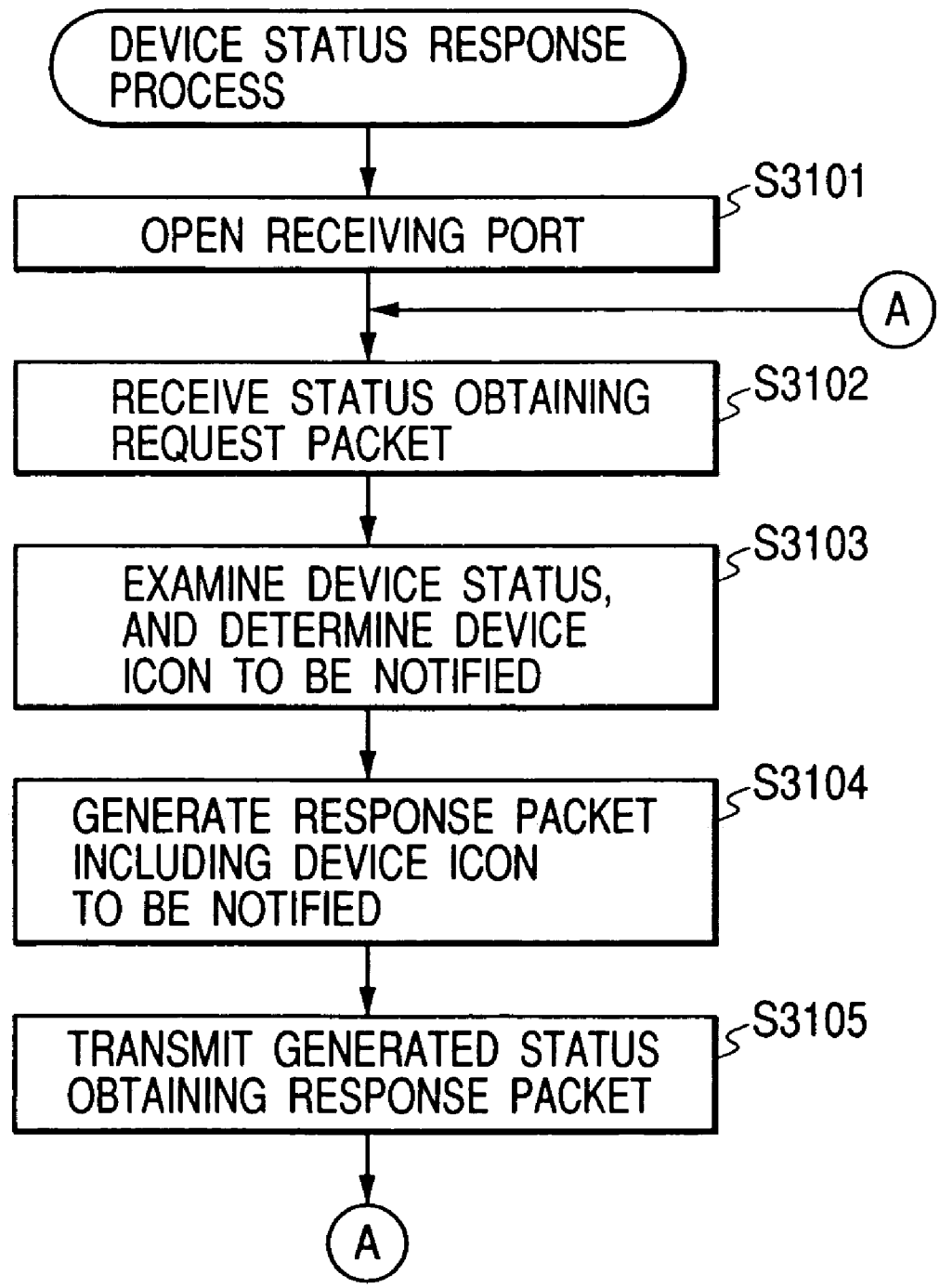
FIG. 34 is a flowchart showing a response process to the device status obtaining request of the device.
Figure 55:
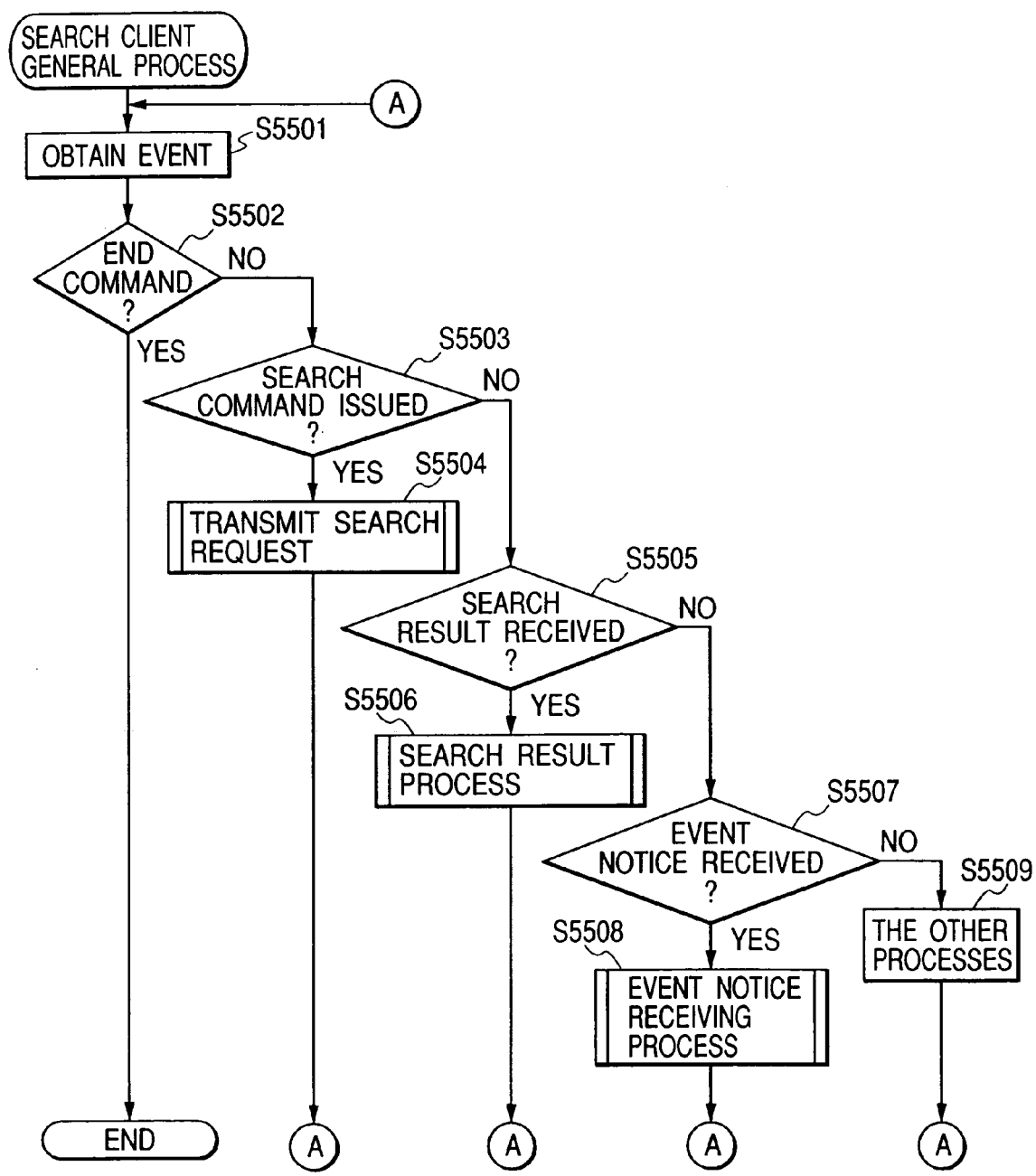
FIGS. 55, 56 and 57 are flowcharts showing a client process in the fourth embodiment.

FIG. 55 is a flowchart showing the general process of the client 111, and processings of steps S5507 and S5508 are added to the flowchart of the first embodiment (FIG. 29).

It is judged in the step S5507 whether or not the obtained event is the event notice from the device.

As a result of judgment of the step S5507, when the obtained event is the event notice, the process advances to step S5508 to execute an event notice reception processing including an processing of changing the icon on MAP displayed on the CRT 210.

Figure 56:
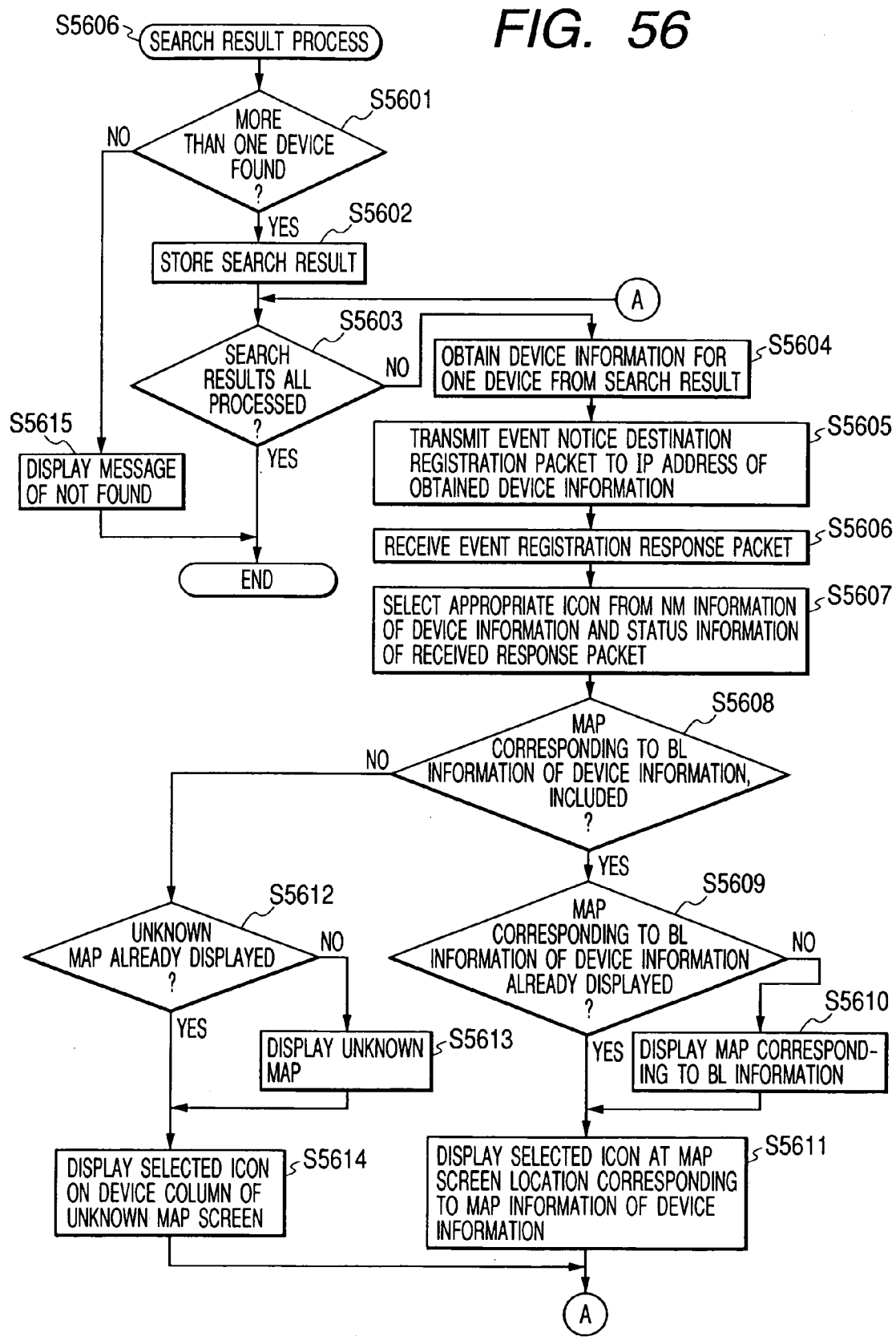
Figure 57:
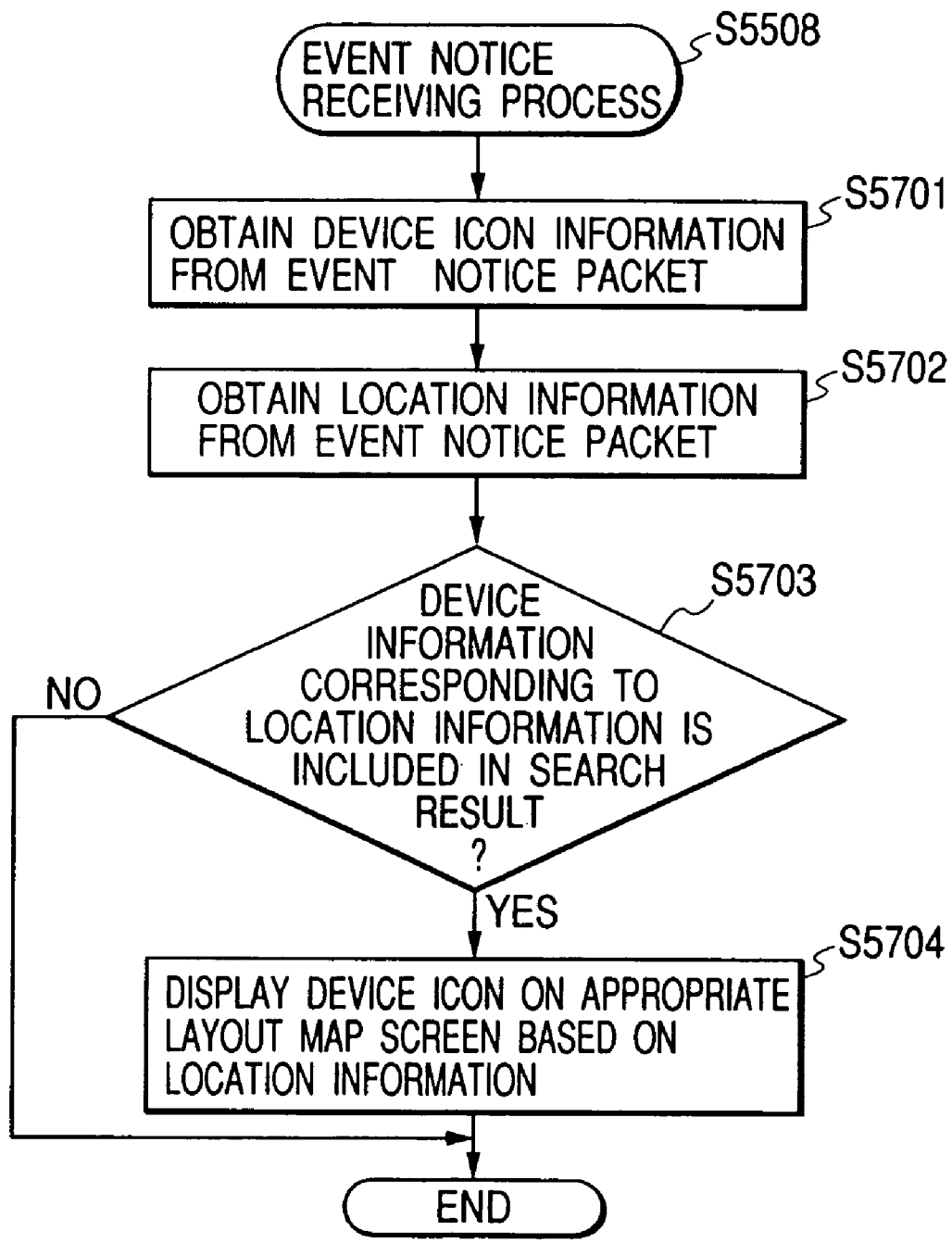

Here, the event notice reception processing of the step S5508 of FIG. 55 is executed based on the flowchart shown in FIG. 57, and a search result processing of step S5506, that is, a process for processing the search result received from the server 112 is executed based on the flowchart shown in FIG. 56.

The search result processing in the client 111 (step S5506 of FIG. 55) will be described hereinafter with reference to FIG. 56.

It is first judged according to the search result from the server 112 whether or not one or more devices are found (step S5601).

As a result of judgment of the step S5601, when the device is not found, a message indicating that is displayed on the CRT 210 (step S5615).

Thereafter, the present processing ends.

As a result of judgment of the step S5601, when the device is found, the search result is held in the hard disk drive (HDD) 211 (step S5602). Therefore, for example, the search result shown in FIG. 13 is stored in the hard disk drive (HDD) 211.

Thereafter, with respect to the respective search results saved in the hard disk drive (HDD) 211, the subsequent processing steps are executed.

Specifically, first the CPU 202 judges in step S5602 whether or not all the search results held in the hard disk drive (HDD) 211 are subjected to a processing from step S5604 (step S5603).

As a result of the judgment, when all the search results are processed, the present processing ends. If not, the processing is continuously executed from the next step S5604.

The device information for one device is obtained from the unprocessed search result in the hard disk drive (HDD) 211 (step S5604).

Subsequently, the IP address of the device information obtained in the step S5604 is used as the address, and the event notice destination registration request (event notice destination registration packet) is transmitted as shown in FIG. 24 (step S5605).

For example, with the processing for the device information shown in FIG. 14, since the IP address is "192.1.2.1", the event notice destination registration packet is transmitted to this address.

Thereafter, the CPU waits for a response packet (registration end) to the event notice destination registration request shown in FIG. 26 from the device corresponding to the address of the event notice destination registration packet.

When the response packet of the event notice destination registration is received (step S5606), the icon information included in the packet is obtained (step S5607).

Subsequently, it is judged whether or not the MAP information corresponding to the information indicated by "BL" of the device information (see FIG. 13) is stored in the memory unit (step S5008).

Concretely, by referring to the MAP correspondence table shown by "1402" and "1403" of FIG. 19, and judging whether or not the MAP information corresponding to C, 0, BR, OP, BU, BL information shown by "1401" of FIG. 19 exists, it is judged whether or not MAP display is possible.

Additionally, here, when the location information in the device information includes the respective information shown by "1401" of FIG. 19, it is judged that the MAP display is possible.

As a result of judgment of the step S5608, when the MAP display is possible, it is judged whether or not the MAP is displayed on the CRT 210 now (step S5609).

As a result of judgment of the step S5609, when MAP is being displayed on the CRT 210, a display unit 427 overlaps and displays the icon obtained in the step S5607 in the position indicated by coordinate information MAP of the device information on the MAP (step S5611).

Therefore, for example, with the processing for the device information shown in FIG. 13, since the BL information is "2-1", MAP information MP2-1 shown in FIG. 16 is displayed as MAP on the CRT 210, and the icon indicating the operated status is displayed in the position indicated by the coordinate information MAP (=10X+10Y) on the MAP.

Thereafter, the CPU returns to the step S5603 to execute the processing for the next search result, and repeatedly executes the subsequent processing step.

As a result of judgment of the step S5609, when the MAP is not displayed on the CRT 210, the display unit 427 displays MAP on the CRT 210 (step S5610).

Thereafter, the CPU advances to the step S5611, and executes a processing for overlapping and displaying the icon on the MAP.

As a result of judgment of the step S5608, when MAP display is impossible, it is judged whether or not unknown MAP information shown in FIG. 18 is now displayed on the CRT 210 (step S5612).

As a result of judgment of the step S5612, when the unknown MAP is displayed on the CRT 210, the icon obtained in the step S5607 is displayed in the device column (column "2902" of FIG. 18) on the unknown MAP (step S5614). As a result, the icon of the device whose location information is unregistered is displayed in the device column on the unknown MAP.

Thereafter, the CPU returns to the step S5603 to execute the processing for the next search result, and repeatedly executes the subsequent processing step.

As a result of judgment of the step S5612, when the unknown MAP is not displayed on the CRT 210, the unknown MAP is displayed on the CRT 210 (step S5613).

Thereafter, the CPU advances to the step S5614, and executes a processing for displaying the icon in the icon column of the MAP.

A search result processing in the client 111 (step S5508 of FIG. 55) will be described hereinafter with reference to FIG. 57.

First, the event notice (see FIG. 54) is received from the device in which the event notice destination registration is performed by the processing of steps S5605 and S5506 of FIG. 55, and the icon information included in the event notice is obtained (step S5701).

Moreover, the location information of the device included in the event notice is obtained (step S5702).

Subsequently, it is judged whether or not the device information including the information matching with the location information obtained in the step S5702 is present in the search result (search result from the server 112) held in the hard disk drive (HDD) 211 by the processing of the step S5602 of FIG. 56 (step S5703).

As a result of the judgment, when there is no matching device information, the present processing ends as it is. When the matching device information is present, the processing of the next step S5703 is executed.

As a result of judgment of the step S5703, when the matching device information is present, the display unit 427 changes the icon on the corresponding MAP with the icon information obtained in the step S5701 based on the location information obtained in the step S5702 (step S5704).

Thereby, for example, when the screen shown in FIG. 22 is displayed, and the paper shortage occurs in the color LBP 101, the icon of the color LBP 101 in the screen of FIG. 22 is changed to the icon as shown in FIG. 26 for display.

Thereafter, the present processing ends.

Figure 58:
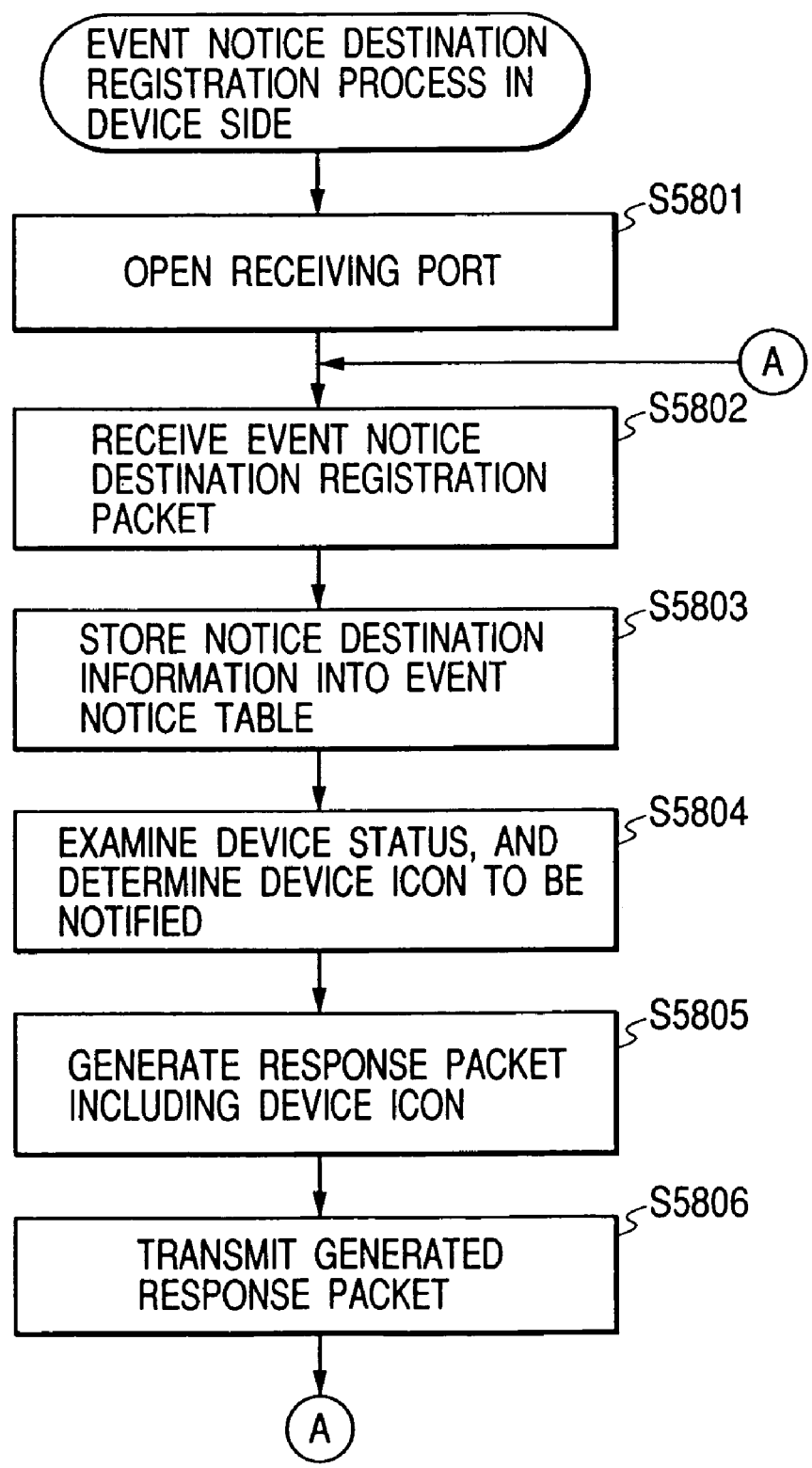
FIGS. 58 and 59 are flowcharts showing a device process in the fourth embodiment.
Figure 59:
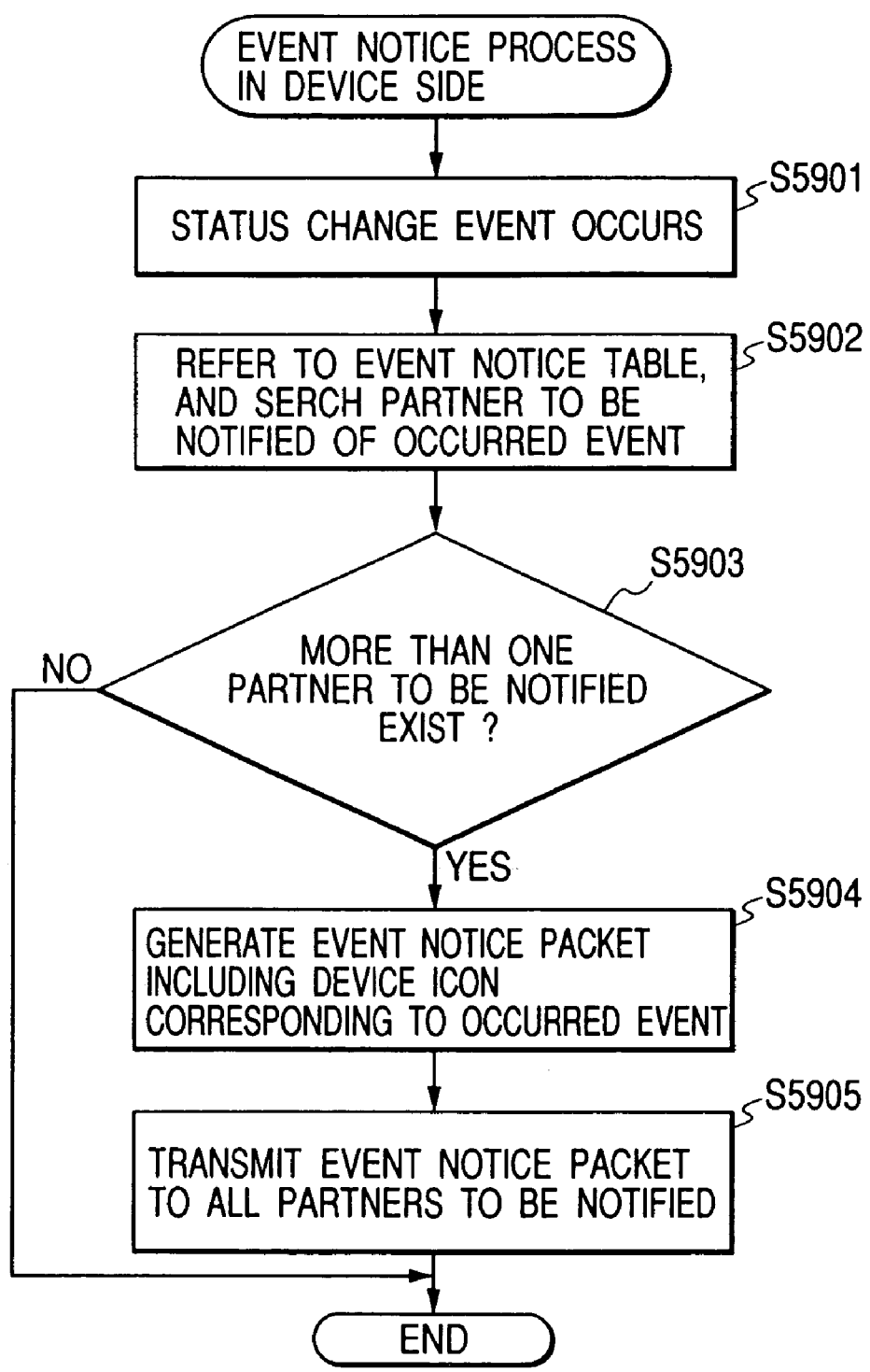

The device process will next be described with reference to flowcharts of FIGS. 58, 59. FIG. 58 is a flowchart showing the event notice destination registration process of the device.

Here, for the simplicity of the description, the color LBP 101 is noted among various devices, and the event notice destination registration process will be described.

In the color LBP 101, when power turns on, first the CPU 2302 opens the receiving port to receive the event notice destination registration request (status obtaining request, see FIG. 51) from the clients 111, 113, and becomes ready for the reception (step S5801).

By the processing of the step S5801, when the event notice destination registration request from a certain client is received (step S5802), the notice condition included in the event notice destination registration request and notice destination information are managed by a table as shown in FIG. 52 (event notice destination table) (step S5803).

Subsequently, the CPU 2302 examines the device status, selects the icon indicating the current status (step S5804), and prepares a response packet (see FIG. 53) to notify the current status to the client (step S5805).

Subsequently, the response packet is transmitted to the client (step S5806).

Thereafter, the CPU returns to the step S5802, and repeatedly executes the subsequent processing steps.

FIG. 58 is a flowchart showing a device event notice processing.

First, the event occurrence of a device status change is recognized (step S5901).

Additionally, the processing stays in the present step until the event occurrence of the status change is detected.

Subsequently, the notice condition and event notice destination held by the step S5803 of FIG. 58 are referred to, and the client to which the event notice is to be transmitted, that is, the client to be notified of the currently occurring event is grasped (step S5902).

Subsequently, as a result of processing of the step S5902, it is judged whether or not the client to be notified exists (step S5903).

As a result of the judgment, when there is no client to be notified, the present processing ends. When the client to be notified exists, the next step S5904 is executed.

As a result of judgment of the step S5903, when the client to be notified exists, an event notice packet (see FIG. 54) including event information is prepared (step S5904). Subsequently, the event notice prepared in the step S5904 is transmitted to all the clients to be notified (step S5905).

Thereafter, the present processing ends.

Additionally, in the fourth embodiment, the layout bit map held by the client has been described, but as in the third embodiment, the server may hold the layout bit map, so that the layout bit map is appropriately transmitted to the client in response to the request from the client.

In this case, in the step S5610 of the search result processing (FIG. 56) of the client 111, by notifying the BL information to the server 112, the layout bit map corresponding to the BL information is obtained from the server 112.

As described above, in the present embodiment, in the clients 111, 113, by obtaining the position information of the device matching with the search condition designated by the user, and displaying the device icon on the MAP, the user can easily recognize the device and the position of the device.

Particularly, in the present embodiment, since the icon on the MAP is changed in accordance with the corresponding device status (operating, paper shortage, paper jammed, no toner, door open, and the like), the user can visually and easily know the device status. Therefore, the user can efficiently select and use the usable device.

Moreover, in the present embodiment, since in the clients 111, 113, the icon information (device bit map icon information) indicating the device status is directly obtained from the device during the event notice destination registration to the device (during reception of the response) or during reception of the event notice from the device, it is unnecessary to hold beforehand the icon information indicating various statuses of the device in the server 112 and clients 111, 113. This can prevent the memory resources of the server 112 and clients 111, 113 from being consumed. Moreover, when a large number of clients exist, it is unnecessary to install the icon information in the respective clients. Therefore, the user's burden on the client side can be lightened, and the device in the unknown status effectively fails to be displayed.

Additionally, for the form in which the icon data and hierarchical position information of the stored device are transmitted onto the network, the application to other various forms can be considered.

For example, in the network system provided with no directory server, when the device responds to Broadcast or Multicast by device search protocols such as SLP from the computer on the network, the hierarchical position information may be set to the response packet. Subsequently, on the computer side having received the response packet, the icon data is displayed on the layout bit map based on the received hierarchical position information.

Additionally, in the above-described embodiments, the icon indicating the device is displayed on the MAP, but this is not limited, and character information may further be displayed as the information indicating the device.

Moreover, in the respective embodiments, the icon indicating the device is displayed/outputted on the screen on the MAP, but this is not limited, and for example, the print output, or the like may be performed so that the user can visually grasp the position, status, and the like of the device.

Furthermore, the device search system can be realized using a technique utilized, for example, in WWW technique. In this case, the server 112 is provided with a WWW server function, a database function (DBMS), and a gateway function as an intermediate between WWW server and DBMS. The WWW server supplies a search screen constituted of HTML or XML to the client.

The client displays the search screen supplied from the WWW server by browser software, and the user executes the device search using the displayed search screen.

Furthermore, various data (MAP, icon, and the like) exchanged with the server, client, and device are constituted of HTML, XML, and the like, and HTTP is used in the protocol for exchanging the data.

Moreover, on the client side, to realize the function not disposed on the general-purpose browser software, for example, Applet as one of JAVA techniques is utilized.

Additionally, the network device control program for executing the above-described processes of the respective embodiments may be executed in PC 200 (see FIG. 2) by the program installed from the outside.

In this case, when a group of information including the program is supplied to the PC 200 via outside storage media such as CD-ROM, flash memory, and floppy disk, or networks such as electronic mail and personal computer communication, and the information group is loaded onto the PC 200, the present invention can be applied.

Figure 47:
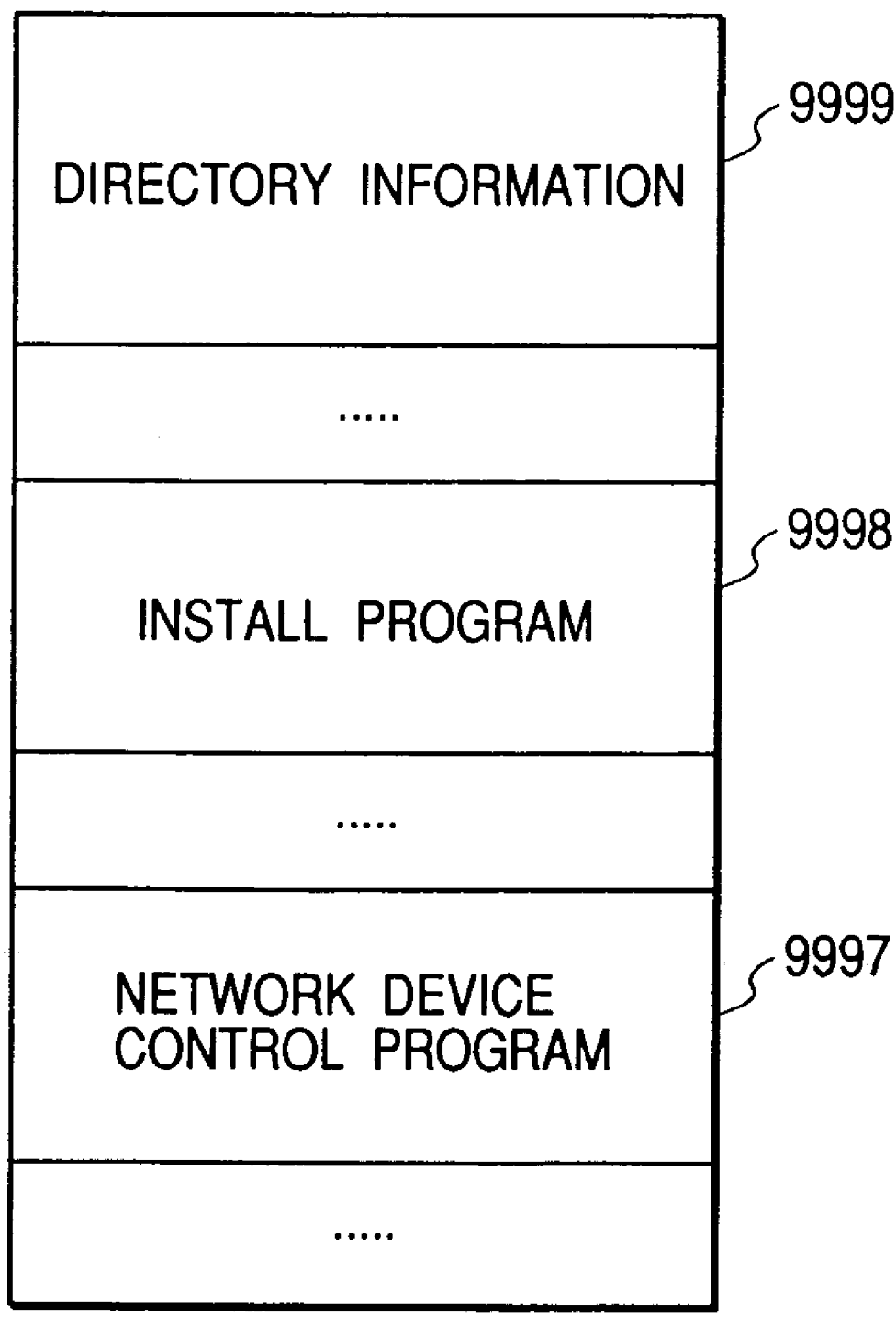
FIG. 47 is an explanatory view of one example of a storage medium in which a network device control program for performing the function of the present invention is stored.

FIG. 47 shows the memory map of CD-ROM as one example of the storage media.

In FIG. 47, in an area "9999", the address information of an area 9998 in which the subsequent installation program is stored, and an area 9997 in which a network device control program is stored are stored as directory information.

Therefore, when the network control program is installed in the PC 200, first the installation program of the area 9998 is loaded in the PC 200 and executed by the CPU 202. By executing the installation program, the network device control program is read from the area 9997 and stored in the hard disk drive (HDD) 211. Thereafter, when the CPU 202 reads the program from the hard disk drive (HDD) 211 and executes the program, the functions of the respective embodiments are realized.

Moreover, in the above-described embodiments, the computer apparatus has been illustrated as the example of the client apparatus 111 or the server apparatus 112, but the devices such as a scanner, a facsimile machine, and a printer may be provided with the function of the client apparatus or the server apparatus.

For example, by providing the scanner with the function of the client apparatus, the user can easily know the status of the printer for printing the original data read by the scanner, or the status of the facsimile apparatus for transmitting the original data read by the scanner.

Moreover, it goes without saying that the object of the present invention is also attained by supplying the storage medium for storing the software program code to realize the above-described functions of the embodiments to the system or the apparatus, and reading and executing the program code stored in the storage medium by the system or the apparatus computer (or CPU or MPU).

In this case, the program code itself read from the storage medium realizes the inventive functions of the present invention, and the storage medium for storing the program code constitutes the present invention.

As the storage medium for supplying the program code, for example, a floppy disk, hard disk, optical disk, optical magnetic disk, CD-ROM, CD-R, magnetic tape, nonvolatile memory card, ROM, and the like can be used.

Moreover, it goes without saying that the above-described embodiment functions can be realized not only by executing the program code read by the computer but also by performing a part or the whole of the actual processing by the operating system (OS), and the like operating on the computer based on the instruction of the program code.

Furthermore, it goes without saying the above-described embodiment functions can be realized by writing the program code read from the storage medium into a function expansion board inserted to the computer or a memory disposed in the function expansion unit connected to the computer, and performing a part or the whole of the actual processing by the CPU, and the like disposed in the function expansion board or the function expansion unit.

What is claimed is:

1. A network system comprising a server, a client, and a device,
    said server comprising:
        a first storage unit, adapted to store position information indicating a geographical location in which said device is installed and a network address of said device; and
        a first transmission unit, adapted to transmit the position information and the network address stored by said first storage unit to said client via a network,
    said device comprising:
        a second storage unit, adapted to store icon data indicating an icon for visually representing said device; and
        a control unit, adapted to transmit the icon data stored by said second storage unit to said client via the network, and
    said client comprising:
        a first reception unit, adapted to receive the position information and the network address transmitted by said first transmission unit via the network;
        a second transmission unit, adapted to transmit a request to said device based on the network address received by said first reception unit so as to acquire the icon data stored in said second storage unit from said device via said network;
        a second reception unit, adapted to receive the icon data transmitted by said control unit via the network;
        a display unit, adapted to display the geographical location in which said device is installed indicated by the position information received by said first reception unit, and to display the icon indicated by the icon data received by said second reception unit; and
        a third storage unit, adapted to store map data corresponding to the position information,
        wherein said display unit selects the map data from said third storage unit based on the received position information, and displays the icon in accordance with the selected map data.

2. The network system according to claim 1, wherein
said device further comprises a judgment unit, adapted to judge a status of said device,
said second storage unit stores a plurality of icon data each of which corresponds to the status of said device, and
said control unit selects the icon data in accordance with the judged status from the plurality of stored icon data and transmits the selected icon data to said client.

3. The network system according to claim 1, wherein said client further comprises a processor unit adapted to process the received position information to identify a device corresponding to the received position information, and wherein said second transmission unit transmits the request to the identified device.

4. The network system according to claim 1, wherein the position information indicates at least two geographical areas in which said device is located, a first one of the geographical areas being included within another of the geographical areas.

5. The network system according to claim 1, wherein said client further comprises a third transmission unit adapted to transmit a request to a device corresponding to the received position information so as to acquire a status of that device, and wherein said second reception unit receives the icon data corresponding to the status of that device.

6. The network system according to claim 1, wherein said client further comprises a third transmission unit adapted to transmit a request to said server so as to search for a desired device, and wherein said first reception unit receives the position information as a response to the request transmitted by said third transmission unit.

7. The network system according to claim 1, wherein said display unit displays the location of said device defined by the position information received by said first reception unit in characters.

8. A network system according to claim 1, wherein the position information defining the geographical location of said device comprises information that defines the geographical location of said device in a plurality of hierarchical layers.

9. A network system according to claim 1, wherein the position information defining the geographical location of said device comprises information selected from the group consisting of (a) information defining which of plural companies' facility said device is in, (b) information defining which of plural cities said device is in, (c) information defining which of plural building said device is in, (d) information defining which of plural floors of a building said device is on, and (e) information defining which of plural locations on a floor said device is in.

10. An information processor for communicating with another information processor and a device via a network, comprising:
    a first reception unit, adapted to receive from the other information processor, via the network, position information indicating a geographical location in which the device is installed and a network address of the device;
    a transmission unit, adapted to transmit a request to the device based on the network address received by said first reception unit so as to acquire icon data from the device, the icon data indicating an icon for visually representing the device;
    a second reception unit, adapted to receive the icon data from the device via the network;
    a display unit, adapted to display the geographical location in which the device is installed indicated by the position information received by said first reception unit, and to display the icon indicated by the icon data received by said second reception unit; and
    a storage unit, adapted to store map data corresponding to the position information, wherein said display unit selects map data from said storage unit based on the received position information, and displays the icon in accordance with the selected map data.

11. The information processor according to claim 10, wherein said display unit displays the location of said device defined by the position information received by said first reception unit in characters.

12. An information processor according to claim 10, wherein the position information defining the geographical location of said device comprises information selected from the group consisting of (a) information defining which of plural companies' facility said device is in, (b) information defining which of plural cities said device is in, (c) information defining which of plural building said device is in, (d) information defining which of plural floors of a building said device is on, and (e) information defining which of plural locations on a floor said device is in.

13. A method of displaying an icon for a device on a network, comprising:
   a first reception step of receiving from an information processor, via the network, position information indicating a geographical location in which the device is installed and a network address of the device;
   a transmission step of transmitting a request to the device based on the received network address so as to acquire icon data from the device, the icon data indicating an icon for the device;
   a second reception step of receiving the icon data from the device via the network;
   a display step of displaying the geographical location in which the device is installed indicated by the position information received in said first reception step, and displaying the icon indicated by the icon data received in said second reception step; and
   a selection step of selecting map data corresponding to the position information from among a plurality of map data, wherein said display step includes displaying the icon in accordance with the selected map data.

14. The method according to claim 13, further comprising a processing step of processing the received position information to identify a device corresponding to the received position information, wherein said transmission step includes transmitting the request to the identified device.

15. The method according to claim 13, wherein the position information indicates at least two geographical areas in which the device is located, a first one of the geographical areas being included within another of the geographical areas.

16. The method according to claim 13, further comprising a second transmission step of transmitting a request to a device corresponding to the received position information so as to acquire a status of that device, and wherein said second reception step includes receiving the icon data corresponding to the status of that device.

17. The method according to claim 13, further comprising a second transmission step of transmitting a request to the information processor so as to search for a desired device, wherein said first reception step includes receiving the position information and the network address as a response to the request transmitted in said second transmission step.

18. The method according to claim 13, wherein said display step includes displaying the location of the device defined by the position information received in said first reception step in characters.

19. A method according to claim 13, wherein the position information defining the geographical location of the device comprises information selected from the group consisting of (a) information defining which of plural companies' facility the device is in, (b) information defining which of plural cities the device is in, (c) information defining which of plural building the device is in, (d) information defining which of plural floors of a building the device is on, and (e) information defining which of plural locations on a floor the device is in.

20. A storage medium storing a computer program executed by a computer of an information processor for implementing a method of displaying an icon for a device on a network, said computer program comprising:
   code for a first reception step of receiving from an information processor, via the network, position information indicating a geographical location in which the device is installed and a network address of the device;
   code for a transmission step of transmitting a request to the device based on the received network address so as to acquire icon data from the device, the icon data indicating an icon for the device;
   code for a second reception step of receiving the icon data from the device via the network;
   code for a display step of displaying the geographical location in which the device is installed indicated by the position information received in the first reception step, and displaying the icon indicated by the icon data received in the second reception step; and
   code for a selection step of selecting map data corresponding to the position information from among a plurality of map data, wherein said display step includes displaying the icon in accordance with the selected map data.

21. A storage medium according to claim 20, wherein the position information defining the geographical location of the device comprises information selected from the group consisting of (a) information defining which of plural companies' facility the device is in, (b) information defining which of plural cities the device is in, (c) information defining which of plural building the device is in, (d) information defining which of plural floors of a building the device is on, and (e) information defining which of plural locations on a floor the device is in.

* * * * *

UNITED STATES PATENT AND TRADEMARK OFFICE
CERTIFICATE OF CORRECTION

PATENT NO. : 7,293,067 B1
APPLICATION NO. : 09/612565
DATED : November 6, 2007
INVENTOR(S) : Nobuhiko Maki et al.

It is certified that error appears in the above-identified patent and that said Letters Patent is hereby corrected as shown below:

COLUMN 5:

Line 18, "instruction" should read --instructions--.

COLUMN 21:

Line 5, "respects" should read --aspects--.

COLUMN 30:

Line 39, "building" should read --buildings--.

COLUMN 31:

Line 11, "building" should read --buildings--.

COLUMN 32:

Line 14, "building" should read --buildings--.

Signed and Sealed this

First Day of July, 2008

JON W. DUDAS
*Director of the United States Patent and Trademark Office*